United States Patent
Hammet et al.

(10) Patent No.: US 8,813,025 B1
(45) Date of Patent: *Aug. 19, 2014

(54) CUSTOMER IMPACT PREDICTIVE MODEL AND COMBINATORIAL ANALYSIS

(75) Inventors: Claudia P. Hammet, Charlotte, NC (US); David H. Ulmer, Huntersville, NC (US); John Cowan, Charlotte, NC (US); Rachel Nemecek, Charlotte, NC (US); Edward M. Dunlap, Jr., Cramerton, NC (US); Thomas R. Williams, Mansfield, TX (US)

(73) Assignee: Bank of America Corporation, Charlotte, NC (US)

( * ) Notice: Subject to any disclaimer, the term of this patent is extended or adjusted under 35 U.S.C. 154(b) by 1074 days.

This patent is subject to a terminal disclaimer.

(21) Appl. No.: 12/352,024

(22) Filed: Jan. 12, 2009

(51) Int. Cl.
*G06F 9/44* (2006.01)

(52) U.S. Cl.
USPC .............................. 717/104; 717/124; 717/131

(58) Field of Classification Search
None
See application file for complete search history.

(56) References Cited

U.S. PATENT DOCUMENTS

| | | | |
|---|---|---|---|
| 5,586,252 A * | 12/1996 | Barnard et al. | 714/48 |
| 5,930,798 A | 7/1999 | Lawler et al. | |
| 6,223,143 B1 | 4/2001 | Weinstock et al. | |
| 6,249,755 B1 | 6/2001 | Yemini et al. | |
| 6,374,196 B1 | 4/2002 | Hashimoto et al. | |
| 6,952,658 B2 * | 10/2005 | Greulich et al. | 702/185 |
| 7,089,581 B1 * | 8/2006 | Nagai et al. | 717/104 |
| 7,225,377 B2 | 5/2007 | Ishida et al. | |
| 7,240,325 B2 * | 7/2007 | Keller | 717/104 |
| 7,246,039 B2 | 7/2007 | Moorhouse | |
| 7,254,514 B2 * | 8/2007 | House et al. | 702/181 |
| 7,257,566 B2 * | 8/2007 | Danielson et al. | 706/52 |
| 7,263,510 B2 | 8/2007 | Chandler et al. | |
| 7,269,824 B2 * | 9/2007 | Noy et al. | 717/131 |
| 7,379,846 B1 * | 5/2008 | Williams et al. | 702/185 |
| 7,386,839 B1 * | 6/2008 | Golender et al. | 717/131 |
| 7,512,954 B2 * | 3/2009 | Srivastava et al. | 717/124 |
| 7,555,549 B1 * | 6/2009 | Campbell et al. | 717/131 |
| 7,590,606 B1 * | 9/2009 | Keller et al. | 706/45 |
| 7,707,559 B2 * | 4/2010 | Reddy | 717/131 |
| 7,770,153 B2 * | 8/2010 | Chilimbi et al. | 717/131 |
| 7,774,293 B2 * | 8/2010 | Mosleh et al. | 706/53 |
| 7,856,575 B2 * | 12/2010 | Bock et al. | 714/26 |

(Continued)

OTHER PUBLICATIONS

Brown, "Software systems safety and human errors", 1988, Conference of Computer Assurance; [retrieved on Jun. 22, 2012]; Retrieved from Internet <URL:http://ieeexplore.ieee.org/stamp/stamp.jsp?tp=& arnumber=9634>;pp. 19-28.*

(Continued)

*Primary Examiner* — Xi D Chen
(74) *Attorney, Agent, or Firm* — Weiss & Arons LLP; Michael A. Springs, Esq.

(57) ABSTRACT

Systems and methods for objective Deployment Failure risk assessments are provided, which may include fault trees. Systems and methods for the analysis of fault trees are provided as well. The risk assessments system may involve the development of a fault tree, assigning initial values and weights to the events within that fault tree, and the subsequent revision of those values and weights in an iterative fashion, including comparison to historical data. The systems for analysis may involve the assignment of well-ordered values to some events in a fault tree, and then the combination those values through the application of specialized, defined gates. The system may further involve the revision of specific gates by comparison to historical or empirical data.

17 Claims, 16 Drawing Sheets

(56) References Cited

U.S. PATENT DOCUMENTS

| | | | |
|---|---|---|---|
| 7,953,620 B2 | 5/2011 | Scates | |
| 7,962,960 B2 | 6/2011 | Fudge | |
| 7,971,181 B2* | 6/2011 | Pabalate et al. | 717/104 |
| 7,996,814 B1* | 8/2011 | Qureshi et al. | 717/104 |
| 8,015,550 B2* | 9/2011 | Berenbach et al. | 717/124 |
| 8,180,718 B2 | 5/2012 | Bethke et al. | |
| 2003/0158924 A1* | 8/2003 | DeLegge | 709/223 |
| 2006/0161883 A1* | 7/2006 | Lubrecht et al. | 717/104 |
| 2007/0028219 A1* | 2/2007 | Miller et al. | 717/124 |
| 2007/0028220 A1* | 2/2007 | Miller et al. | 717/124 |
| 2011/0258609 A1* | 10/2011 | Maczuba | 717/124 |

OTHER PUBLICATIONS

Chen, "Automatic Failure Analysis using Extended Safecharts"; 2006, Master thesis submitted to National Chung Cheng University; [retrieved on Jun. 23, 2012]; Retrieved from Internet<URL:http://embedded.cs.ccu.edu.tw/~esl_web/LabThesisPaper/ChenYeanRu_Thesis_2006.pdf>; pp. 1-71.*

Central Washington University, "Enterprise INformaiton Systems", Oct. 2003, published online; [retrieved on Jun. 22, 2012]; Retrieved from Internet <URL:http://cwu.edu/~pmits/docs/Enterprise_Information_Systems_Organization_Charter_October_2003.doc>; pp. 1-28.*

Dehlinger, Lutz, "Software Fault Tree Analysis for Product Lines", 2004 IEEE; [retrieved on Jun. 25, 2012]; Retrieved from Internet <URL:http://ieeexplore.ieee.org/stamp/stamp.jsp?tp=&arnumber=1281726>;pp. 1-10.*

Gentile, Summers, "Random, Systematic, and Common Cause Failure: How Do you Manage Them"; 2006, Wiley InterScience; [retrieved on Jun. 24, 2012]; Retrieved from Internet <URL:http://onlinelibrary.wiley.com/doi/10.1002/prs.10145/pdf>;pp. 331-338.*

Giese, et al., "Compositional Hazard Analysis of UML Component and Deployment Models", 2004, Springer-Verlag Berlin Heidelberg; [retrieved on Jun. 22, 2012]; Retrieved from Internet <URL:http://www.springerlink.com/content/g3tehdwj9jgkf9b5/fulltext.pdf>;pp. 166-179.*

Jo, Park, "Dynamic management of human error to reduce total risk", 2003, Elsevier Science; [retrieved on Jun. 23, 2012]; Retrieved from Internet <URL:http://sciencedirect.com/science/article/pii/S0950423003000196>;pp. 313-321.*

Kim, et al., "On the use of the Balancing Method for calculating component RAW involving CCFs in SSC categorization", 2004 Elseveier; [retrieved on Jun. 25, 2012]; Retrieved from Internet <URL:http://www.sciencedirect.com/science/article/pii/S095183200400122X>;pp. 233-242.*

Lam, "Managing Product Development Process for Time to Market", 2006, Dissertation sumitted to University of Southern Queensland; [retrieved on Jun. 25, 2012]; Retrieved from Internet <URL:http://eprints.usq.edu/au/2501/1/Lam_SuetLeong_2006.pdf>;pp. A1-A70.*

Moore, "Signalling Infrastructure Safety Cases for Channel Tunnel Services Over British Main Lines", 1996 IEE; [retrieved on Jun. 24, 2012]; Retrieved from Internet <URL:http://ieeexplore.ieee.org/stamp/stamp.jsp?tp=&arnumber=396037>;pp. 168-172.*

Nemeth, et al., "Prediction-based diagnosis and loss prevention using qualitative multi-scale models", 2006, Information Sciences; [retrieved on Jun. 21, 2012]; Retrieved from Internet <URL:http://daedalus.scl.sztaki.hu/PCRG/works/publications/Nemeth2007a.pdf>;pp. 1-25.*

US Nuclear Regulatory Commission, "Fault Tree Handbook", 1981, published online; [retrieved on Jun. 22, 2012]; Retrieved from Internet <URL:http://www.dtic.mil/cgi-bin/GetTRDoc?AD=ADA354973>;pp. 1-216.*

Ramachandran, et al., "Developing Team Performance Models: From Abstract to Concrete", 2008, Interservice/Industry Training, Simulation, and Education Conference; [retrieved on Jun. 24, 2012]; Retrieved from Internet <URL:http://www.stottlerhenke.com/papers/IITSEC-08-team-performance-models.pdf>;pp. 1-10.*

Wong, Beglaryan, "Strategies for Hospitals to Improve Patient Safety: A Review of the Research"; 2004, published online; [retrieved on Jun. 22, 2012]; Retrieved from Internet <URL:http://www.caphc.org/documents_programs/patient_safety/patient_safety_2004.pdf>;pp. 1-48.*

Zheng, Xu, A Human Factors Fault Tree Analysis Method for Software Engineering>; 2008, IEEE; [retrieved on Jun. 22, 2012]; Retrieved from Internet <URL:http://ieeexplore.ieee.org/stamp/stamp.jsp?tp=&arnumber=4738216; pp. 1971-1975.*

Tucek, et al., "Triage: Diagnosing Production Run Faulures at the User's Site", 2007 ACM; [retrieved on Mar. 20, 2014]; Retrieved from Internet <URL:http://dl.acm.org/citation.cfm?id=1294261>;pp. 131-144.*

Clarke, et al., "Supporting Human-Intensive Systems"; 2010 ACM; [retrieved on Mar. 20, 2014]; Retrieved from Internet <URL:http://dl.acm.org/citation.cfm?id=1882362>;pp. 87-91.*

Wei, et al., "Research on Complex Problem Analysis in TRIZ"; 2008 IEEE; [retrieved on Mar. 20, 2014]; Retrieved from Internet <URL:http://ieeexplore.ieee.org/stamp/stamp.jsp?tp=&arnumber=4654460>;pp. 755-760.*

Li, et al., "Study on Human Error Expanded Model and Context Influencing Human Reliability in Diital Control Systems"; 2010 IEEE; [retrieved on Mar. 20, 2014]; Retrieved from Internet <URL:http://ieeexplore.ieee.org/stamp/stamp.jsp?tp=&arnumber=5660132>;pp. 1-4.*

Rubin, et al., "Yield Enhancement and Yield Management of Silicon Foundries Using IDDq "Stress Current Signature"," IEEE, Apr. 30, 2001-May 3, 2001, Orlando, Florida.

J. Steven Newman, "Failure-Space A Systems Engineering Look at 50 Space System Failures", Acta Astronautica, Retrieved on Oct. 7, 2013, 517-527, vol. 48, Issues 5-12, (http://www.sciencedirect.com/science/article/pii/S0094576501000716), Elsevier Science Ltd., Great Britian.

* cited by examiner

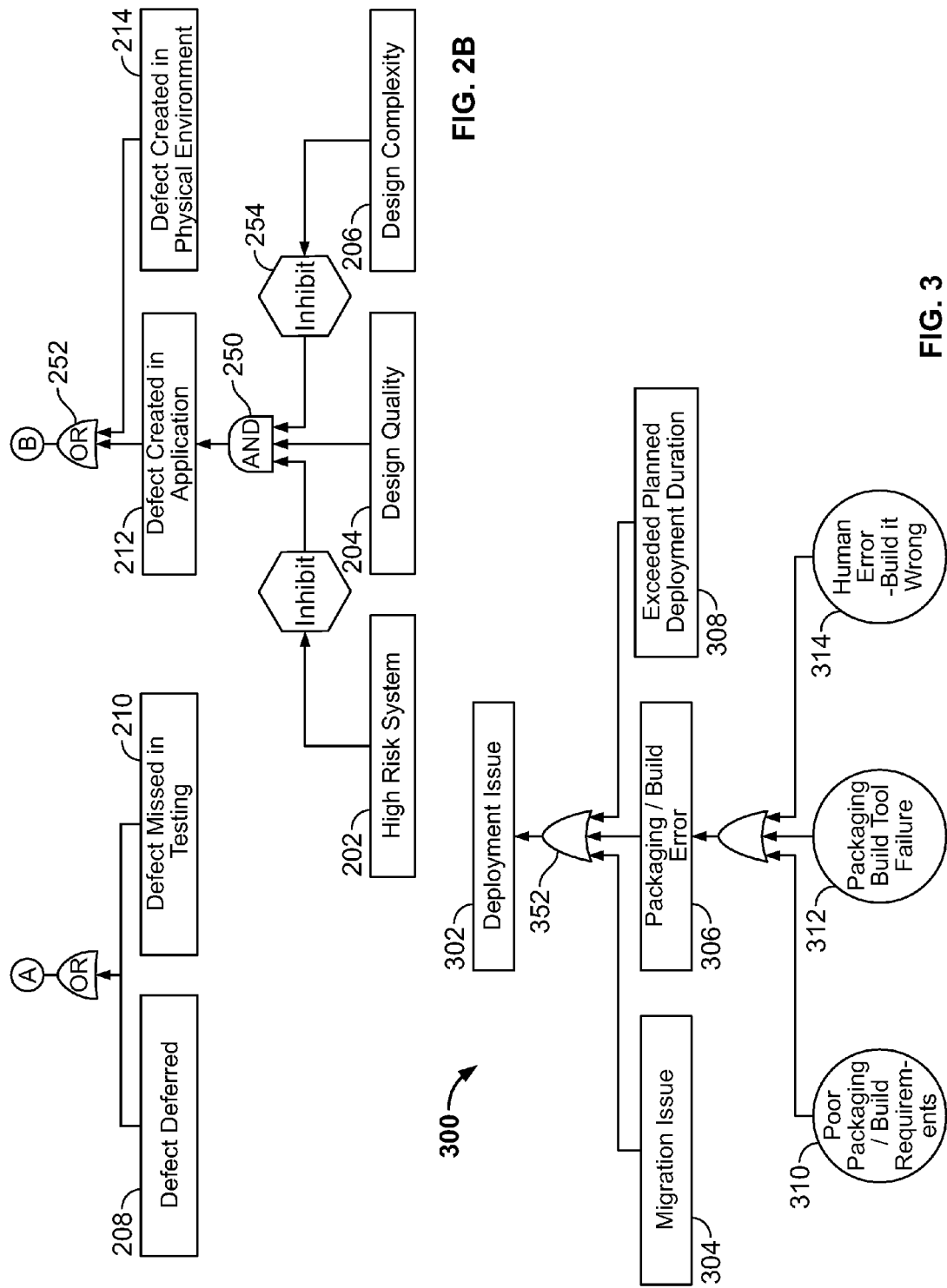

1Ψ-1Y- AND — 501

| | RESULT |
|---|---|
| HY | H |
| HN | H |
| MY | H |
| MN | M |
| LY | M |
| LN | L |

| | RESULT |
|---|---|
| HY | H |
| HN | H |
| MY | H |
| MN | M |
| LY | H |
| LN | L |

| YYY | Y |
|---|---|
| YYN | Y |
| YNY | Y |
| YNN | Y |
| NYY | Y |
| NYN | Y |
| NNY | Y |
| NNN | N |

FIG. 7

2Ψ-AND — 1001

|  | RESULT |
|---|---|
| HL | M |
| HH | H |
| HM | H |
| LL | L |
| LH | M |
| LM | L |
| ML | L |
| MH | H |
| MM | M |

|  | RESULT |
|---|---|
| HHY | H |
| HMY | H |
| HLY | H |
| MHY | H |
| MMY | H |
| MLY | H |
| LHY | H |
| LMY | H |
| LLY | H |
| HHN | H |
| HMN | H |
| HLN | H |
| MHN | H |
| MMN | M |
| MLN | M |
| LHN | H |
| LMN | M |
| LLN | L |

1102 → HHY
1103 → H
1104 → HLN, LHN
1105 → H, H
1106 → MLN, LMN
1107 → M, M

| | RESULT |
|---|---|
| HHH | H |
| HHL | H |
| HHM | H |
| HLH | H |
| HLL | H |
| HLM | H |
| HMH | H |
| HML | H |
| HMM | H |
| LHH | H |
| LHL | H |
| LHM | H |
| LLH | H |
| LLL | L |
| LLM | M |
| LMH | H |
| LML | M |
| LMM | M |
| MHH | H |
| MHL | H |
| MHM | H |
| MLH | H |
| MLL | M |
| MLM | M |
| MMH | H |
| MML | M |
| MMM | M |

FIG. 12

3Ψ-AND — 1301

| | RESULT |
|---|---|
| HHH | H |
| HHL | M |
| HHM | H |
| HLH | M |
| HLL | L |
| HLM | M |
| HMH | H |
| HML | M |
| HMM | M |
| LHH | M |
| LHL | L |
| LHM | M |
| LLH | L |
| LLL | L |
| LLM | L |
| LMH | M |
| LML | L |
| LMM | M |
| MHH | H |
| MHL | M |
| MHM | M |
| MLH | M |
| MLL | L |
| MLM | M |
| MMH | M |
| MML | M |
| MMM | M |

FIG. 13

3Y-AND — 1401

| | RESULT |
|---|---|
| YYY | H |
| YYN | M |
| YNY | M |
| YNN | L |
| NYY | M |
| NYN | L |
| NNY | L |
| NNN | L |

FIG. 14

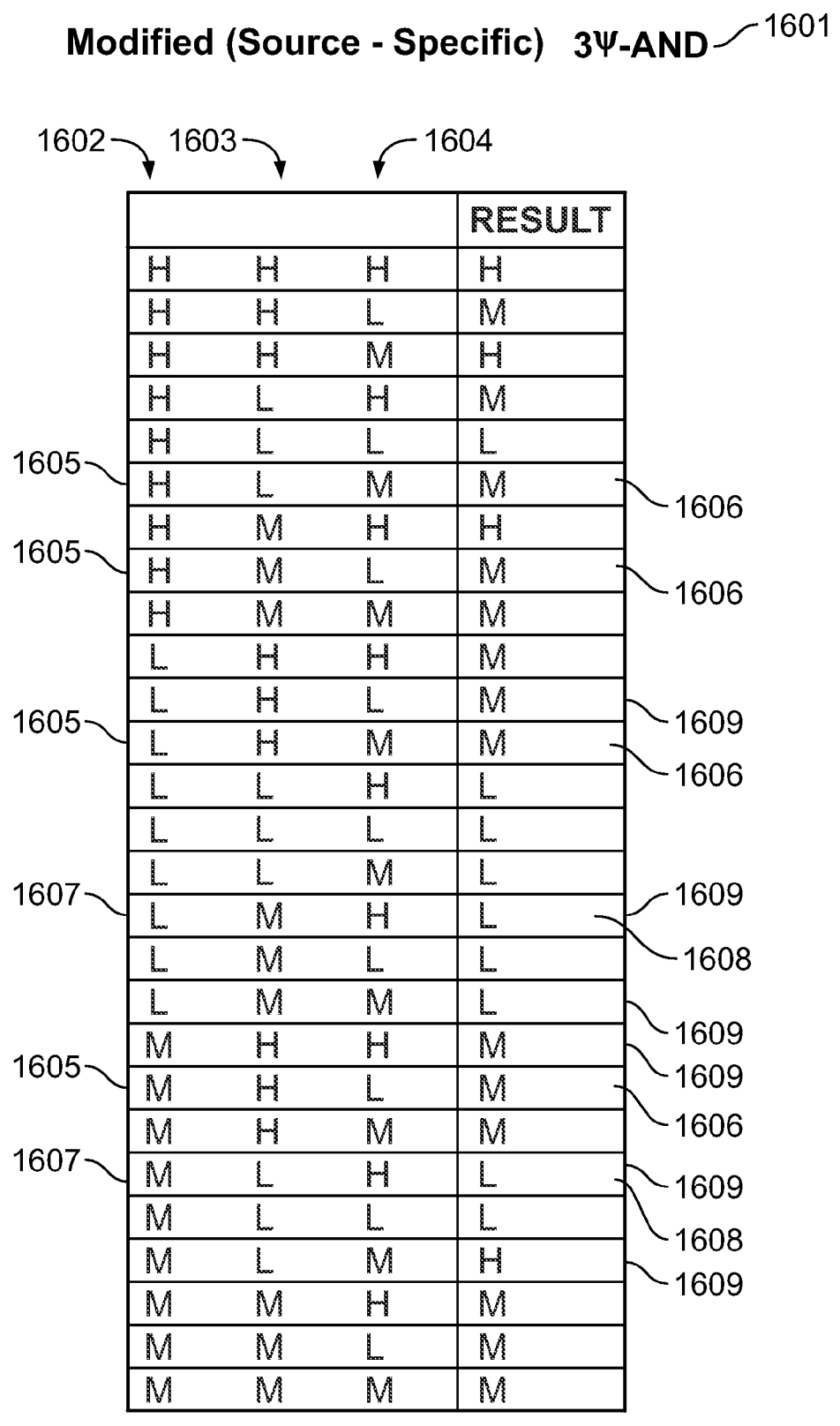

Modified (Source - Specific) 3Ψ-AND — 1601

|  |  |  | RESULT |
|---|---|---|---|
| H | H | H | H |
| H | H | L | M |
| H | H | M | H |
| H | L | H | M |
| H | L | L | L |
| H | L | M | M |
| H | M | H | H |
| H | M | L | M |
| H | M | M | M |
| L | H | H | M |
| L | H | L | M |
| L | H | M | M |
| L | L | H | L |
| L | L | L | L |
| L | L | M | L |
| L | M | H | L |
| L | M | L | L |
| L | M | M | L |
| M | H | H | M |
| M | H | L | M |
| M | H | M | M |
| M | L | H | L |
| M | L | L | L |
| M | L | M | H |
| M | M | H | M |
| M | M | L | M |
| M | M | M | M |

FIG. 16

CUSTOMER IMPACT PREDICTIVE MODEL AND COMBINATORIAL ANALYSIS

FIELD OF TECHNOLOGY

Aspects of the disclosure relate to combinatorial analysis and knowledge engineering.

BACKGROUND

Businesses or other entities engaged in software product deployment are faced with the risk of Deployment Failures (DFs).

DFs may include Post-Production Defects (PPDs) and Failed End-User Interactions at various levels, including the project and release levels. Failed End-User Interactions may also be called Failed Customer Interactions (FCIs).

The likelihood of a DF is affected by a number of factors, including other DFs earlier in the production chain.

For instance, a high level of design complexity in a project as conceived might lead to the late submission of a requirements document (an earlY-stage DF). The late requirements document would then increase the likelihood of a later-stage DF such as a failure to adequately test. The failure to adequately test might then increase the likelihood of an even later stage DF, such as an FCI.

For the purposes of this application, a lower level failure state is a Root Cause (RC). An Intermediate point of failure resulting from one or more Root Causes is a Minor Effect (ME). An end-state failure mode resulting from one or more Root Causes and/or Minor Effects is a Top Event. A Top Event may also be referred to as a Primary Effect.

In the example given immediately above, for instance, the high level of design complexity is a Root Cause, the failure to adequately test is a Minor Effect, and the FCI is a Primary Effect.

Similarly, a physical environment defect may be a Root Cause which might increase the likelihood of a failed change error (Minor Effect), which could in turn increase the likelihood of the FCI (Primary Effect).

A Minor Effect may simply be a conceptual label for two or more Root Causes and the relationship between those Root Causes. A Minor Effect that can be independently measured may be treated as Root Causes.

Entities benefit from anticipating the risk of Deployment Failures at every stage by allowing the prediction of such issues early enough in the development lifecycle such that mitigating actions can be taken and any negative end-user impact can be limited.

Conventionally, DF risk assessment is established by subjective opinion, usually by an individual with some experience in the field. Such subjective analyses are, however, unreliable and the mechanism for making such analyses is difficult to teach or share.

Further, the subjective analyses are not readily scalable. That is, undertaking such subjective analyses in connection with more than one development project may often require the expertise of different individuals having particularized expertise Also, conventional DF risk assessment is generally at least partially retrospective, undertaken at the earliest only after Root Causes have aggregated to the level of Minor Effects.

The conventional method generally allows for accurate DF risk assessment only at later stages in the deployment process, such as late-stage testing, which may be after the most efficient opportunities to mitigate have passed.

Businesses or other entities often attempt to model or analyze failure processes of various systems.

One mechanism for engaging in such modeling is the process of Fault Tree Analysis (FTA).

FTA may be composed of logic diagrams that display the state of the system and it may be constructed using graphical design techniques.

In an FTA, an undesired effect may be taken as the "Top Event" of a tree of logic. Then, each situation that could cause that effect is added to the tree as a series of logic expressions.

Events for which no cause is recognized in the fault tree may be termed Base Events, and events within the fault tree that are neither Base Events or the Top Event may be termed Intermediate Events.

Conventionally, fault tree analysis comprehends the combination of Base Events and Intermediate Events as Boolean or probabilistic structures.

That is to say, as a descriptive matter, a fault tree may conceptualize the occurrence or failure of some event as related to the occurrence or failure of some set of other events in Boolean terms: Event A will occur if Event B AND Event C occur OR if Event D occurs.

As a predictive matter, a fault tree may conceptualize the probability of the occurrence or failure of some event as related to the probability of the occurrence or failure of some set of other events in probabilistic terms: The probability of Event A occurring is determined by the mathematical evaluation of probability of Events B and C occurring OR the probability of Event D occurring.

The Boolean, descriptive analysis can be understood as a special case of the probabilistic analysis, where the probabilities are either 100% (True) or 0% (False).

Such Boolean/probabilistic combinations can be readily understood under mechanisms of algorithmic conversion well known to practitioners. For instance, in the example given, where the probability of Event X is designated $P_{(x)}$, then $P_{(a)}=(P_{(b)}*P_{(c)})+P_{(d)}$.

Conventionally fault trees may further include the assignment of weights to particular events, such that certain events are given more significance in the algorithm by the addition of a weight multiplier.

In some circumstances, however, the application of conventional Boolean relationship algorithms and weighting to the fault tree structure is insufficient to adequately describe or predict the relationships between Base Events, Intermediate Events, and the Top Event.

Moreover, in some circumstances the application of conventional relationship algorithms and weighting requires unwieldy and very complex fault tree structures to maintain the integrity of the representational aspect of the fault tree.

It would be desirable, therefore, to provide a method or system for making less subjective DF risk assessments.

It would also be desirable, therefore, to provide a method or system for describing the relationships between Base Events, Intermediate Events, and the Top Event of a fault tree more adequate to a comprehensive representation and allowing for a less complex fault tree which nonetheless maintains the integrity of the representation.

SUMMARY OF THE INVENTION

Provided are methods and systems for objective DF risk assessments.

Also provided are methods and systems for the analysis of fault trees using a novel system of valuation and evaluation.

The methods and systems may encompass one or both of two general steps. First, an analytical model for predicting DF at various levels is created. Second, values are assigned to the analytical model and those assigned values are refined.

The analytical model may be a fault tree analytical model (FTAM). The FTAM describes the various ways in which Root Causes may combine to cause Minor Effects and/or Primary Effects. Other type of analytical models may be used. For example multivariate models, neural networks or any other suitable type of analytical model. The model may be trainable based on any suitable training approach. For example, the model may be iteratively trained by comparison of a model output with a reference value.

The FTAM may then be populated with initial, provisional ranks and weights, and data may be collected to support that version.

The provisional model may then be applied to the data collected, thus resulting in further iterations of the model, which may then be deployed and fine-tuned. Fine-tuning may be done by comparison of the model to historical data and to ongoing project data.

The methods and systems may encompass primarily the combination of assigned values in concordance with evaluation tables.

The method may further involve refining such evaluation tables in light of empirical or historical information.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 3 is a diagram of other illustrative logic in accordance with the principles of the invention;

FIGS. 5-15 are diagrams showing the input and result table for various gates consistent with principles of the invention; and FIG. 16 is a diagram showing an input and result table of a modified (source-specific) gate consistent with principles of the invention.

DETAILED DESCRIPTION OF THE INVENTION

Figure 1:
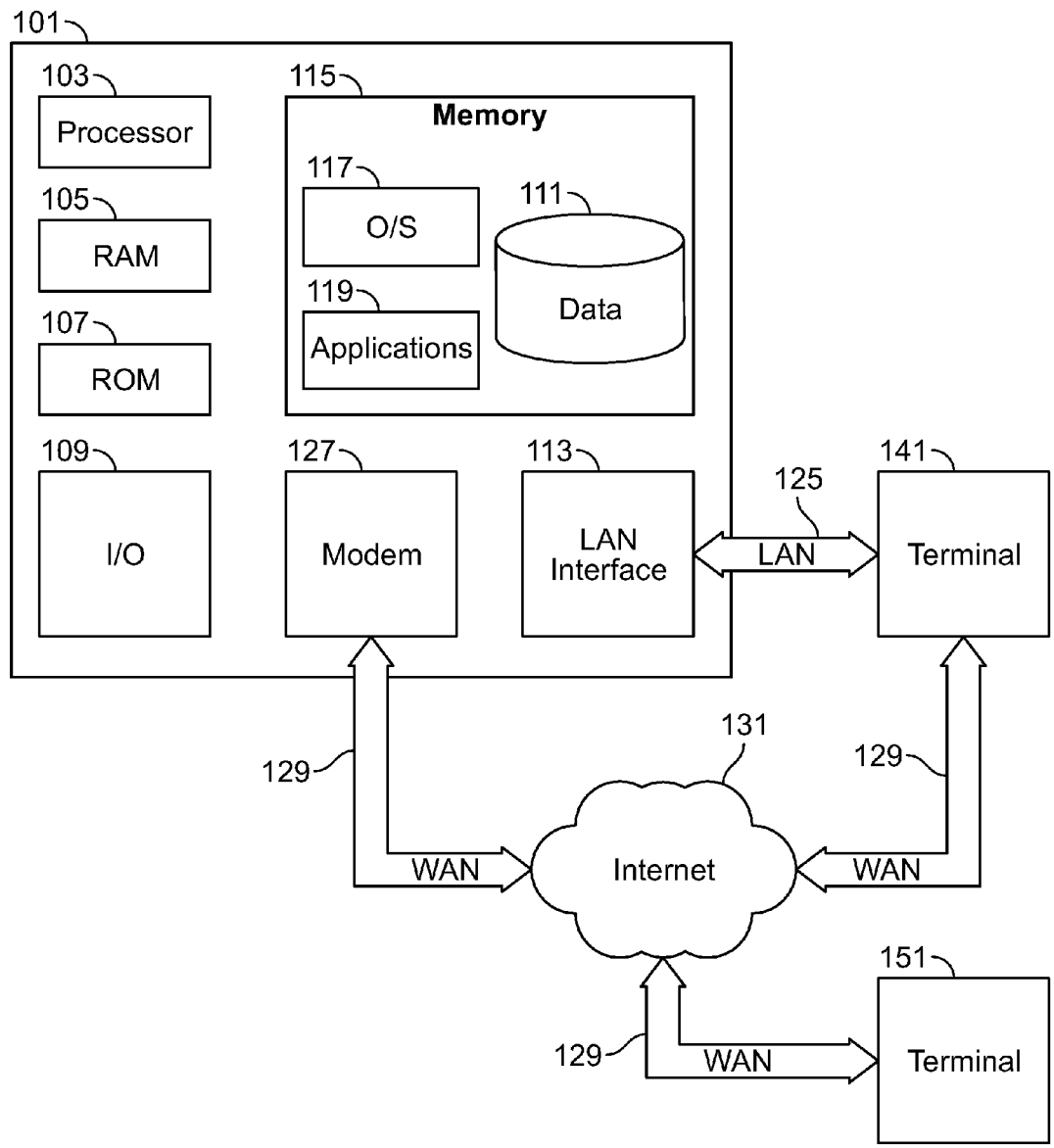
FIG. 1 shows a schematic diagram of apparatus that may be used in connection with the principles of the invention.

Methods and systems for objective DF risk assessments are provided.

Methods and systems for the analysis of fault trees using a novel system of valuation and evaluation are also provided.

As a first step, the methods and systems may proceed by creating an FTAM. The FTAM may model the causal relationships between Root Causes, Minor Effects, and Primary Effects.

The FTAM may include relationship algorithms reflecting the relationships between one or more Root Causes, one or more Minor Effects, and the Primary Effect. Where the FTAM demonstrates or reflects a relationship between any two events, those events can be said to be related to each other.

Root causes may be assigned probability values and the relationship algorithms are then evaluated to further assign probability values to the Minor Effects and Primary Effects included in the FTAM.

Where information about the probability value for one or more Root Causes is unavailable or incomplete, any given Minor Effect may be assigned a probability value independent of the missing information.

The FTAM itself may similarly be cast at an intermediate level, such that individual Root Causes are not represented but the Minor Effects which subsume those Root Causes are represented.

An FTAM may be comprehensive, or the FTAM may exclude certain types of ME or RC, such as human error, change coordination, and/or project execution failures.

The RCs and MEs chosen for the FTAM may be measurable events. For example the RCs or MEs may be susceptible to the determination of historical frequency of occurrence or probability of occurrence given evidence of other events.

In some embodiments, the FTAM may be built by beginning with one or more Primary Effects and methodically identifying the various pathways to the Primary Effects.

In some embodiments, the FTAM may be take the form demonstrated in the attached Appendix A, wherein the Root Causes are depicted in circles, the various MEs and Primary Effects are depicted in rectangles, and the mechanisms of probability aggregation are depicted by AND-gates, OR-gates, and INHIBIT-gates consistent with the other figures in this application and the conventions of fault tree analysis. Once the analytical model has been established, values may be assigned to the analytical model and those assigned values may be refined.

Initially, values may be assigned to the events of the model. In some embodiments, the initial values may not be available with respect to Root Causes, but only with respect to higher level failure modes such as Minor Effects.

Such assignment may be accomplished, for instance, by the examination of historical data or by interviewing individuals with subject-matter expertise or by reference to known methods for such assignment.

To the extent possible given the model and the available initial values, MEs may be derived by the application of the relationship algorithms reflected in the FTAM.

Relative initial ranks and weights may be assigned through Analytical Hierarchy Processes (AHPs) of the sort generally known to persons skilled in the art.

In one embodiment, the AHPs may involve first collecting initial data by setting measurement metrics and associated significance, applying weight to the metrics, assigning the weighted metrics to a prioritization matrix, systematically assigning individual project data to the appropriate metric level and then compositing the risk score by multiplying the metric weight by the assigned level for each metric.

Having assigned the initial values, refining the initial values may require collecting data to support the model and then refining the assigned values by formalizing and quantifying the values assigned.

In some embodiments, the data elements required may be identified and defined.

Data collection may be prioritized by identifying the minimal cut-set of the FTAM and calculating the Fussell-Vesely importance ratings.

Data collection may be used then to test the initial model established against historical data. Data collection may use a stratified, random sampling strategy or any other suitable approach.

Further, the FTAM may be further refined by resetting the weights established earlier to a neutral value and proceeding with AHPs that utilize the data sets acquired during data collection.

The model so developed may be tested against historical data and result sets. For instance, the event probabilities may be replaced with Boolean (0, 1) values based on whether or not the actual events occurred, and unknown occurrences can maintain the baseline probabilities established.

Running the model with those values will result in a probability of the Primary Effect. Probabilities from multiple historical runs may be compared to the actual occurrences of the Primary Effect helping to validate or refine the models.

In some embodiments, the initial or revised weight assigned to an element may be zero, effectively removing that element from the analysis.

In some embodiments, Bayesian logic may be employed to identify or validate already identified relationships between RCs or MEs within the model.

Rather than events within a fault tree being assigned traditional Boolean or probability values, some events within the fault tree may instead be assigned values corresponding to members of one or more assignment sets.

An assignment set may be well-ordered. For the purposes of this application, a well-ordered set is a set in which any non-empty subset includes a least member, and in which no two members are equal. The comparisons "least" and "equal" are made along a spectrum that may be chosen to comport with the analytical purposes of the FTAM.

The members of an assignment set may be qualitative with respect to the events to which they are assigned.

Qualitative, for the purposes of this application, means descriptive of some quality of the events that contributes to or detracts from the Top Event.

When an assignment set is defined to include only three members, the assignment of members to fault tree events may be called a psi-valuation or Ψ-valuation.

An assignment set may be defined to include (HIGH, MEDIUM, LOW); or (H, M, L). For purposes of this application, HIGH and H are used interchangeably, similarly MEDIUM and M are used interchangeably as are LOW and L.

Where an assignment set is defined to include (HIGH, MEDIUM, LOW), the assignment of members to fault tree events may be called an HML assignment or HML valuation. An HML valuation is a type of Ψ-valuation.

In some embodiments, the Top Event of a fault tree is considered a negative or undesirable outcome. In such a case, the HIGH value is generally assigned where the event in question is, in isolation, relatively highly likely to lead to the Top Event, while the LOW value is assigned where the event in question is, in isolation, relatively unlikely to lead to the Top Event. This may be termed a HIGH-is-Bad assignment.

For instance, if a fault tree Base Event is defined as "release size," then the in a situation where a larger release size would be more likely to lead to the Top Event of that fault tree—such as failure in the on-time and fully operational deployment of the release—then a large release would be associated with a HIGH value for that Base Event.

Further, an assignment set may be defined to include only two members.

Where an assignment set is defined to include only two members, the assignment of members to fault tree events may be called a YN-valuation.

Possible YN-valuations may be where the assignment set is defined to include (Yes, No) or (Y, N).

Under the HIGH-is-Bad assignment scheme, the Y value may be assigned where the event in question, in isolation, contributes to the Top Event, which is to say makes the Top Event more likely to occur.

Conventional fault trees are constructed using known logic gates such as AND-gates and OR-gates to combine the Boolean or probability values of the various Base and Intermediate Events.

In some embodiments of the invention a fault tree may instead combine some of the various Base Events and Intermediate Events through a series of defined gates.

The definition of the gates may include an expected number of Ψ-valued inputs, an expected number of YN-valued inputs, and a table indicating what outcome or result should proceed from the presentation to the gate of various combinations of possible input values.

The definition of the results for any gate will intrinsically describe the type of valuation to which those results will be susceptible.

In some embodiments each element in an FTAM may be assigned either a Ψ-valuation or a YN-valuation. The set that is the union of those two sets contains five members and is not well-ordered.

In some embodiments, the union of those two sets may be closed under the operation of the various defined gates.

Analysis of an FTAM in circumstances where each element of the FTAM may be assigned either a Ψ-valuation or a YN-valuation and where the five-member union of those sets is not well ordered and is closed under the operation of the gates in the FTAM may be termed "5-value logic."

Some gates by which Base Event and Intermediate Event values may be combined may include the gates described in FIG. 5, discussed below.

In some embodiments, analysis of historical or observed data as applied to the fault tree may allow for data mining.

Such data mining may result in refinements to the result tables of particular gates.

Said refinements may include adding a weight element to the gates, or may include simply modifying the result table of particular gates to reflect the results of the data mining.

Such modified gates may be termed "source-specific," in that the result tables applicable to those gates are specific to the sources of the input data.

For simplicity, modifying any of the predefined gates in order to create source-specific gates may be termed adjusting the "weight" of the gate or of the FTAM elements combined within that gate.

Embodiments of the invention will now be described with reference to the drawings and the Appendix.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by device 101, such as an operating system 117, applications 119, and an associated database 121. Alternatively, some or all of device 101 computer executable instructions may be embodied in hardware or firmware (not shown). As described in detail below, database 111 may provide storage for FTAMs, relationship algorithms, values of elements of FTAMs, weights and ranks of elements of FTAMs, and any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, applications 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, blackberry, or any other suitable device for storing, transmitting and/or transporting relevant information.

Relationship algorithms, values of elements of FTAMs, weights and ranks of elements of FTAMs, intermediate values necessary in the evaluation of relationship algorithms, and any other suitable information may be stored in memory 115.

One or more of applications 119 may include one or more algorithms that may be used to perform the creation of FTAMs, the evaluation of relationship algorithms, the assignment or determination of values of elements of FTAMs, the determination or revision of weights and ranks of elements of FTAMs, and any other suitable tasks related to the creation, analysis, or processing of FTAMs.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2A:
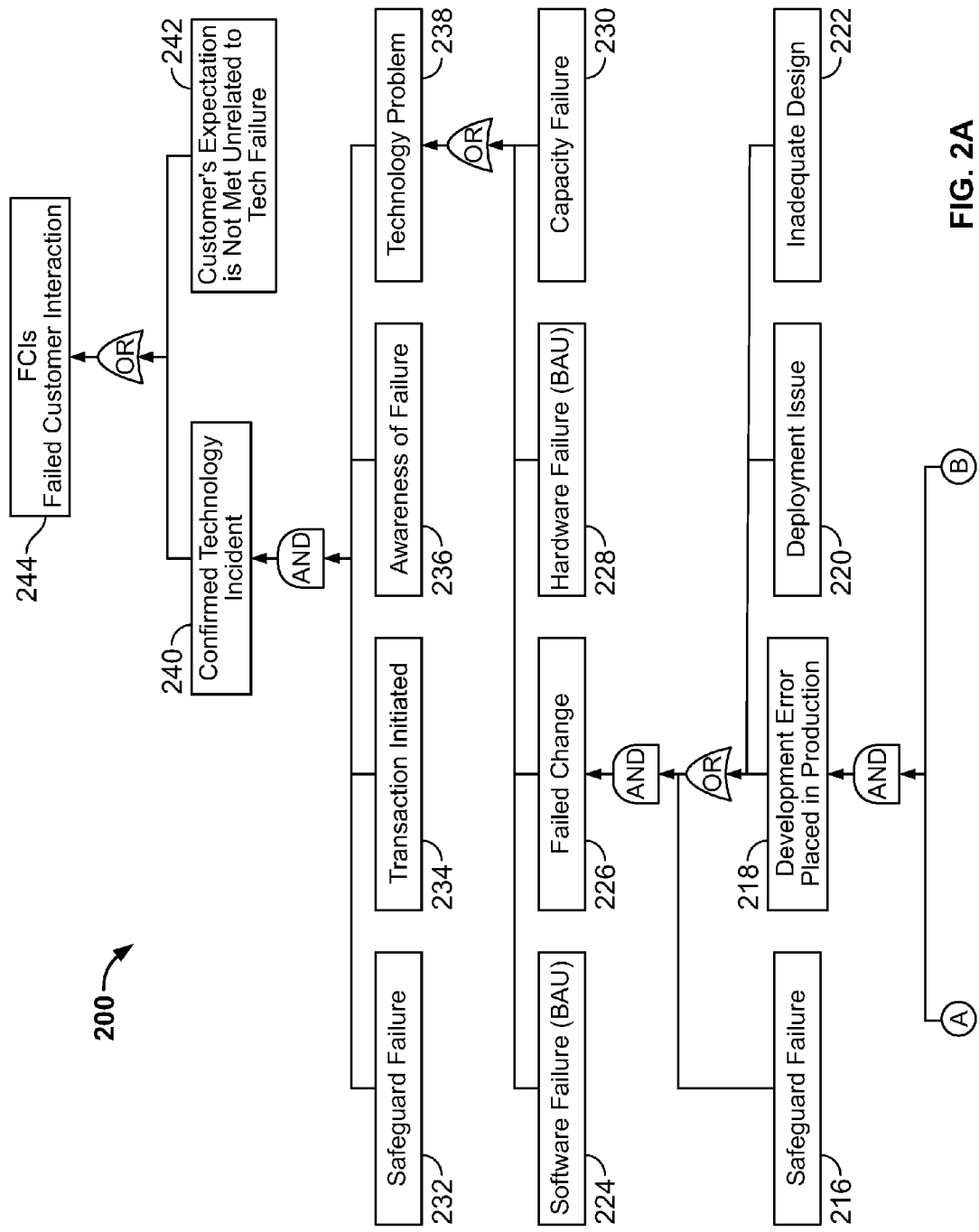
FIG. 2 is a diagram of illustrative logic in accordance with the principles of the invention.

FIG. 2 is a diagram of illustrative logic of an Intermediate Level FTAM 200.

The Intermediate Level FTAM 200 describes a set of failure paths to the Top Event FCI 244. The FTAM 200 demonstrates the relationships between Minor Effects and the Primary Effect.

Intermediate Level FTAM 200 is designated as "intermediate" because it does not demonstrate or describe the failure paths to the finest granularity that would be the case if Root Causes were included. Instead the Intermediate Level FTAM describes those paths in terms only or mostly of Minor Effects.

The occurrence or likelihood of the Primary Effect (or Top Event) "Failed Customer Interaction" 244 of the FTAM is represented in a rectangle. All other rectangles (202-242) represent the occurrence or probability of the Minor Effect there named. Probabilities may be expressed as decimal values between 0 and 1.

The Minor Effects are combined mathematically by combinations of AND-gates such as 250, OR-gates such as 252, and INHIBIT-gates such as 254.

An AND-gate such as 250 combines the probabilities involved by multiplying them. That is, if $P_{(a)}$ is the probability of a and $P_{(b)}$ is the probability of b, then the probability of the two events combined through an AND-gate is the probability of a AND b and is given by: $P_{(a\ AND\ b)} = P_{(a)} * P_{(b)}$.

An OR-gate such as 252 combines the probabilities by adding them. That is, if $P_{(a)}$ is the probability of a and $P_{(b)}$ is the probability of b, then the probability of the two events combined through an OR-gate is the probability of a OR b and is given by $P_{(a\ OR\ b)} = (P_{(a)} + P_{(b)})$.

An INHIBIT-gate such as 254 is a special case of the AND-gate and combines probabilities in the same fashion as an AND-gate. The INHIBIT-gate differs from the AND-gate only in that the input so combined is conditionally necessary, though not directly causal. The conditional input is often depicted in an oval, attaching to the INHIBIT-gate from the side.

Describing the Intermediate Level FTAM 200 from the Top Event down, FCI 244 can occur if a Customer's expectation is not met in a manner unrelated to a technical failure 242 or if there occurs a Confirmed Technology Incident 240.

A Confirmed Technology Incident 240 can occur if there is a confluence of all four of the following Minor Effects: a Safeguard Failure 232, an Initiated Transaction 234, Awareness of the Failure 236, and a Technology Problem 238.

A Technology Problem 238 can occur if any of the following Minor Effects occurs: a Software Failure 224, a Failed Change 226, a Hardware Failure 228, or a Capacity Failure 230.

The description of the Minor Effects which lead to a Failed Change 226 is slightly more convoluted. It requires that both a Safeguard Failure 216 occurs and any of the following Minor Effects: a Development Error Placed in Production 218, a Deployment Issue 220, and Inadequate Design 222.

The Intermediate Level FTAM 200 further describes the Minor Effects which underlie the occurrence of a Development Error Placed in Production 218.

The occurrence of a Development Error Placed in Production 218 requires the confluence of, on the one hand, a Defect (having been) Created in the Application 212 or a Defect Created in the Physical Environment 214 and, on the other hand, a Defect Deferred 208 or a Defect Missed in Testing 210.

Finally, a Defect Created in the Application 212 can occur if deployment affects a High Risk System 202 and there is an inadequacy in Design Quality 204 and there is a high level of Design Complexity 206.

As such, the Intermediate Level FTAM 200 relates the likelihood or occurrence of any or all of the various Minor Effects noted to each other and to the Primary Effect FCI 244.

FIG. 3 is a diagram of Minor Effect "Deployment Issue" with some Root Causes shown 300.

Within the context of the FTAM depicted in FIG. 3, the existence of a Deployment Issue 302 is the Top Event. Deployment Issue 302 is congruent to Deployment Issue 220, designated a Minor Effect in FIG. 2.

The FTAM of FIG. 3 demonstrates the relationship between some Root Causes and a Deployment Issue 302.

Parsing the FTAM of FIG. 3 from the "bottom" up, The combination through an OR-gate such as 352 of three Root Causes results in a Packaging/Build Error 306. Those three Root Causes are: the provision of Poor Packaging/Build Requirements 310, the Failure of Packaging/Build Tool 312, and Human Error 314.

The combination through an OR-gate 352 of the Minor Effects of a Migration Issue 304, a Packaging/Build Error 306, and an Exceeded Planned Deployment Duration 308 results in the occurrence of the Top Event, a Deployment Issue 302.

As depicted in the FTAM of FIG. 2, the Top Event there, a Failed Customer Interaction 244 is related to the Deployment Issue 220. Thus the Failed Customer Interaction 244 is shown to be related to, for instance, the Root Cause Packaging/Build Tool Failure 312.

In one embodiment, the illustrative logic for a customer impact predictive FTAM is shown in Appendix A, where the Primary Effect is a Failed Customer Interaction (FCI). Describing the various relationships described therein in narrative form would be impractical and unnecessary.

In a manner similar to that described in FIGS. 2 and 3, Appendix A demonstrates the relationship between the Top Event therein—a Failed Customer Interaction—and approximately 228 Root Causes and a number of Minor Effects.

Figure 4A:
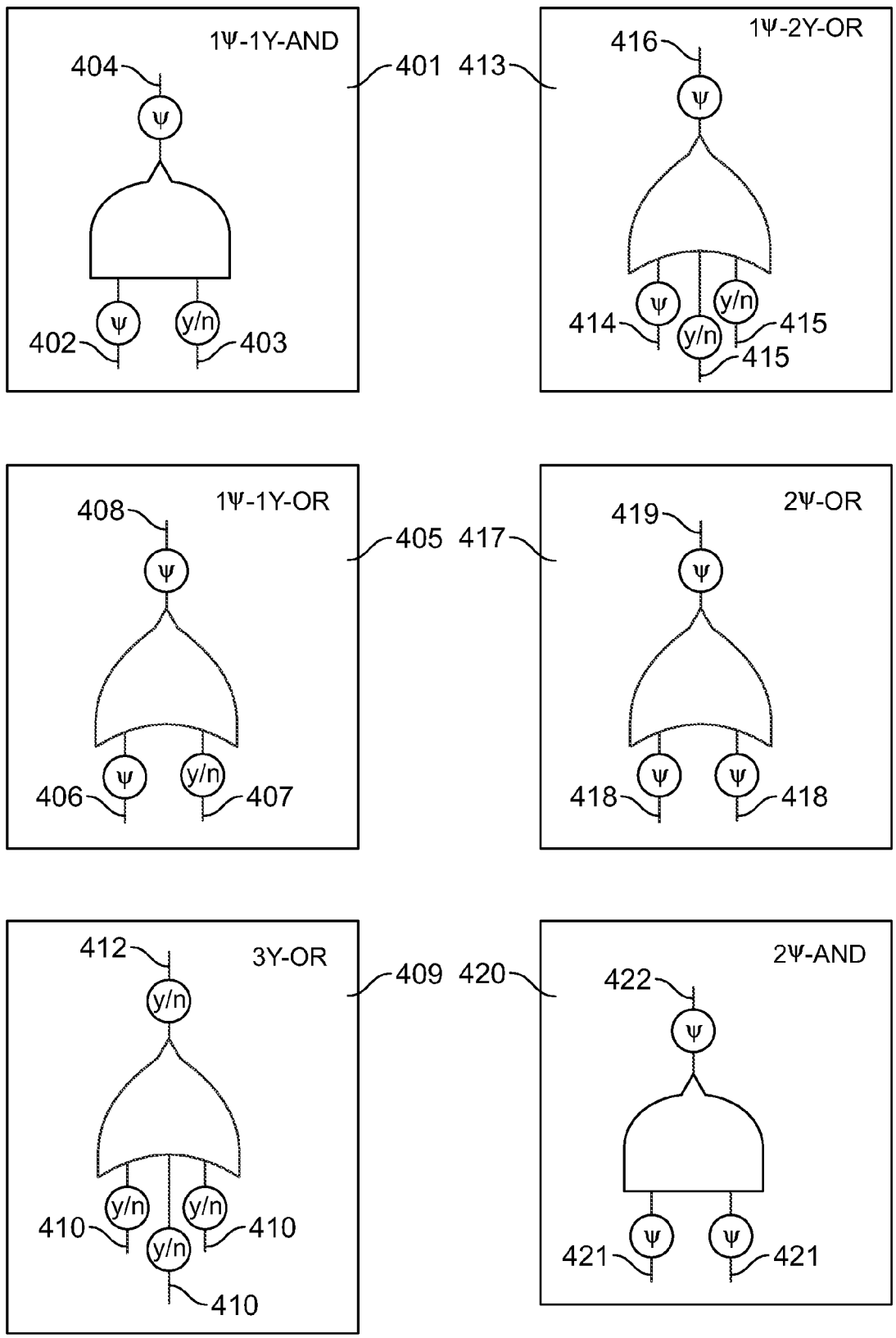
FIG. 4 is a diagram showing the graphical representations of some of the gates consistent with principles of the invention.
Figure 4B:
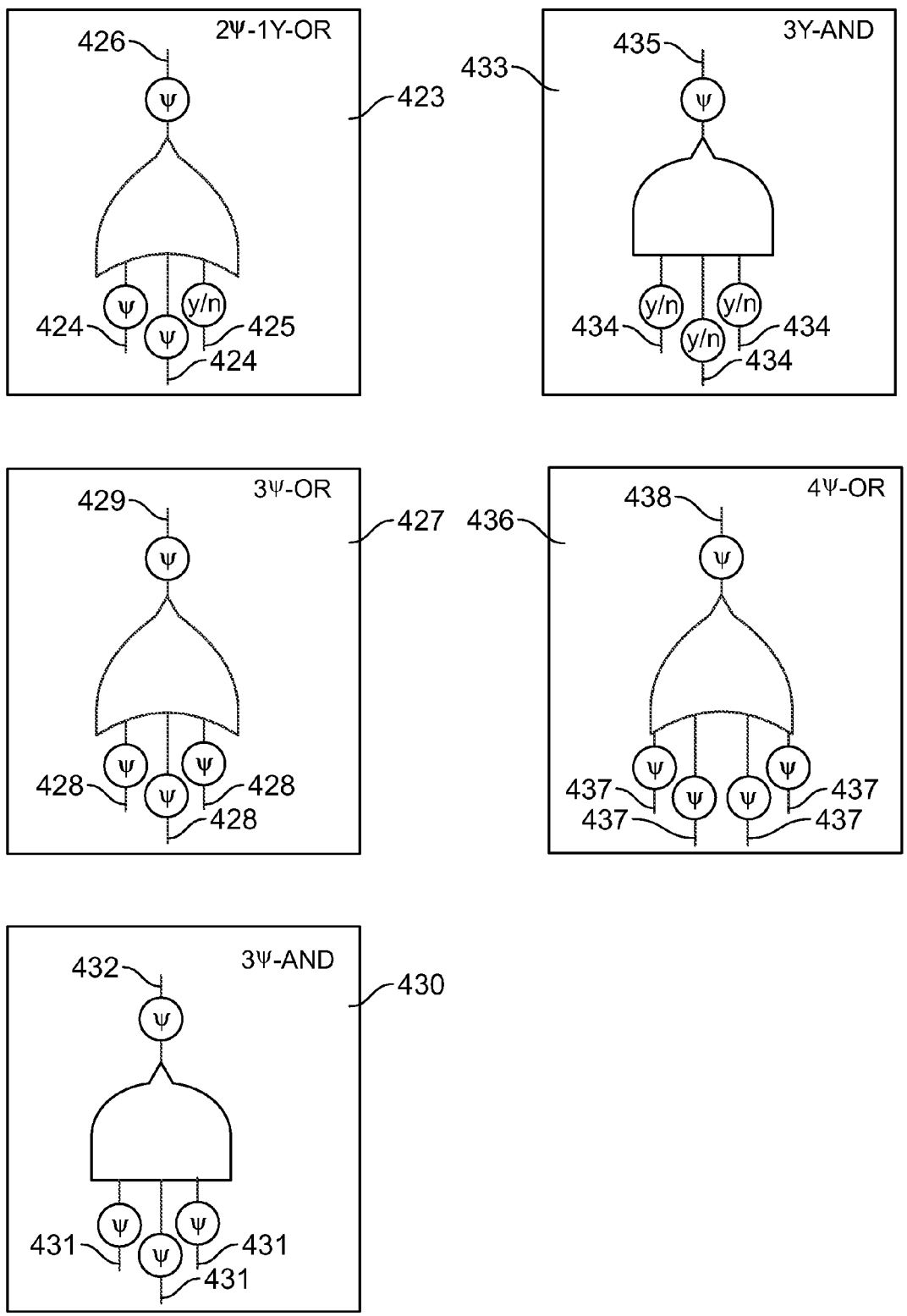

FIG. 4 is a diagram showing graphical representations of some of the gates consistent with principles of the invention.

Gates are generally described by the type of input values they anticipate and a term describing in a general sense the mechanism of that gate's combination of the inputs.

For instance, the 1Ψ-1Y-AND gate 401 shows one Ψ-valued input 402 and one YN valuation input 403 and, by combining them in a manner somewhat comparable to a traditional Boolean AND-gate, produces a Ψ-valued result 404.

Similarly, the 1Ψ-1Y-OR gate 405 shows one Ψ-valued input 406 and one YN valuation input 407, and by combining them in a manner somewhat comparable to a traditional Boolean OR-gate, produces a Ψ-valued result 408

The 3Y-OR gate 409 shows three YN-valued inputs 410 and by combining them in a manner comparable to a traditional Boolean OR-gate, produces a YN-valued result 412.

The 1Ψ-2Y-OR gate 413 shows one Ψ-valued input 414 and two YN-valued inputs 415, and produces a Ψ-valued result 416.

The 2Ψ-OR gate 417 shows two Ψ-valued input 418 and produces a Ψ-valued result 419.

The 2Ψ-AND gate 420 shows two Ψ-valued input 421 and produces a Ψ-valued result 422.

The 2Ψ-1Y-OR gate 423 shows two Ψ-valued inputs 424 and one YN-valued input 425, and produces a Ψ-valued result 426.

The 3Ψ-OR gate 427 shows three Ψ-valued inputs 428 and produces a Ψ-valued result 429.

The 3Ψ-AND gate 430 shows three Ψ-valued inputs 431 and produces a Ψ-valued result 432.

The 3Y-AND gate 433 shows three YN-valued inputs 434 and produces a Ψ-valued result 435.

The 4Ψ-OR gate 436 shows four Ψ-valued inputs 437 and produces a Ψ-valued result 438.

Similarly, the 2Ψ-1Y-OR gate 405 shows two Ψ-valued inputs 406 and 407, and one YN valuation input 408 combined in a manner similar to a traditional Boolean OR-gate 409.

The 3Y-OR gate 410 shows three YN valuation inputs 411, 412, 413, all three combined in a manner similar to a traditional Boolean OR-gate 414.

FIG. 5 is a diagram showing the input and result table for a 1Ψ-1Y-AND gate 501.

Where the Ψ-valued input is High and the YN-valued input is Y 502, the gate result will be High 503.

Where the Ψ-valued input is Medium and the YN-valued input is N 504, the gate result will be Medium 505.

Where the Ψ-valued input is Low and the YN-valued input is N 506, the gate result will be Low 507.

FIG. 6 is a diagram showing the input and result table for a 1Ψ-1Y-OR gate 601.

Wherever the YN-valued input is Y 602, the gate result will be High 603.

Wherever the Ψ-valued input is High 604, the gate result will similarly be High 605.

Where the Ψ-valued input is Medium and the YN-valued input is N 606, the gate result will be Medium 607.

Where the Ψ-valued input is Low and the YN-valued input is N 608, the gate result will be Medium 609.

FIG. 7 is a diagram showing the input and result table for a 3Y-OR gate 701.

Where all of the YN-valued inputs is N 702, the gate result is N 703.

Where any of the YN-valued inputs is Y 704 the gate result is Y 705.

Figure 8:
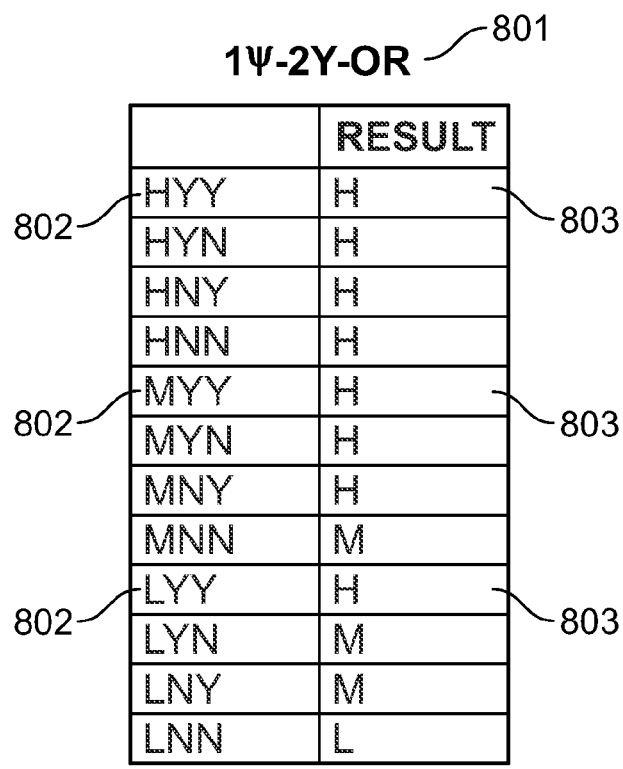

FIG. 8 is a diagram showing the input and result table for a 1Ψ-2Y-OR gate 801.

Wherever both of the YN-valued inputs are Y 802, the gate result is High 803.

Figure 9:
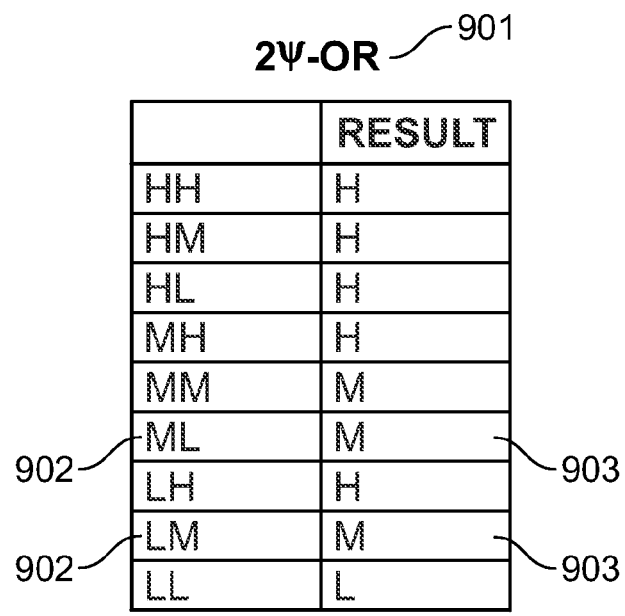

FIG. 9 is a diagram showing the input and result table for a 2Ψ-OR gate 901.

Where either of the two Ψ-valued inputs is Medium and the other is Low 902, the gate result is Medium 903.

FIG. 10 is a diagram showing the input and result table for a 2Ψ-AND gate 1001.

Where either of the two Ψ-valued inputs is Medium and the other is Low 1002, the gate result is Low 1003.

FIG. 11 is a diagram showing the input and result table for a 2Ψ-1Y-OR gate 1101.

Where both of the Ψ-valued inputs is High and the YN-valued input is Yes 1102, the gate result will be High 1103.

Where one of the Ψ-valued inputs is High, the other is Low, and the Y-valued input is No 1104, the gate result will be High 1105.

Where one of the Ψ-valued inputs is Medium, the other is Low, and the Y-valued input is No 1106, the gate result will be Medium 1107.

FIG. 12 is a diagram showing the input and result table for a 3Ψ-OR gate 1201.

Where any of the Ψ-valued inputs is High 1202, the gate result will be High 1203.

Where any of the Ψ-valued inputs is Medium and none are High 1204, the gate result will be Medium 1205.

Where none of the Ψ-valued inputs is High or Medium 1206, the gate result will be Low 1207.

FIG. 13 is a diagram showing the input and result table for a 3Ψ-AND gate 1301.

Where all three Ψ-valued inputs are High 1302, the gate result will be High 1303.

Where any two of the Ψ-valued inputs are High and the third is Low 1304, the gate result will be Medium 1305.

Where any one of the Ψ-valued inputs is High, any other one is Medium, and any third one is Low 1306, the gate result will be Medium 1307.

FIG. 14 is a diagram showing the input and result table for a 3Y-AND gate 1401.

Where all three of the YN-valued inputs is Yes 1402, the gate result will be High 1403.

Where any two (and only two) of the YN-valued inputs is Yes 1404, the gate result will be Medium 1405.

Where only one of the YN-valued inputs is Yes 1406, or where none of the YN-valued inputs is Yes 1407, the gate result will be Low 1408.

Figure 15:
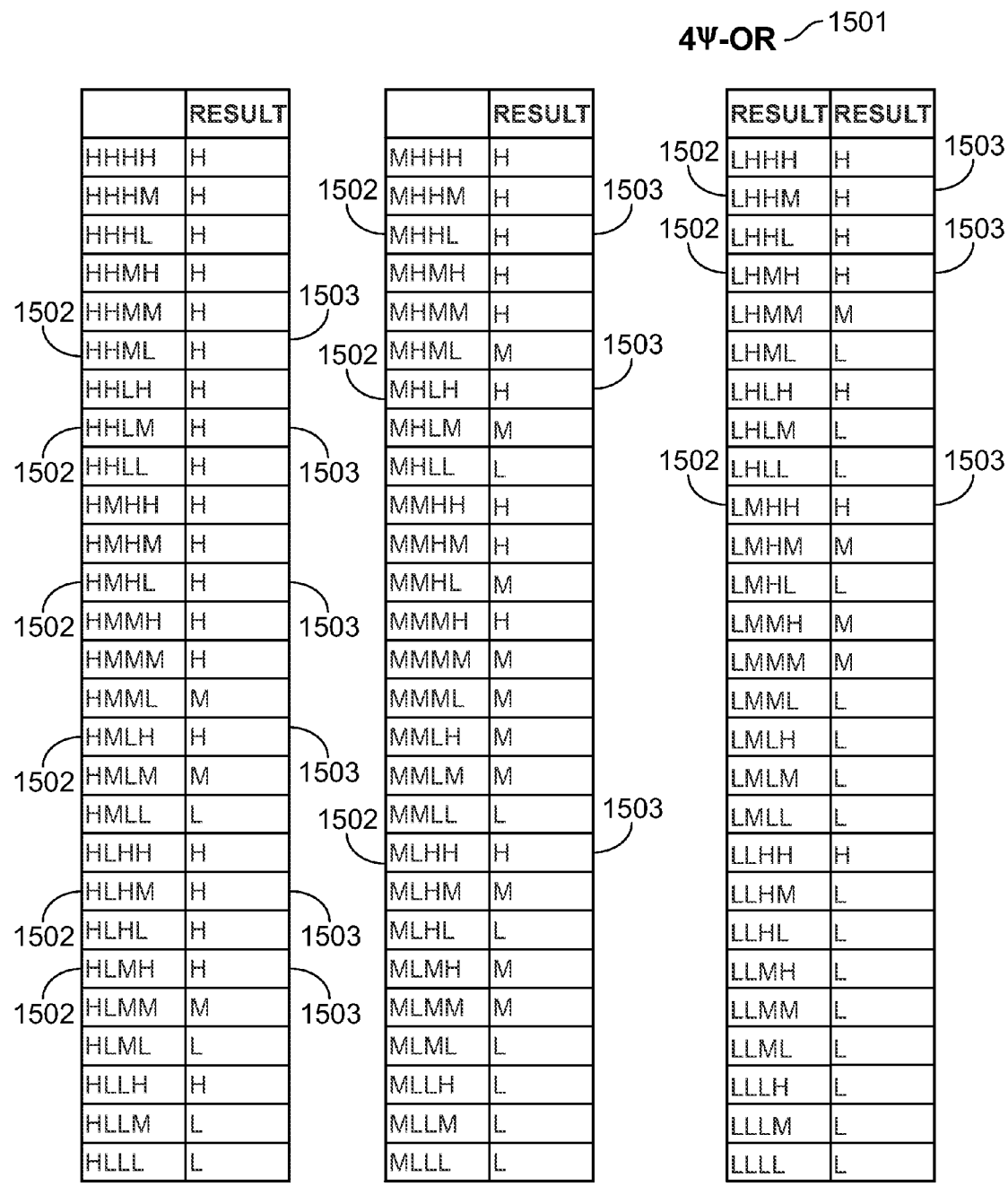
Figure 17A:
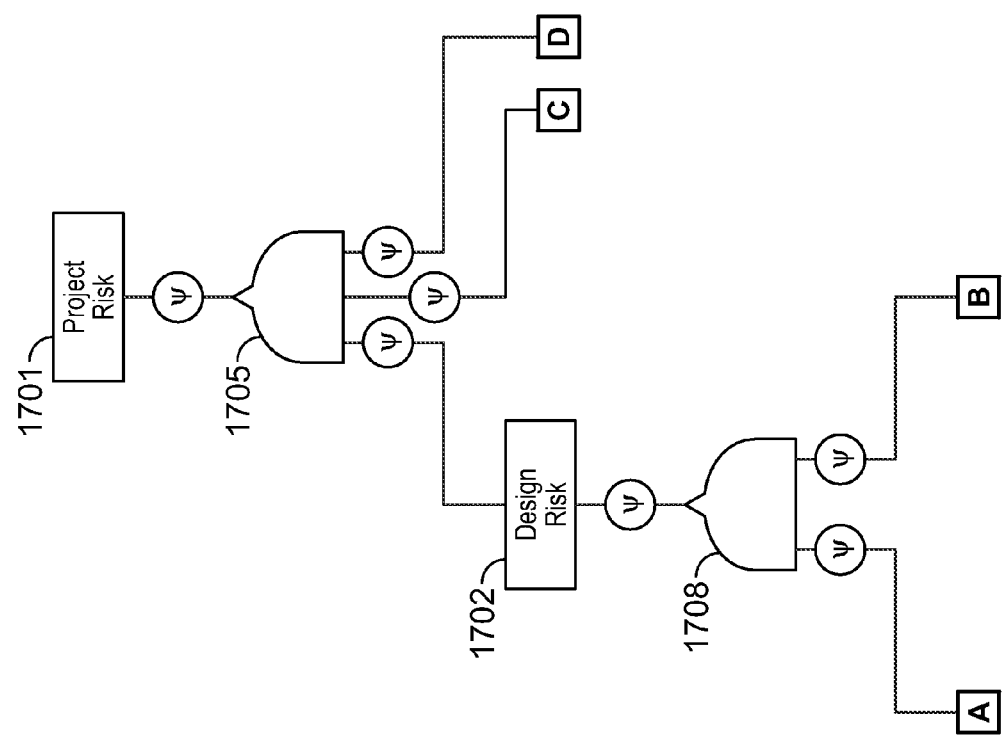
FIG. 17 is a diagram showing a FTAM in which Project Risk is the Top Event. In some embodiments, Project Risk may be correlative to a Deployment Failure.
Figure 17B:
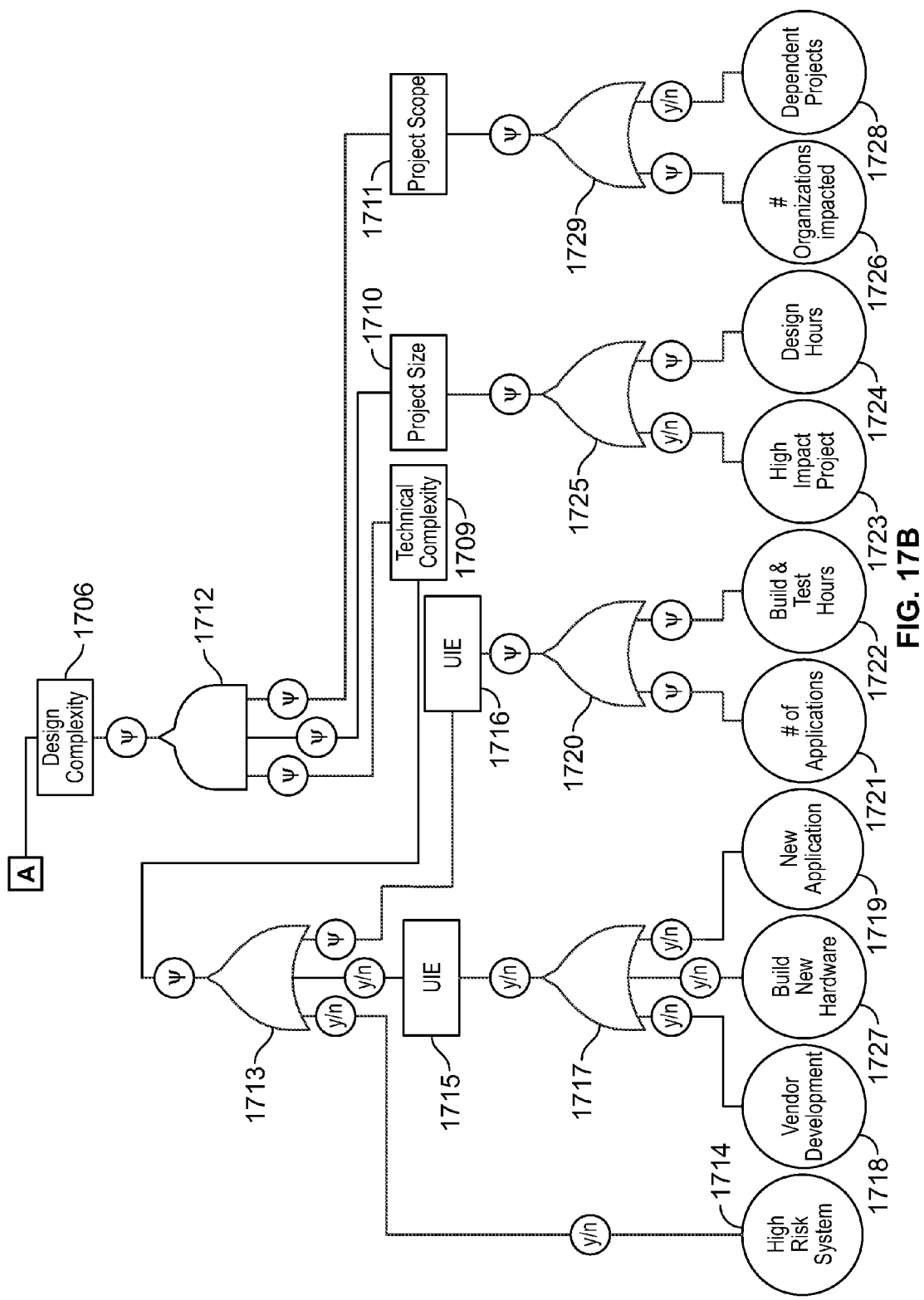
Figure 17C:
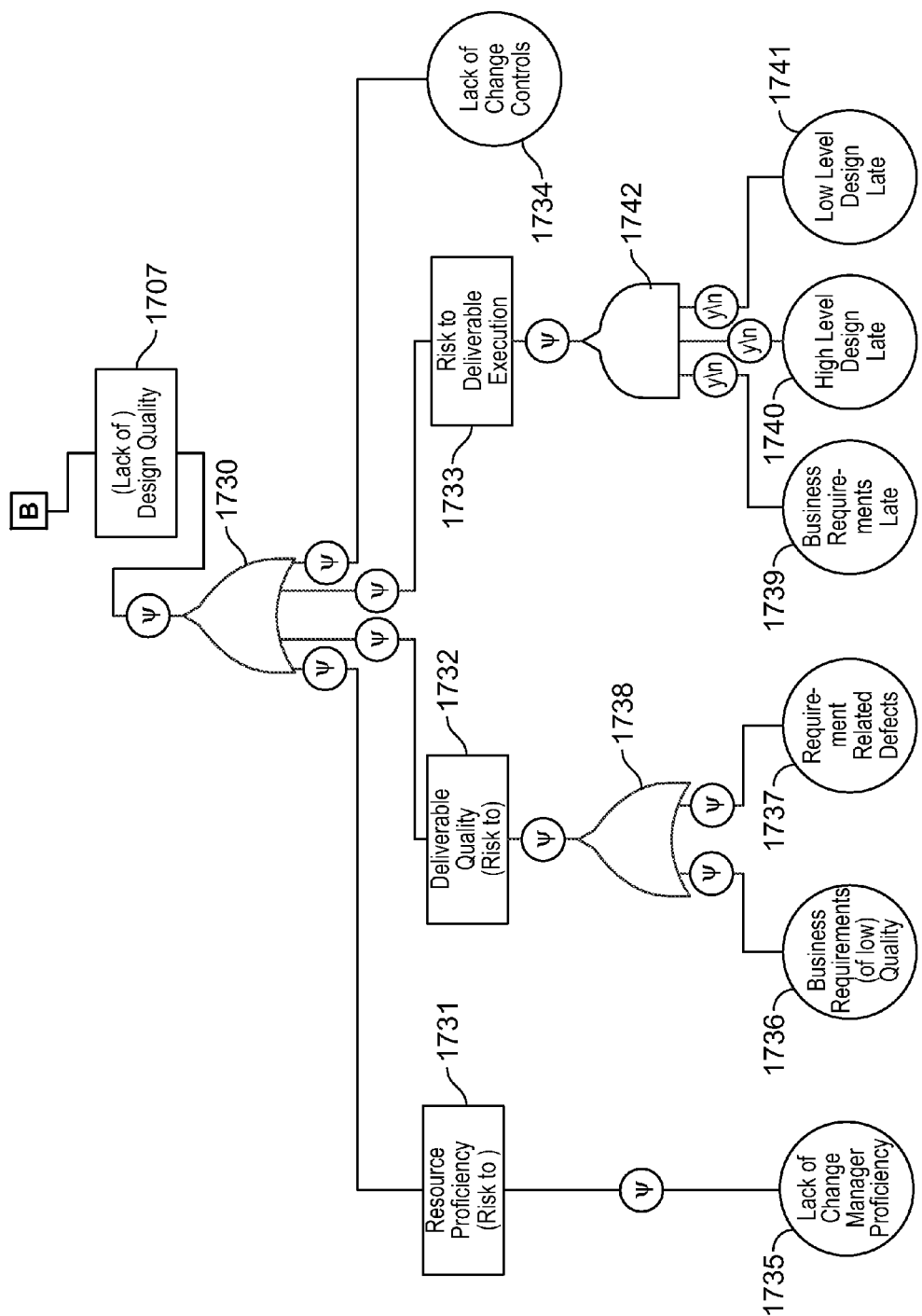
Figure 17D:
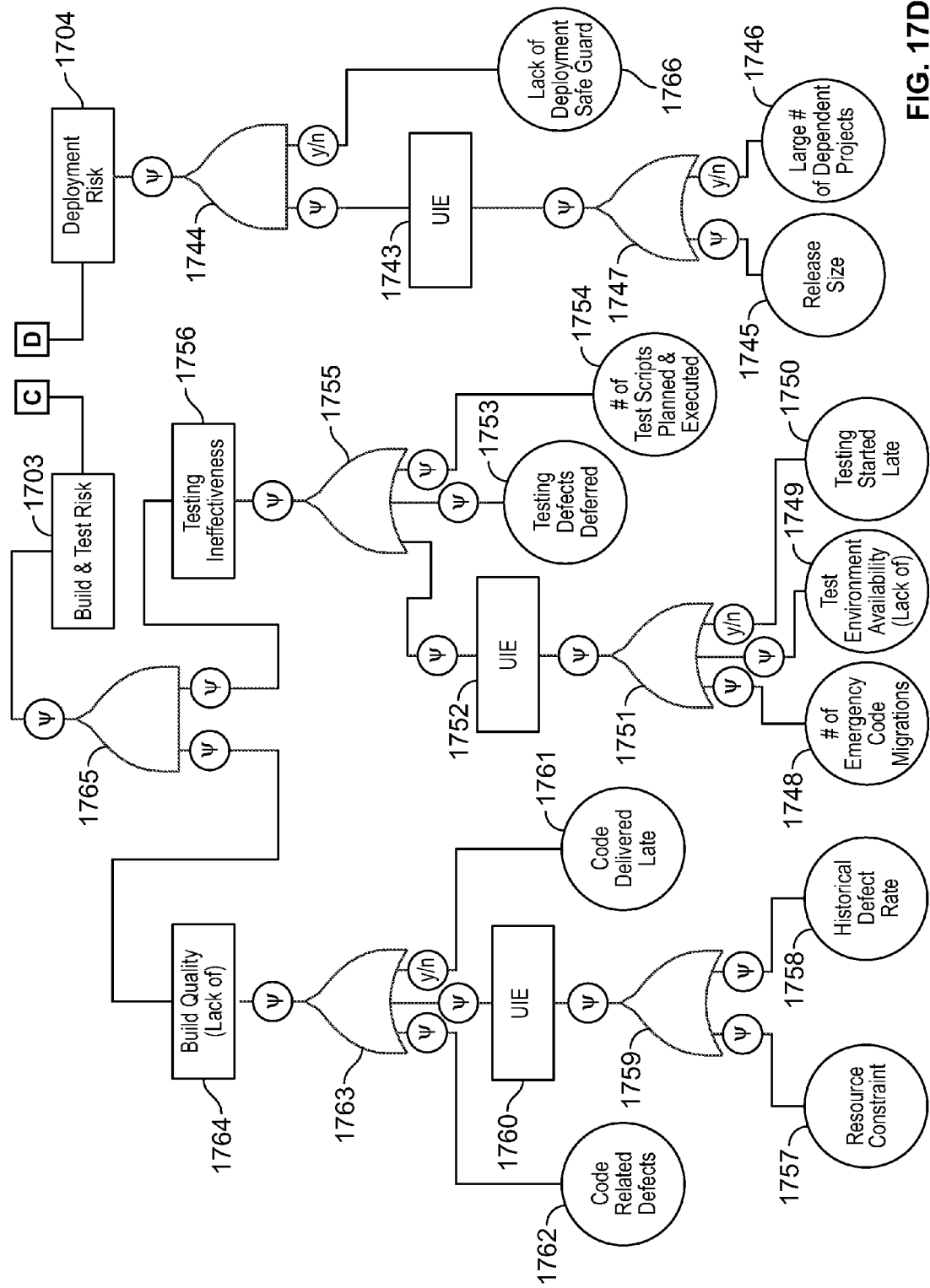

FIG. 15 is a diagram showing the input and result table for a 4Ψ-OR gate 1501.

Where, for instance, of the four Ψ-valued inputs, two are High, one is Medium and one is Low 1502, the gate result will be High 1503.

FIG. 16 is a diagram showing an input and result table of a modified (source-specific) 3Ψ-AND gate 1601.

The three different Ψ-valued inputs to a 3Ψ-AND gate may, after data mining and analysis, be specific to certain sources within a fault tree.

For instance, the three Ψ-valued inputs may be "Design Risk," "Build & Test Risk," and "Deployment Risk." Those three factors may, in some embodiments, be elements in a fault tree where Project Risk is the Top Event, as demonstrated in FIG. 17.

As represented in FIG. 16, the first column of Ψ-valued inputs 1602 may correspond to the "Design Risk" element, while the second column 1603 may correspond to the "Build & Test Risk" element and the third column 1604 may correspond to the "Deployment Risk" element.

In some combinations, where one of the Ψ-valued inputs is High, one is Medium, and one is Low 1605, the gate result may be Medium 1606.

However, in other combinations, with the same distribution of Ψ-valued inputs 1607, the gate result may be Low 1608.

The source-specific 3Ψ-AND gate results are different from the standard 3Ψ-AND gate results in a number of instances 1609.

FIG. 17 is a diagram showing an FTAM in which Project Risk 1701 is the Top Event. Project Risk may be correlative to a Deployment Failure.

Each element of the FTAM of FIG. 17 may be susceptible to either a Ψ-valuation or a YN-valuation, and the gates are defined to combine those elements.

The FTAM of FIG. 17 describes the relationship between some Root Causes, some Intermediate Causes, and Project Risk 1701 in terms of 5-value logic.

Project Risk 1701 is the result of the combination of Design Risk 1702, Build & Test Risk 1703, and Deployment Risk 1704, as combined through a 3Ψ-AND gate 1705.

The 3Ψ-AND gate 1705 may be identical in some respects to the 3Ψ-AND gate 430 in FIG. 4.

Design Risk 1702 is the result of the combination of Design Complexity 1706 and (Lack of) Design Quality 1707, through a 2Ψ-AND gate 1708, which may be identical in some respects to the 2Ψ-AND gate 420.

(Lack of) Design Quality 1707 is so named in order to maintain adherence to the HIGH-is-Bad assignment scheme, such that a HIGH value will, in isolation, contribute to the Top Event.

Technical Complexity 1709, Project Size 1710, and Project Scope 1711 combine through a 3Ψ-AND gate 1712 to establish Design Complexity 1706.

Technical Complexity 1709 is established by the combination through a 1Ψ-2Y-OR gate 1713 (which may be similar to 1Ψ-2Y-OR gate 413) of Root Cause High Risk System 1714, Unnamed Intermediate Event ("UIE") 1715 and UIE 1716.

UIE 1715 is established by the combination through a 3Y-OR gate 1717 (compare 3Y-OR gate 409) of three Root Causes: Vendor Development 1718, Build New Hardware 1727, and New Application 1719.

UIE 1716 is established by the combination through a 2Ψ-OR gate 1720 of Root Cause Number of Applications 1721 and Root Cause Build and Test Hours 1722.

Root Causes High Impact Project 1723 and Design Hours 1724 combine through a 1Ψ-1Y-OR gate 1725 to establish Project Size 1710. 1Ψ-1Y-OR gate 1725 may be identical in some respects to 1Ψ-1Y-OR gate 405.

Root Causes Number of Organizations Impacted 1726 and (Existence of) Dependent Projects 1728 combine through a 1Ψ-1Y-OR gate 1729 to establish Project Scope 1711. 1Ψ-1Y-OR gate 1729 may be identical in some respects to 1Ψ-1Y-OR gate 405.

Similarly, (Lack of) Design Quality 1707 is established by the combination through a 4Ψ-OR gate 1730 of three Intermediate Events, namely (Risk to) Resource Proficiency 1731, (Risk to) Deliverable Quality 1732, (Risk to) Deliverable Execution 1733, and the Root Cause (Lack of) Change Controls 1734.

Root Cause Lack of Change Manager Proficiency 1735 is shown as establishing Risk to Resource Proficiency 1731.

Risk to Deliverable Quality 1732 is established through the combination of Lack of Quality in Business Requirements 1736 and Requirement Related Defects 1737 through a 2Ψ-OR gate 1738, which may be identical in some respects to the 2Ψ-OR gate 417 of FIG. 4.

Risk to Deliverable Execution 1733 is established by the combination through a 3Y-AND gate 1742 of Late Business Requirements 1739, Late High-Level Design 1740, and Late Low-Level Design 1741.

Turning to Deployment Risk 1704, that element is established by the combination of an UIE 1743 and the Lack of a Deployment Safeguard 1766 through a 1Ψ-1Y-AND gate 1744.

The UIE 1743 is itself established by the combination through a 1Ψ-1Y-OR gate 1747 or Release Size 1745 and Large Number of Dependent Projects 1746.

Describing some aspects of the FTAM of FIG. 17 from the "bottom" up, Root Causes Number of Emergency Code Migrations 1748, Lack of Test Environment Availability 1749, and Testing Started Late 1749 combine through a 2Ψ-1Y-OR gate 1755 (which may be identical in some respects to 2Ψ-1Y-OR gate 423) to establish UIE 1752.

UIE 1752 combines with Deferred Testing Defects 1753 and Number of Test Scripts Planned and Executed 1754 through 3Ψ-OR gate 1755, which may be identical in some respects to 3Ψ-OR gate 427, to establish Intermediate Event Testing Ineffectiveness 1756.

Similarly, Resource Constraint 1757 and Historical Defect Rate 1758, both Root Causes, combine through a 2Ψ-OR gate 1759, which may be identical in some respects to the 2Ψ-OR gate 417 in FIG. 4, to establish UIE 1760.

In turn, UIE 1760 combines with Code Related Defects 1762 and Code Delivered Late 1761, both Root Causes, through a 2Ψ-1Y-OR gate 1763 to establish Intermediate Event (Lack of) Build Quality 1764.

Lack of Build Quality 1764 is so termed so as to accommodate the HIGH-is-Bad assignment scheme.

Testing Ineffectiveness 1756 and Lack of Build Quality 1764. Combine through a 2Ψ-AND gate 1765 to establish Build and Test Risk 1703.

2Ψ-AND gate 1765 may be identical in some respects to 2Ψ-AND gate 420 in FIG. 4.

Systems or methods for objective DF risk assessments are therefore provided. Also, methods and systems for the analysis of fault trees using a novel system of valuation and evaluation are provided. Persons skilled in the art will appreciate that the present invention can be practiced by other than the described embodiments, which are presented for purposes of illustration rather than of limitation, and that the present invention is limited only by the claims that follow.

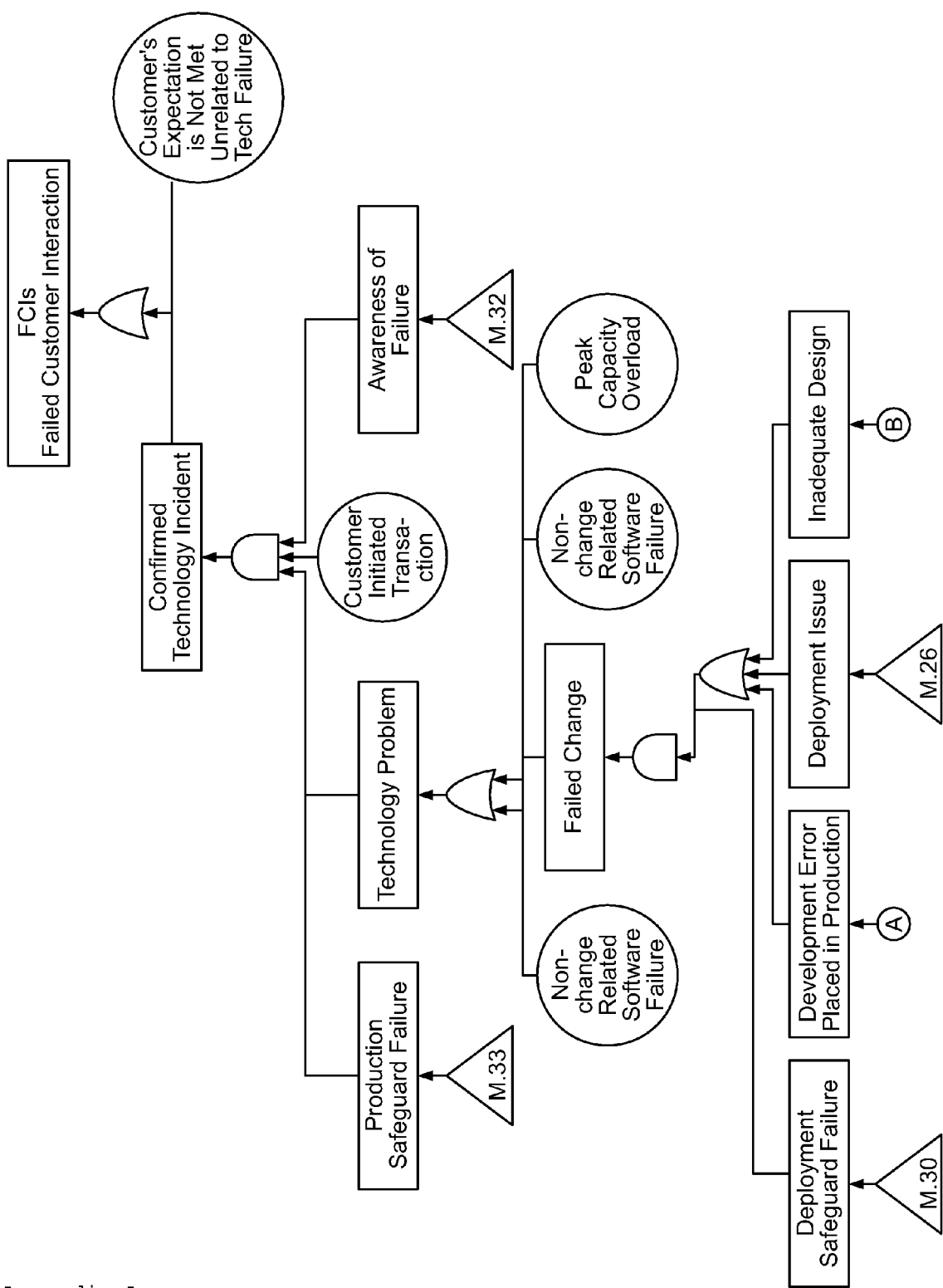
Appendix A

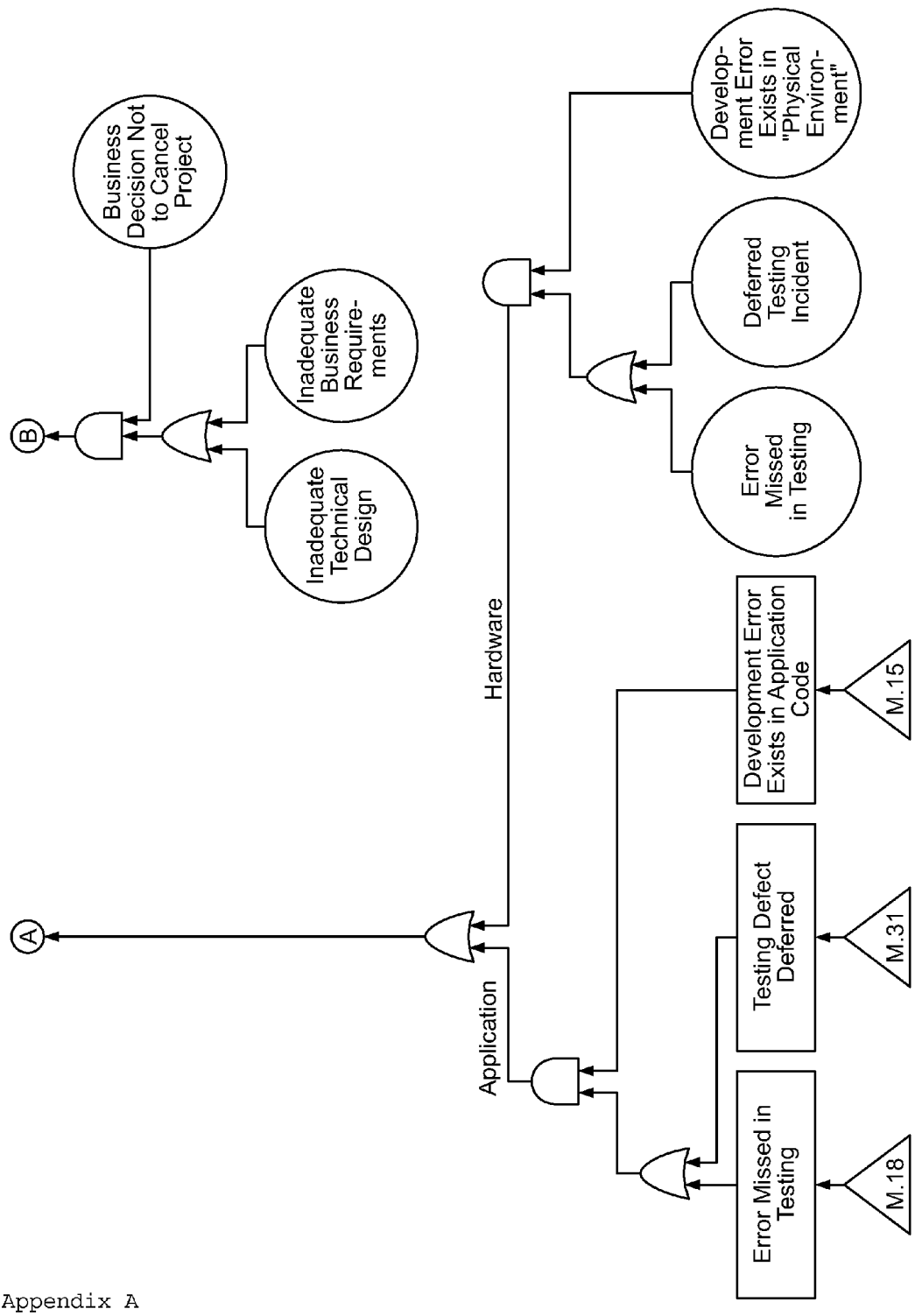
Appendix A

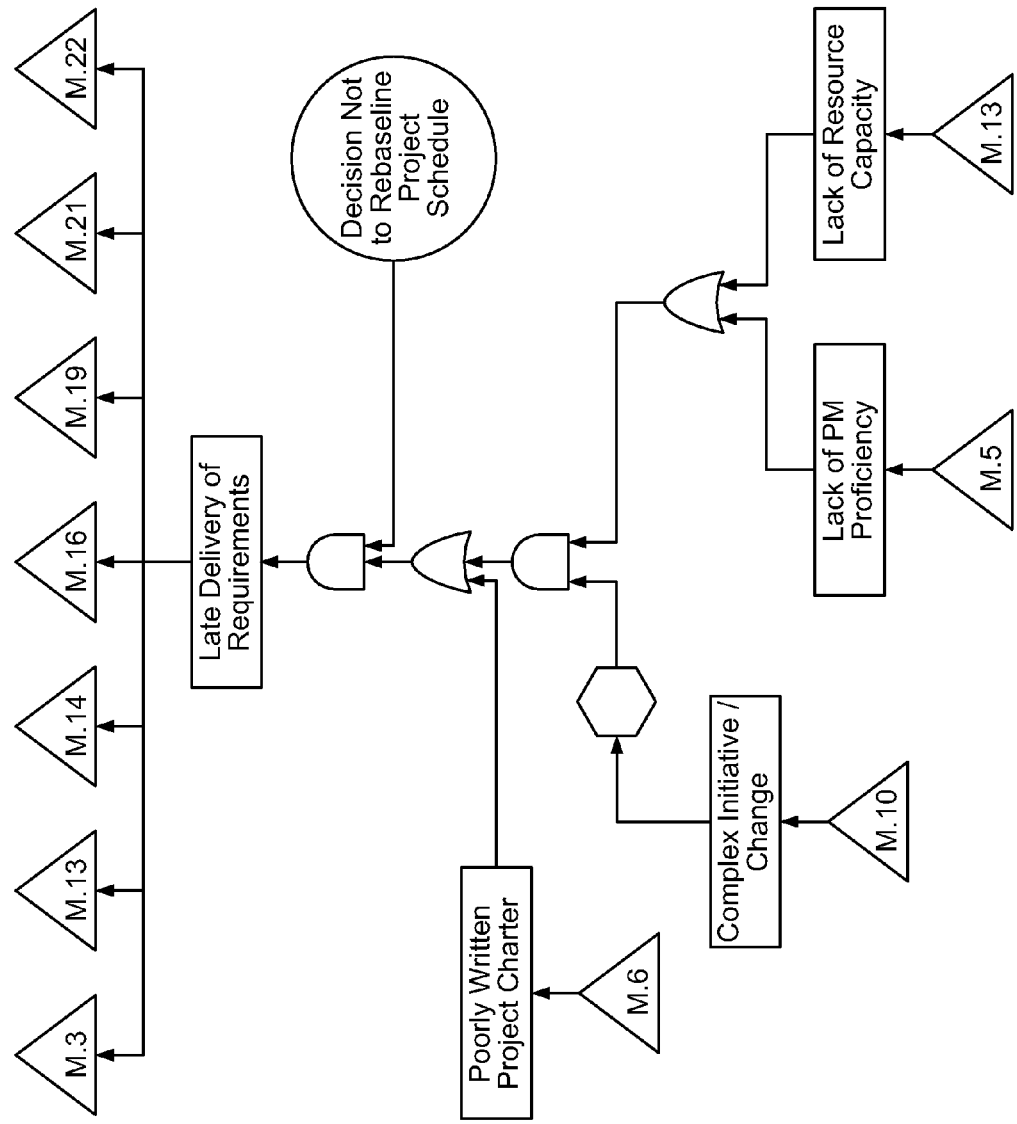
Appendix A

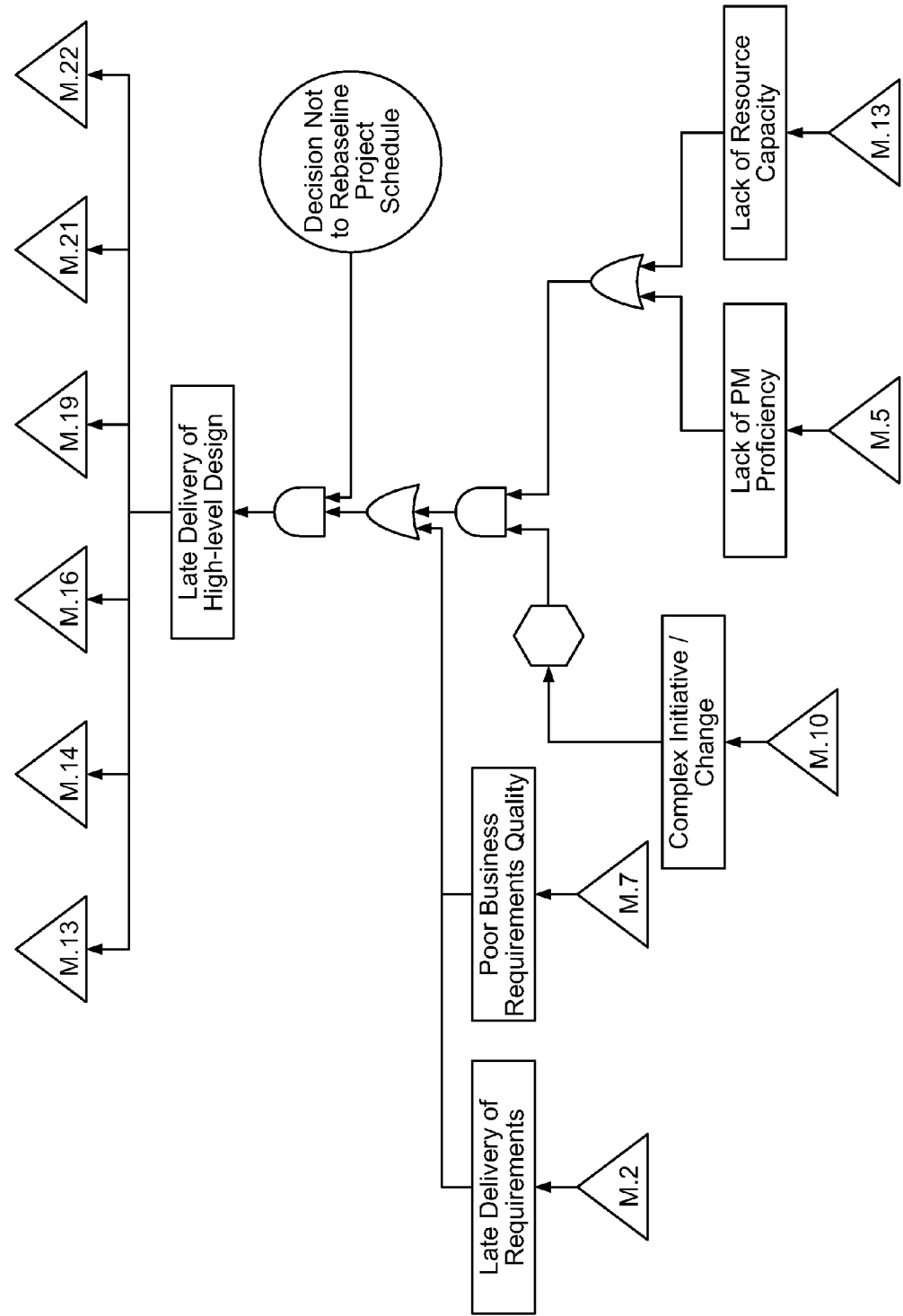
Appendix A

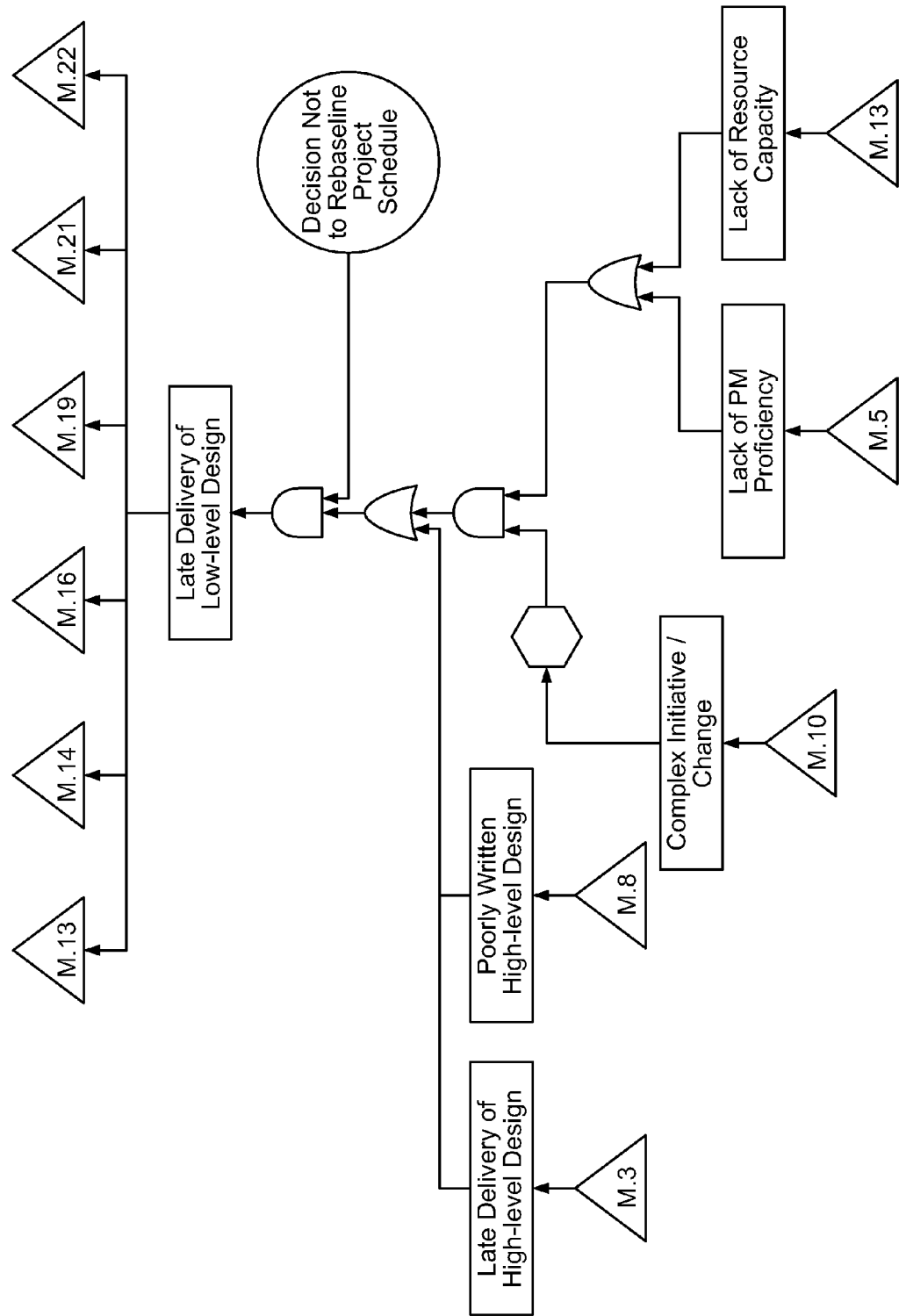
Appendix A

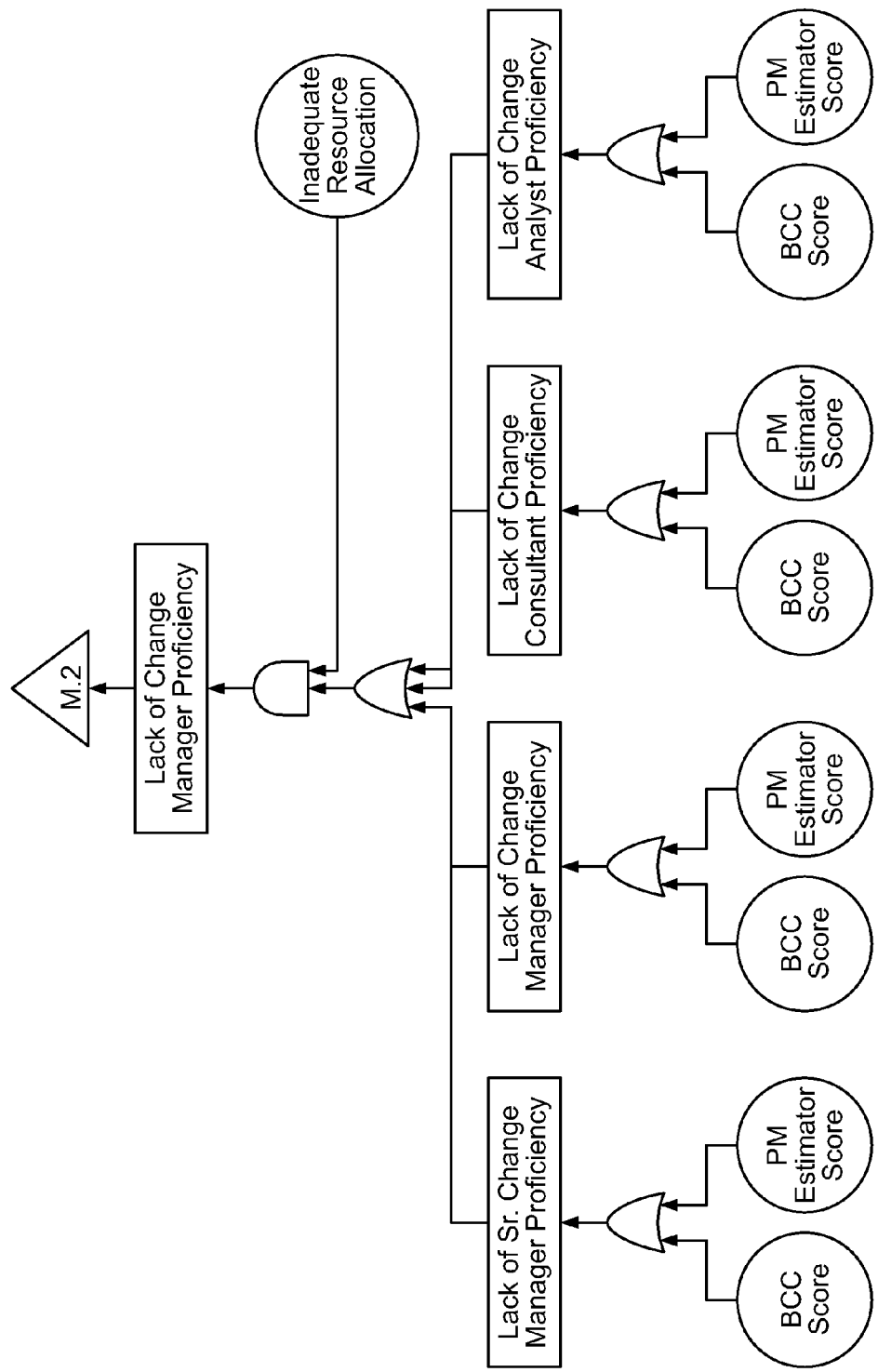
Appendix A

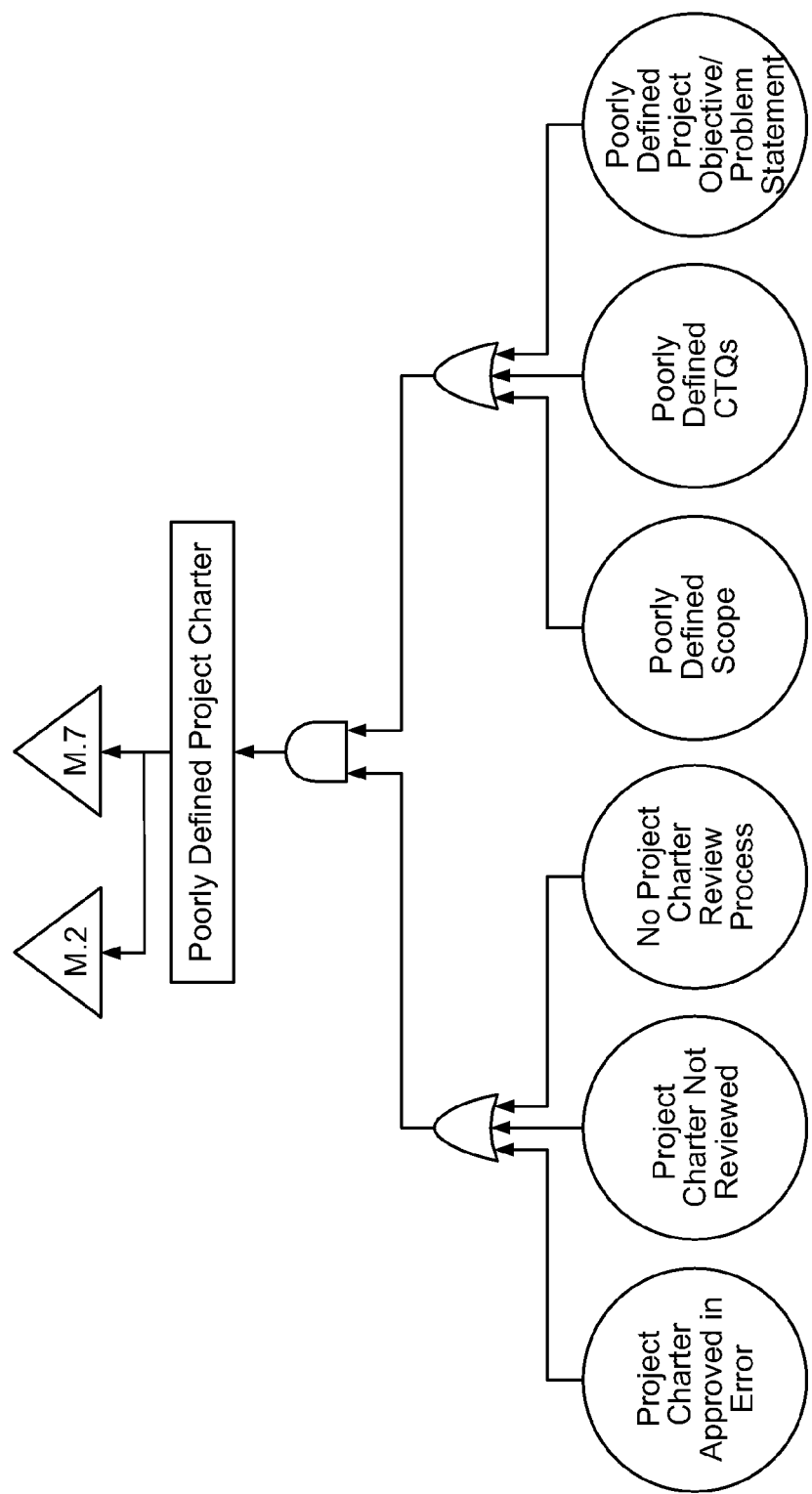
Appendix A

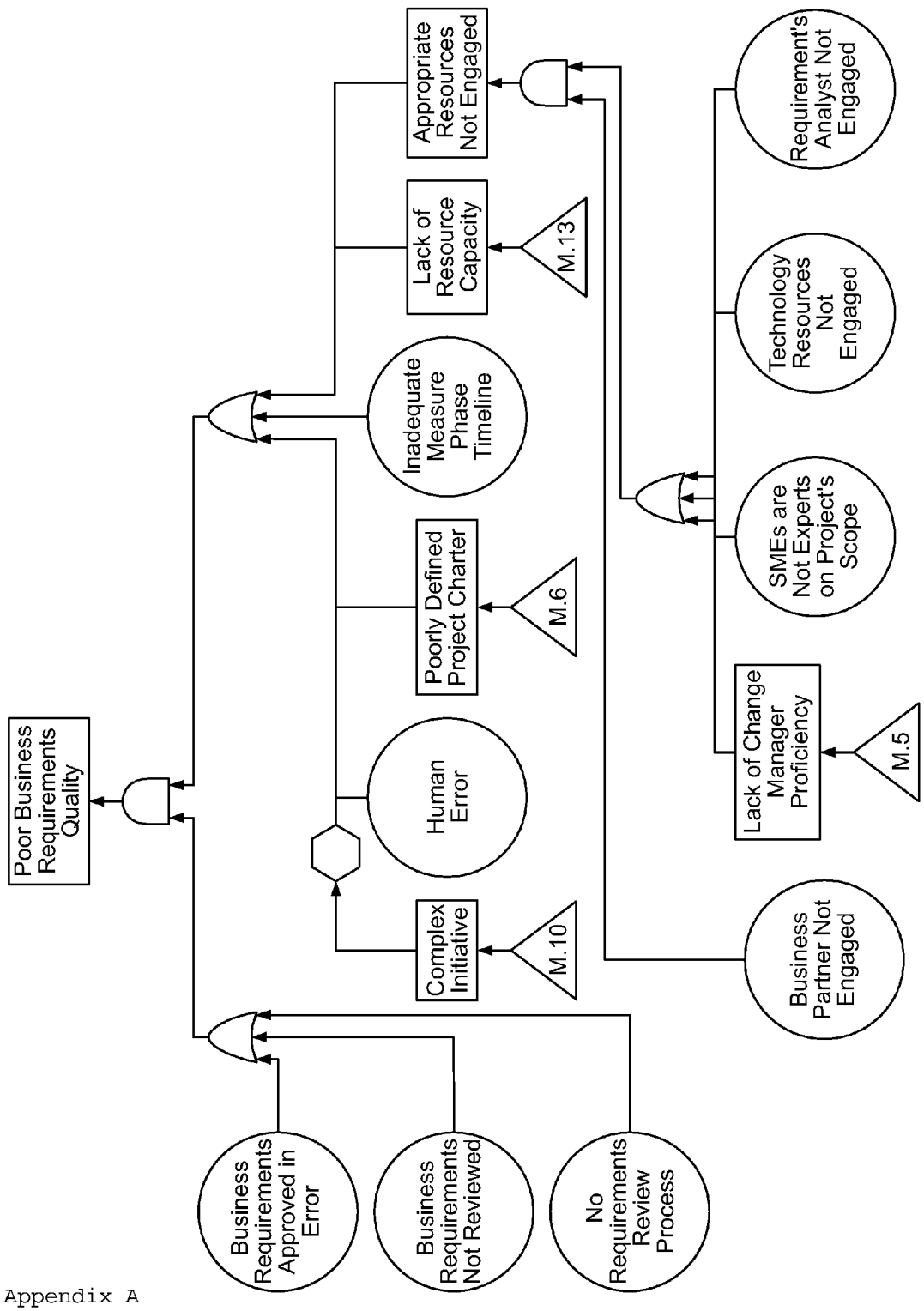
Appendix A

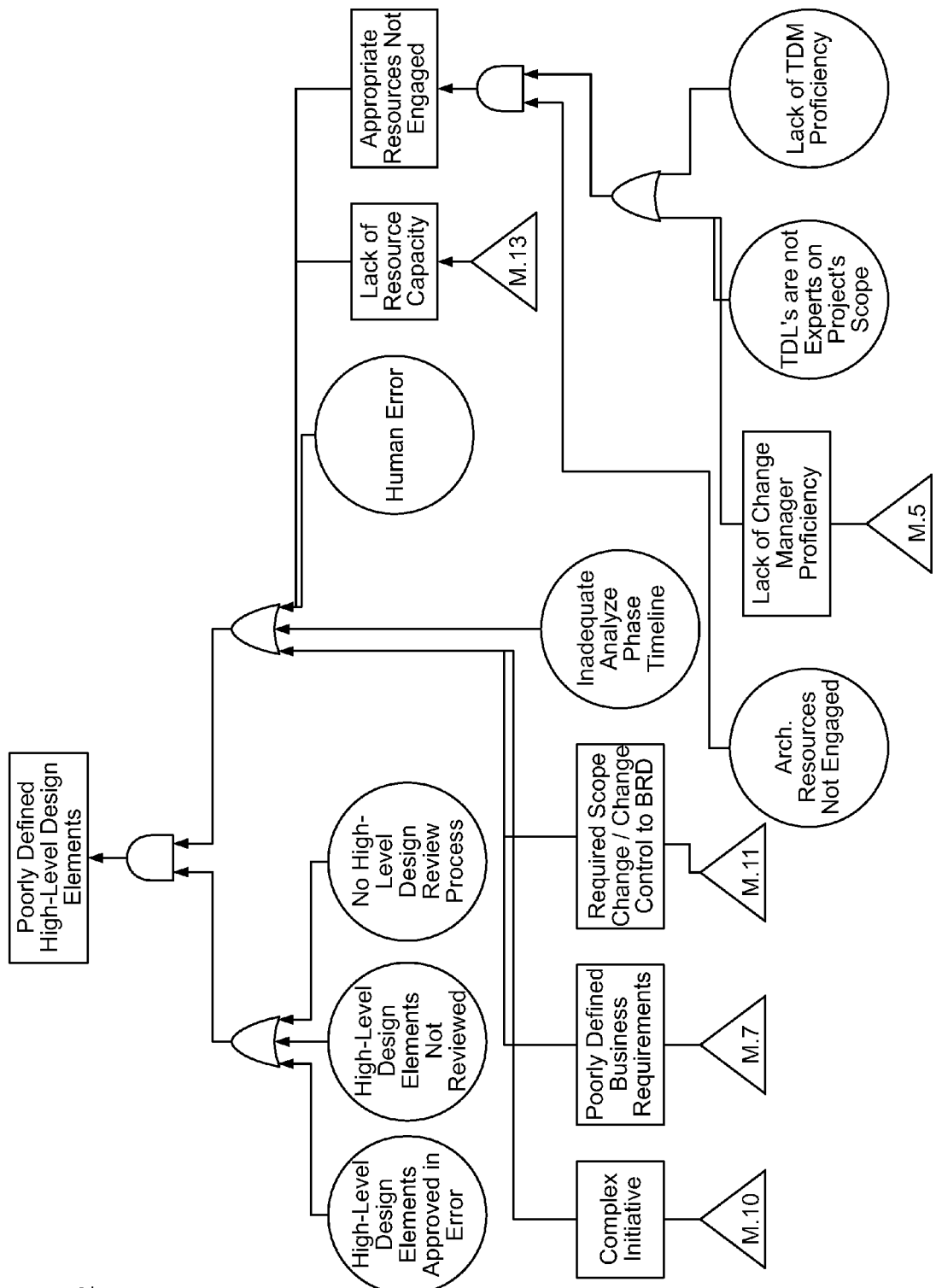
Appendix A

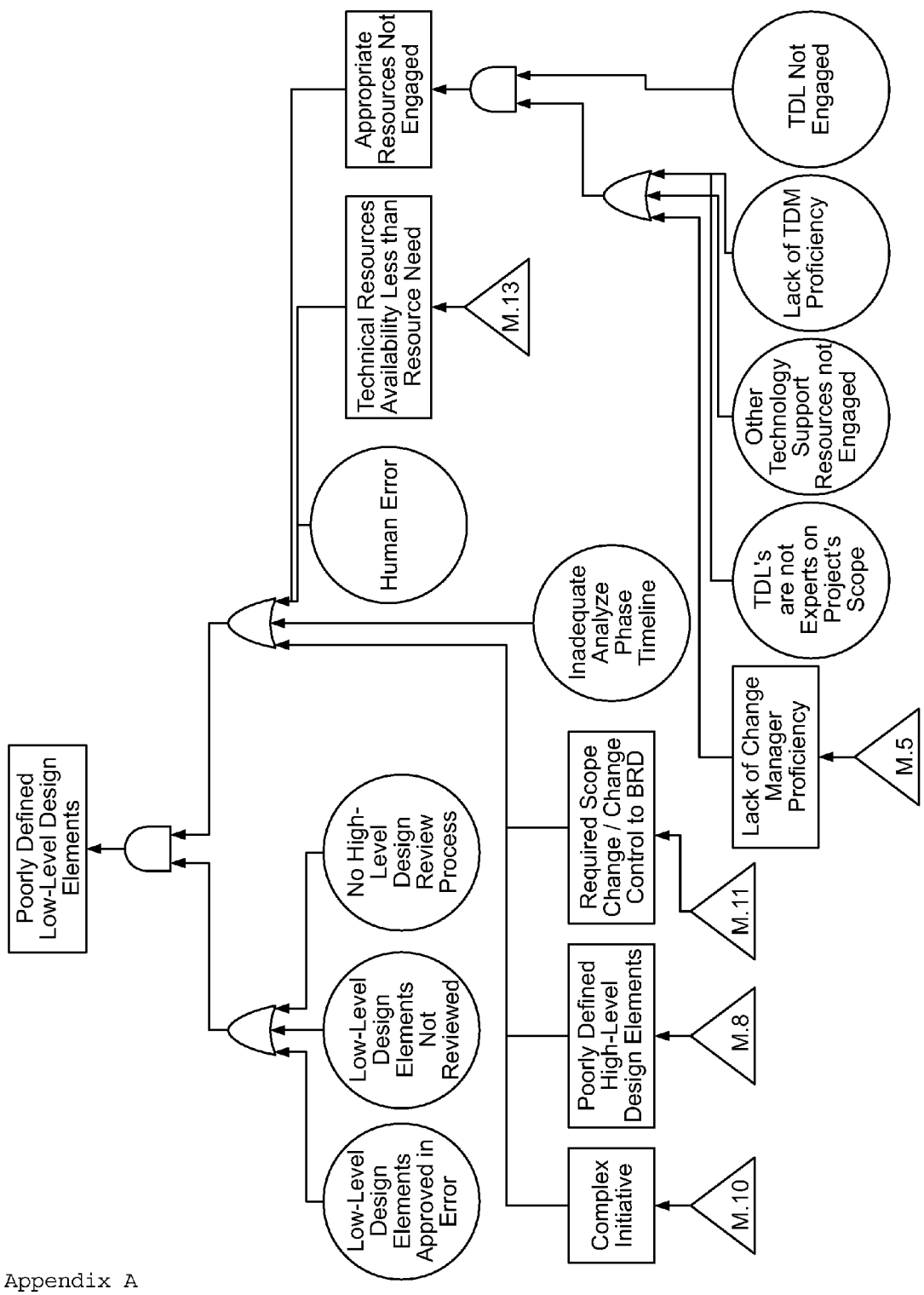
Appendix A

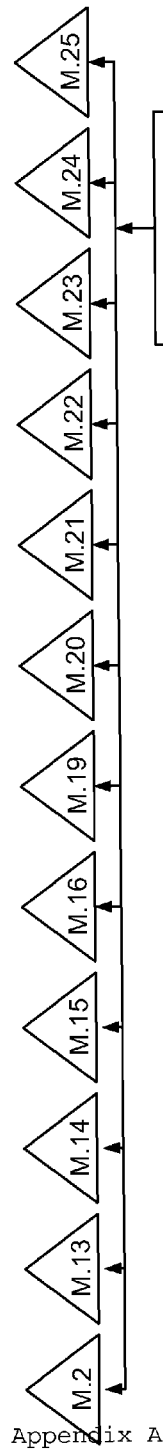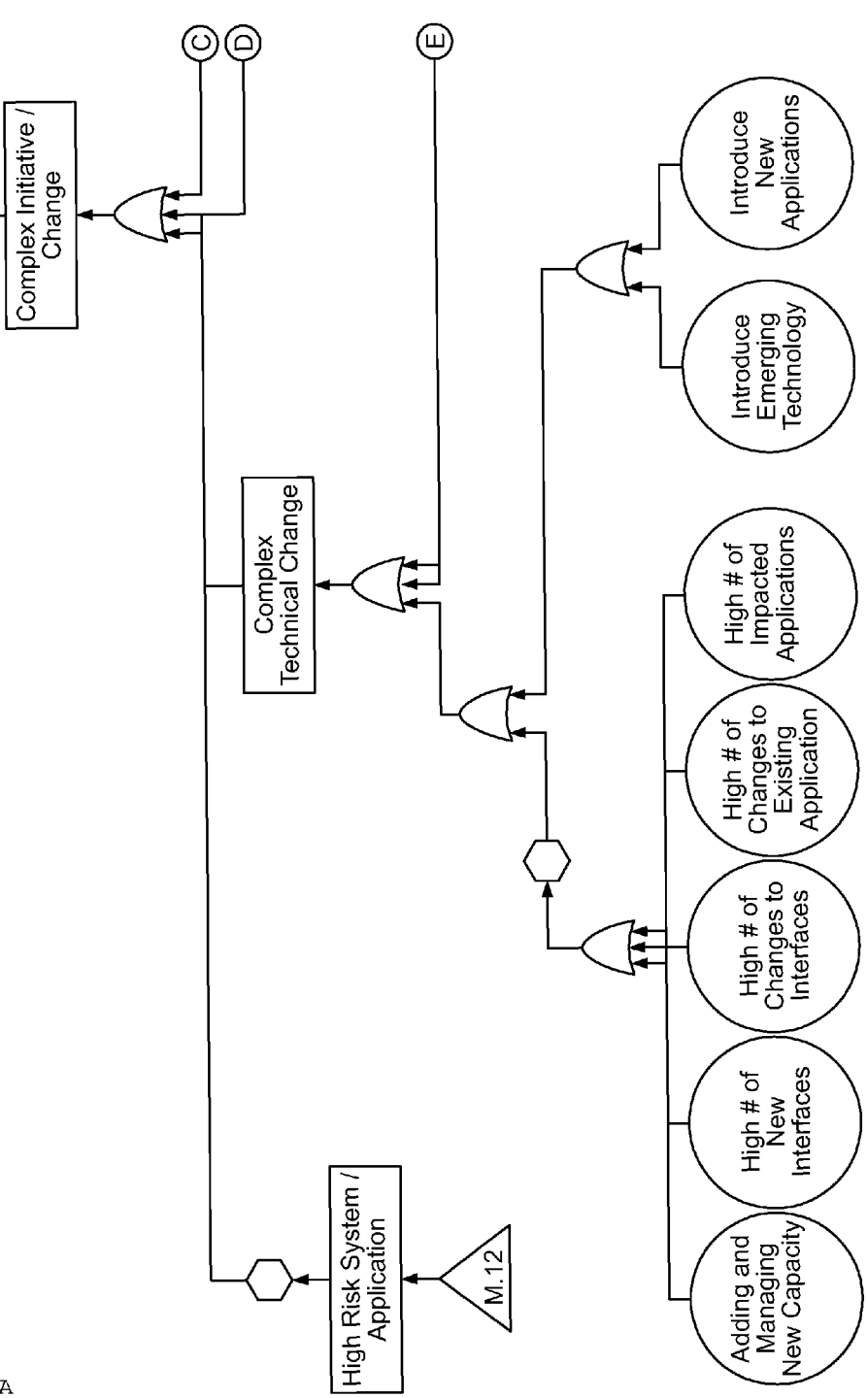
Appendix A

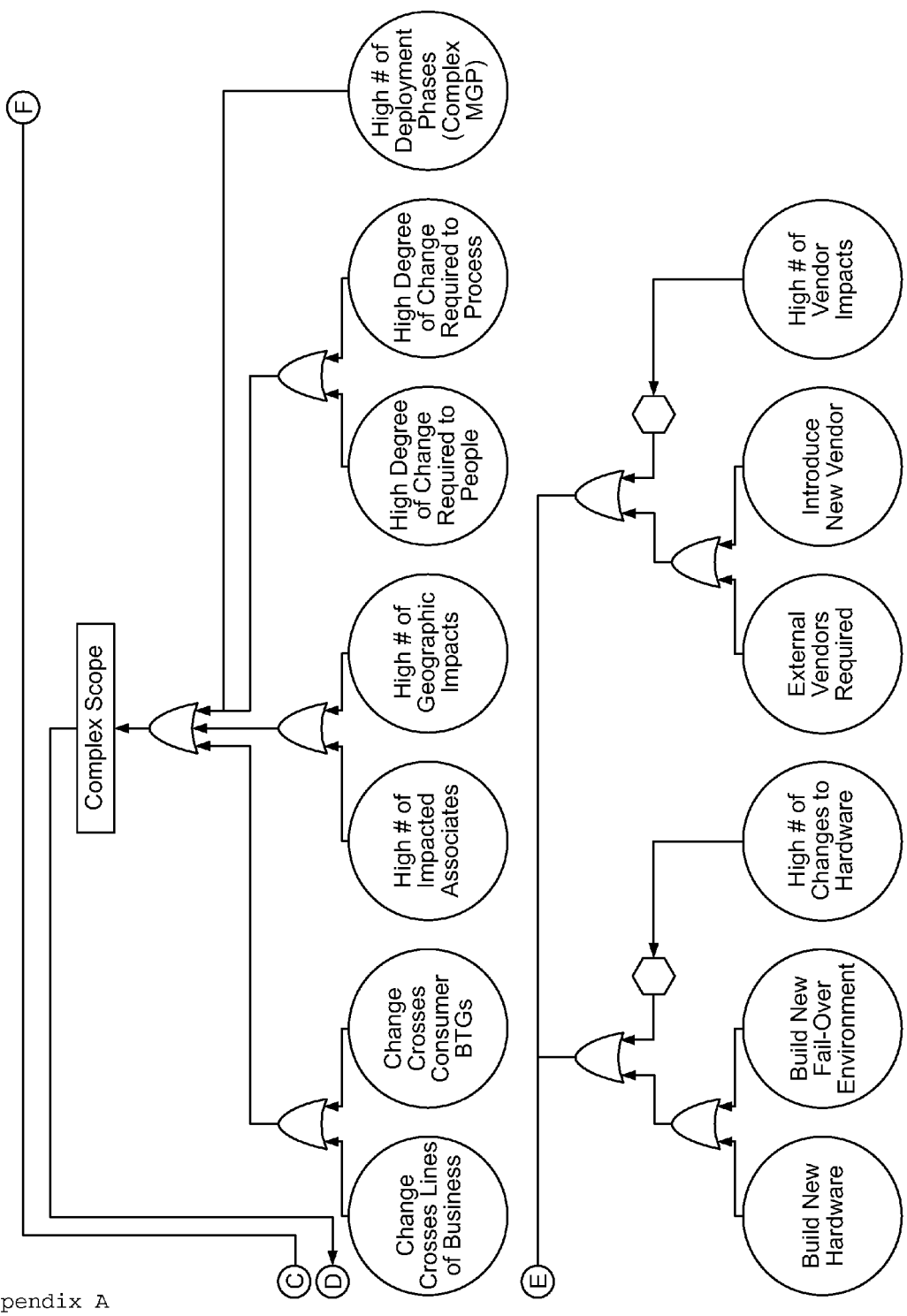
Appendix A

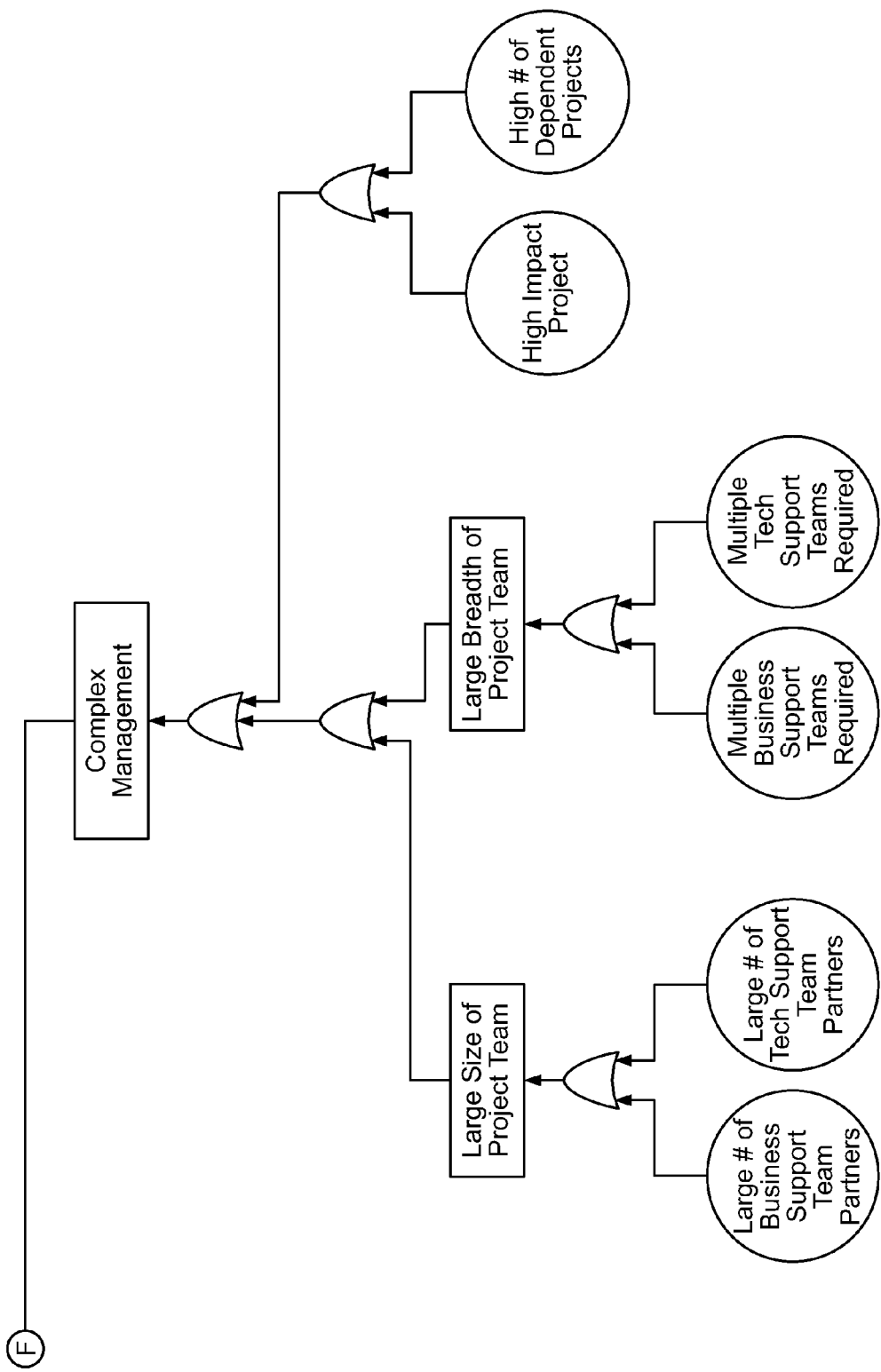
Appendix A

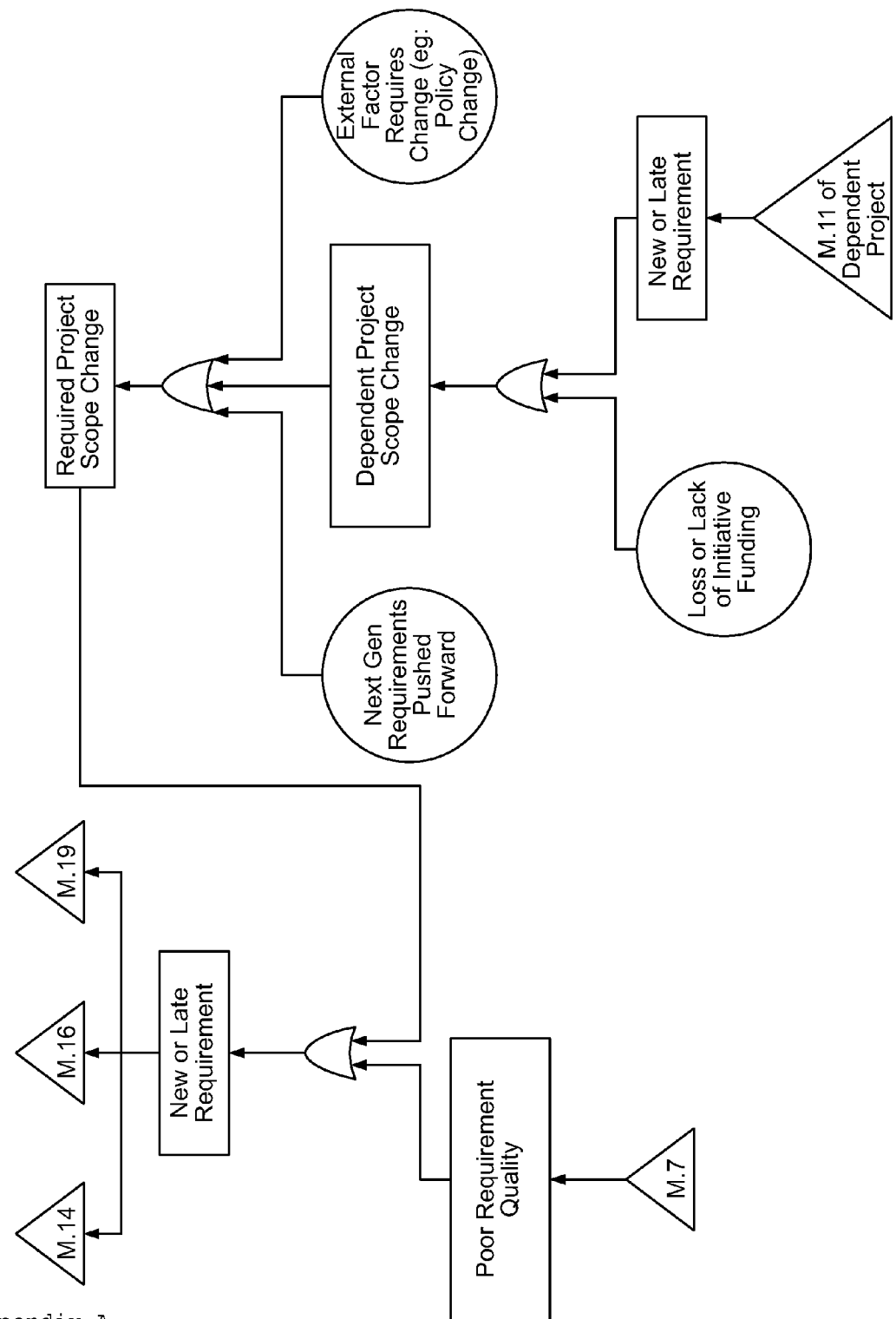
Appendix A

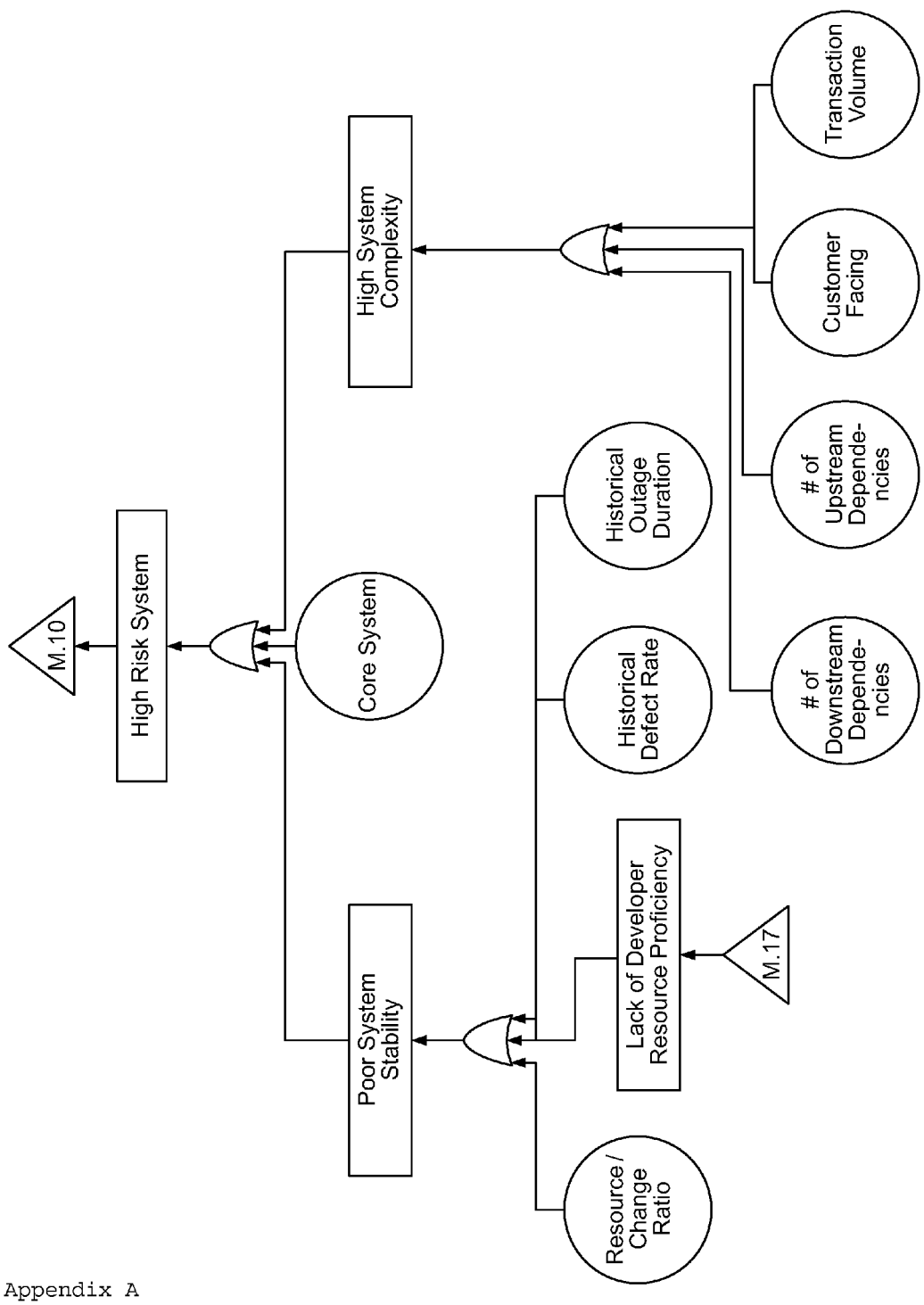
Appendix A

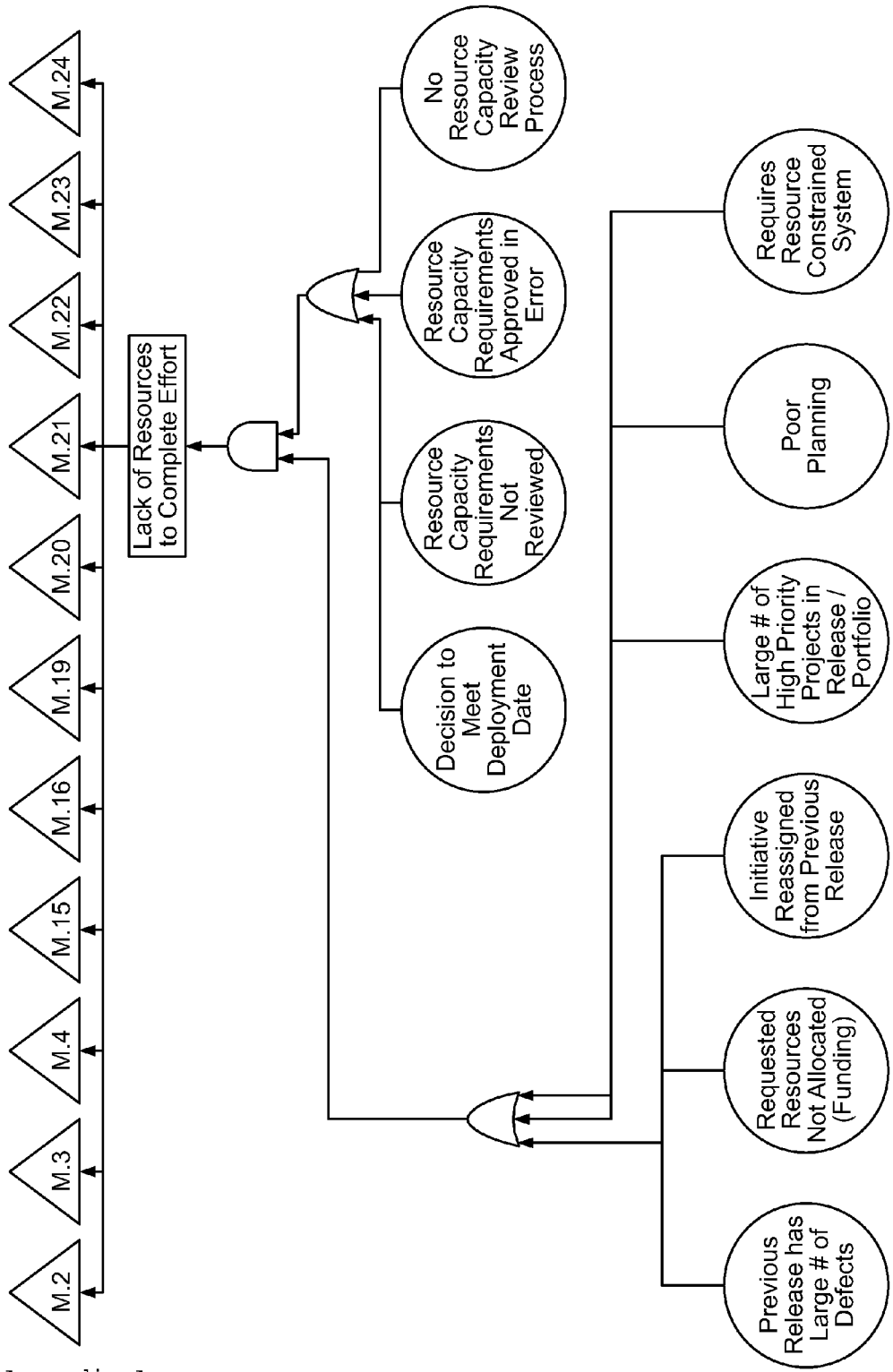
Appendix A

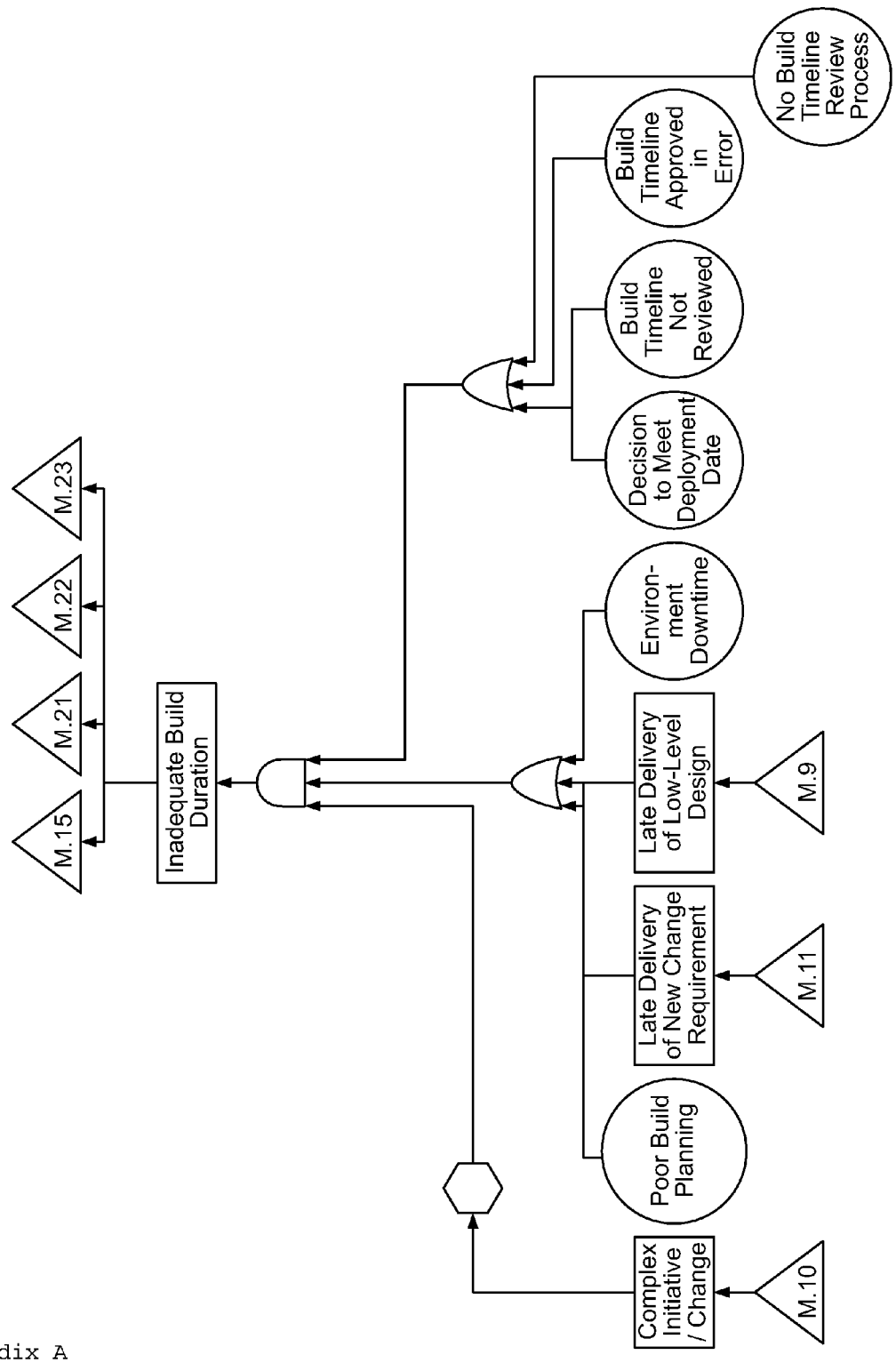
Appendix A

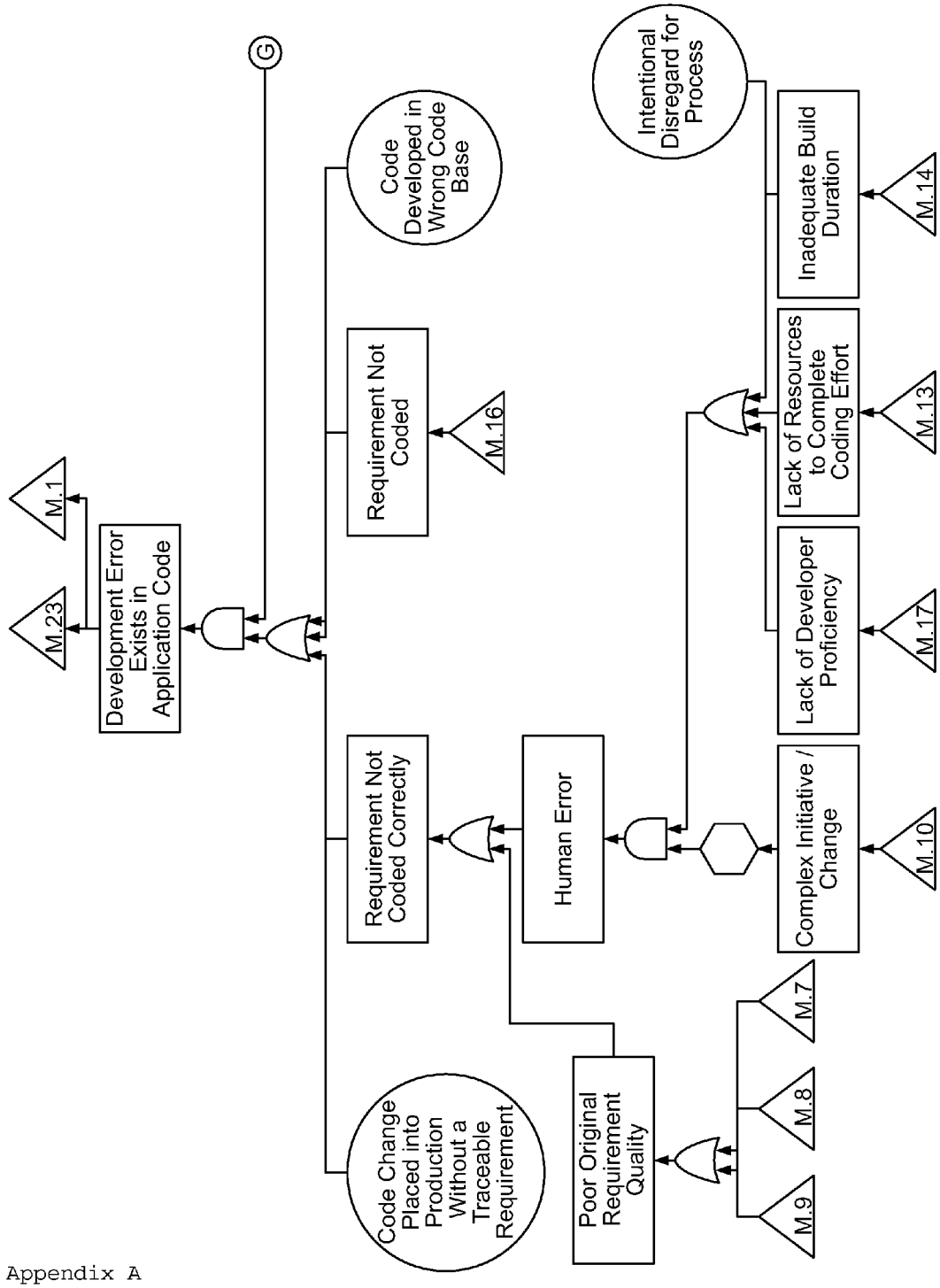
Appendix A

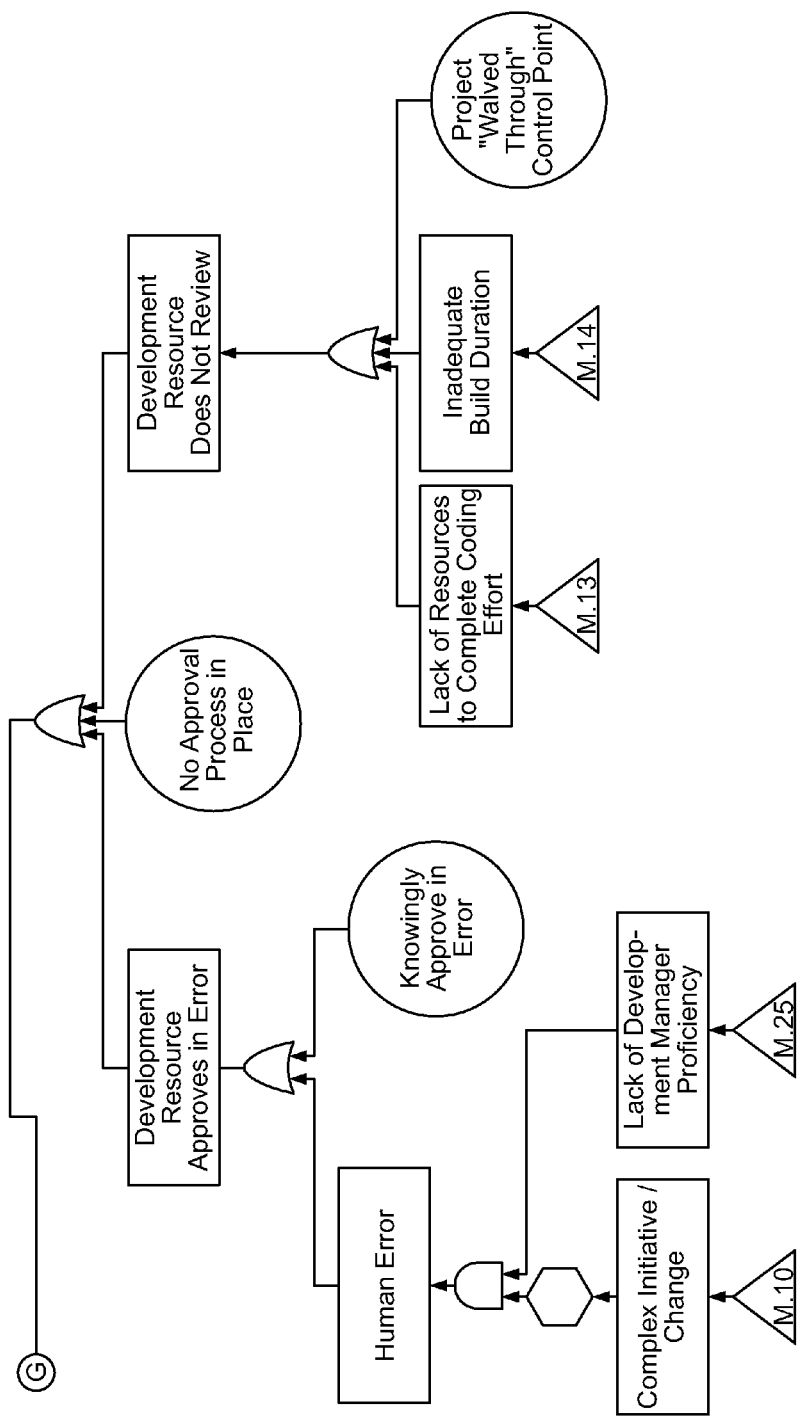
Appendix A

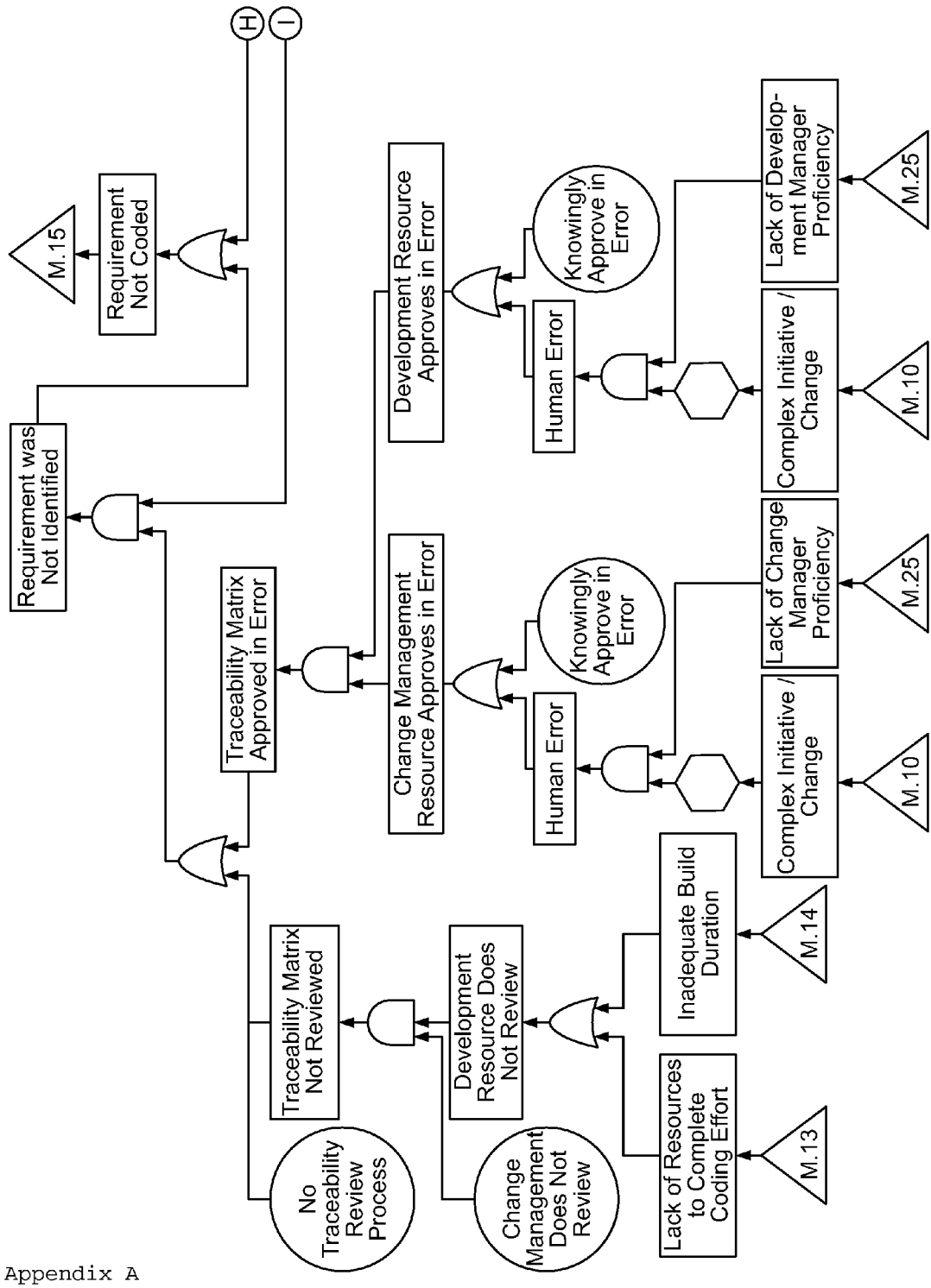
Appendix A

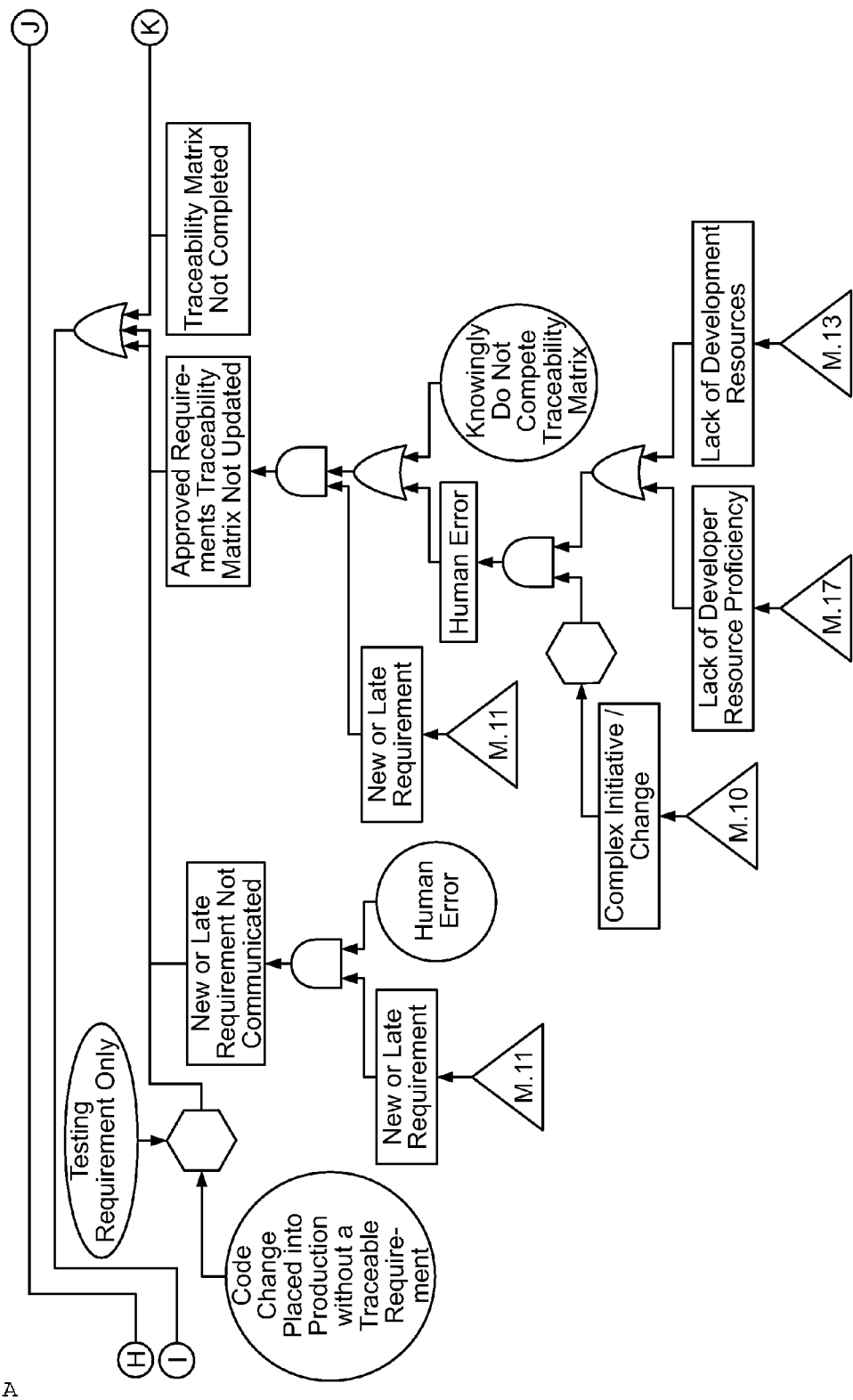
Appendix A

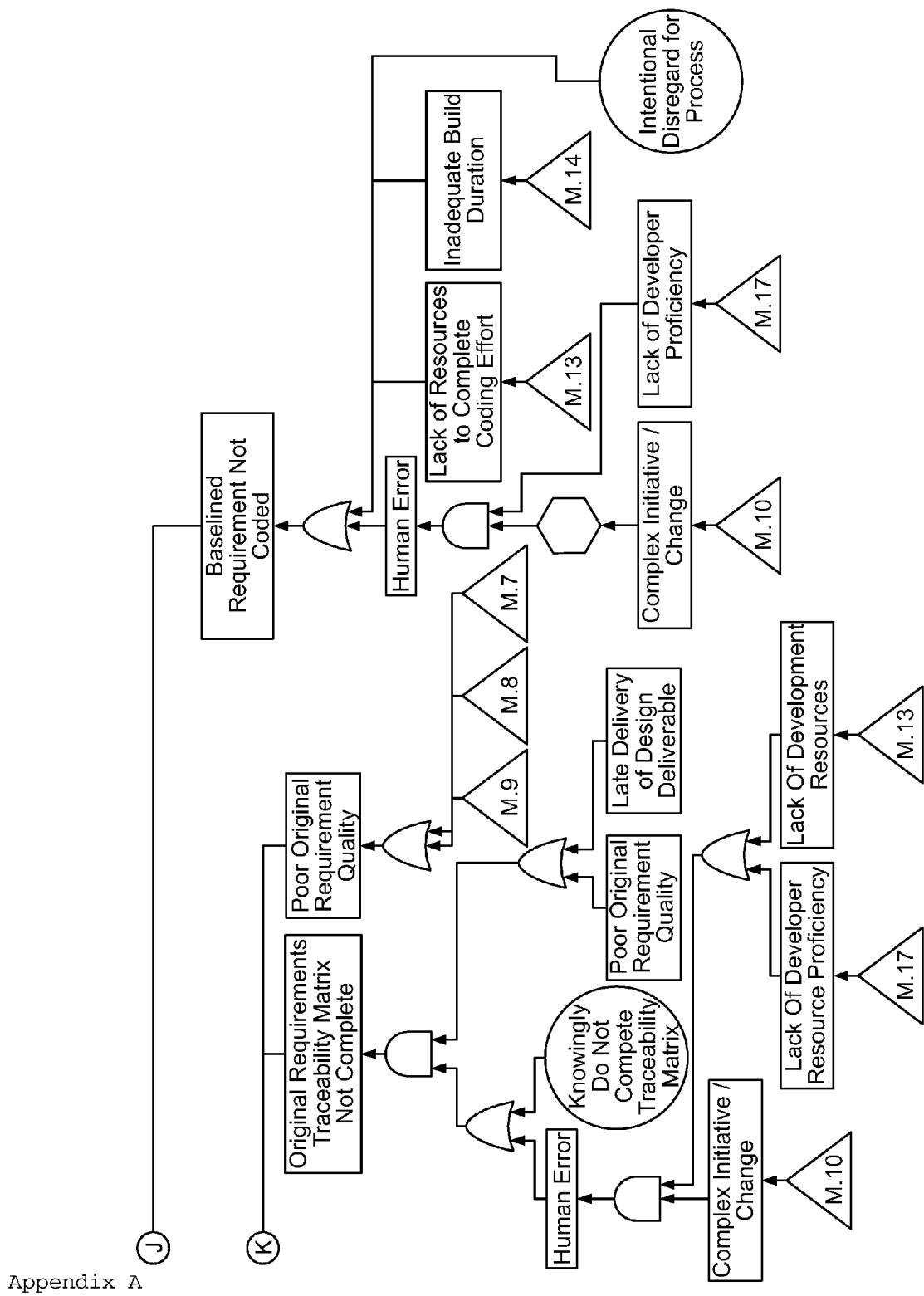
Appendix A

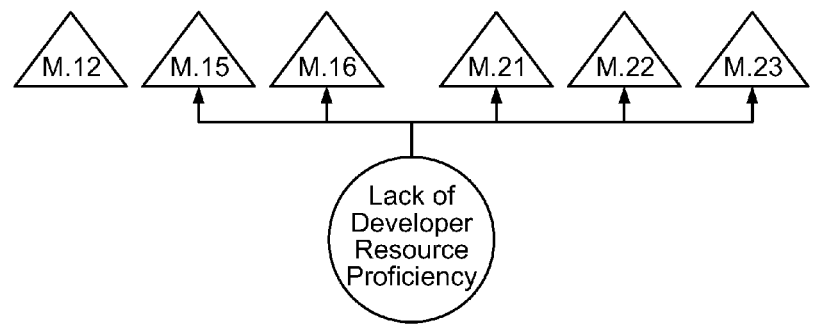
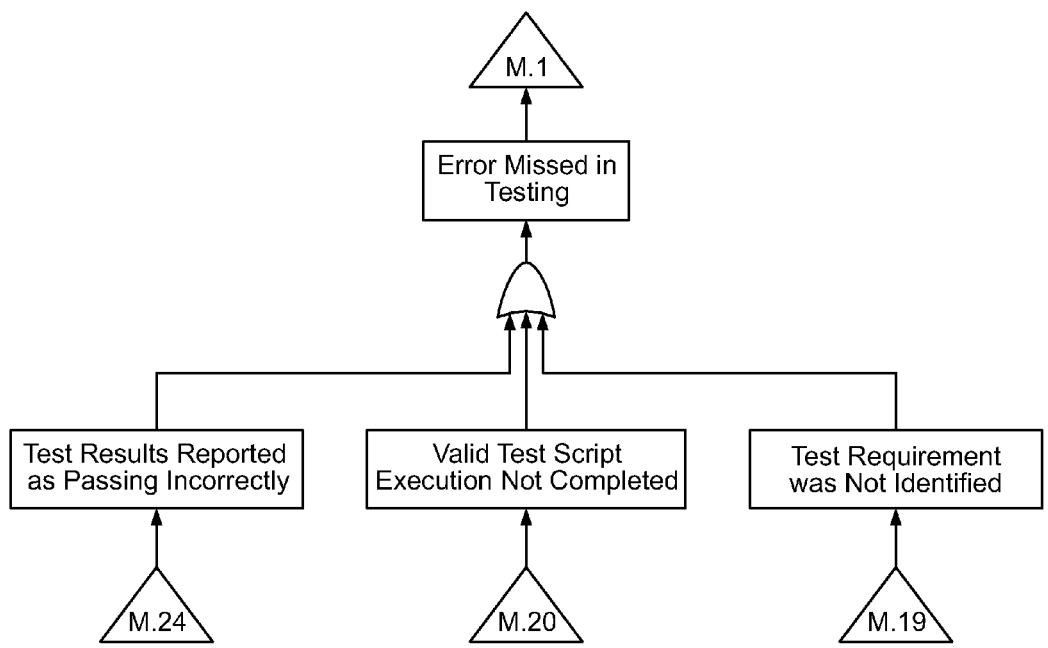
Appendix A

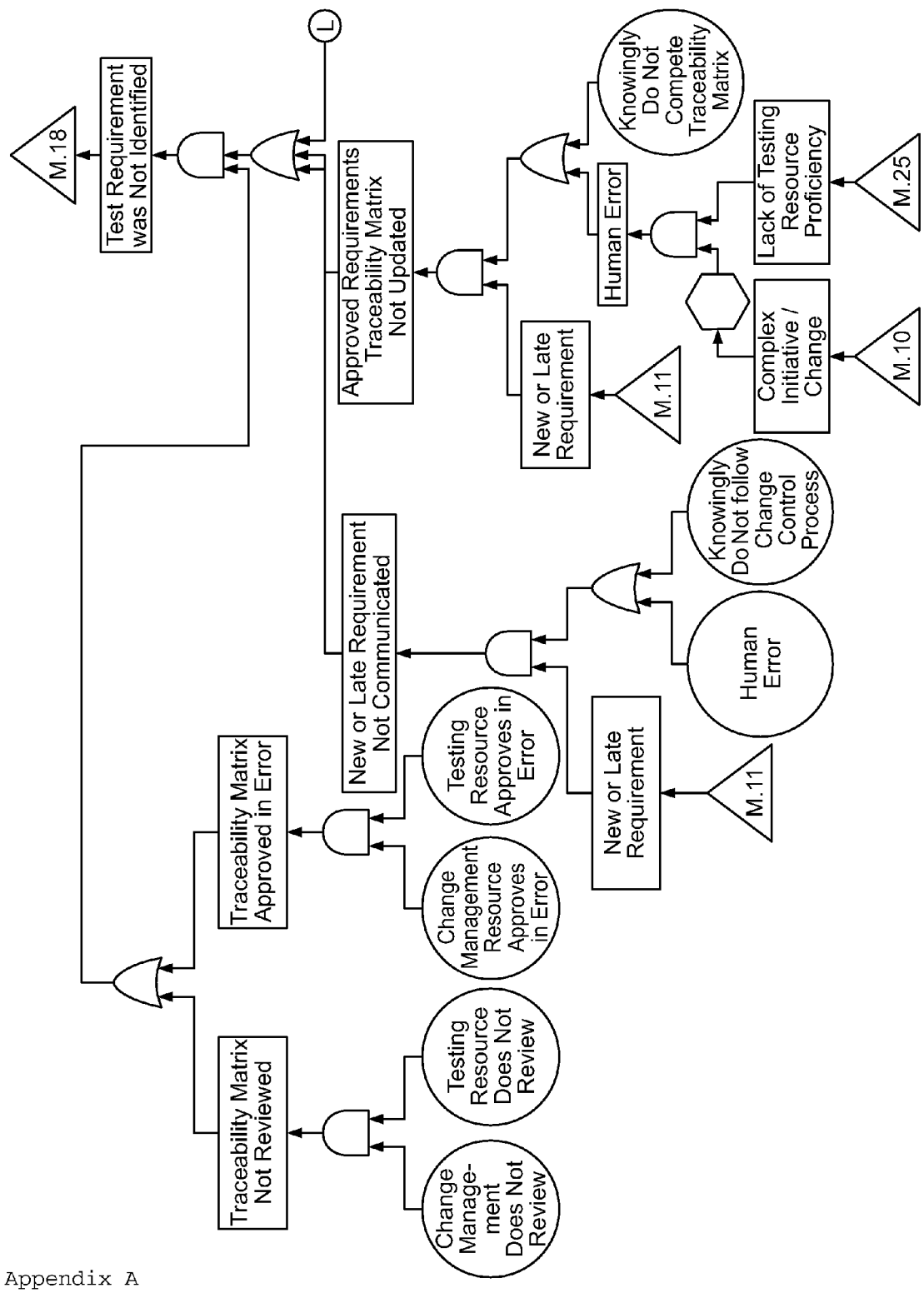
Appendix A

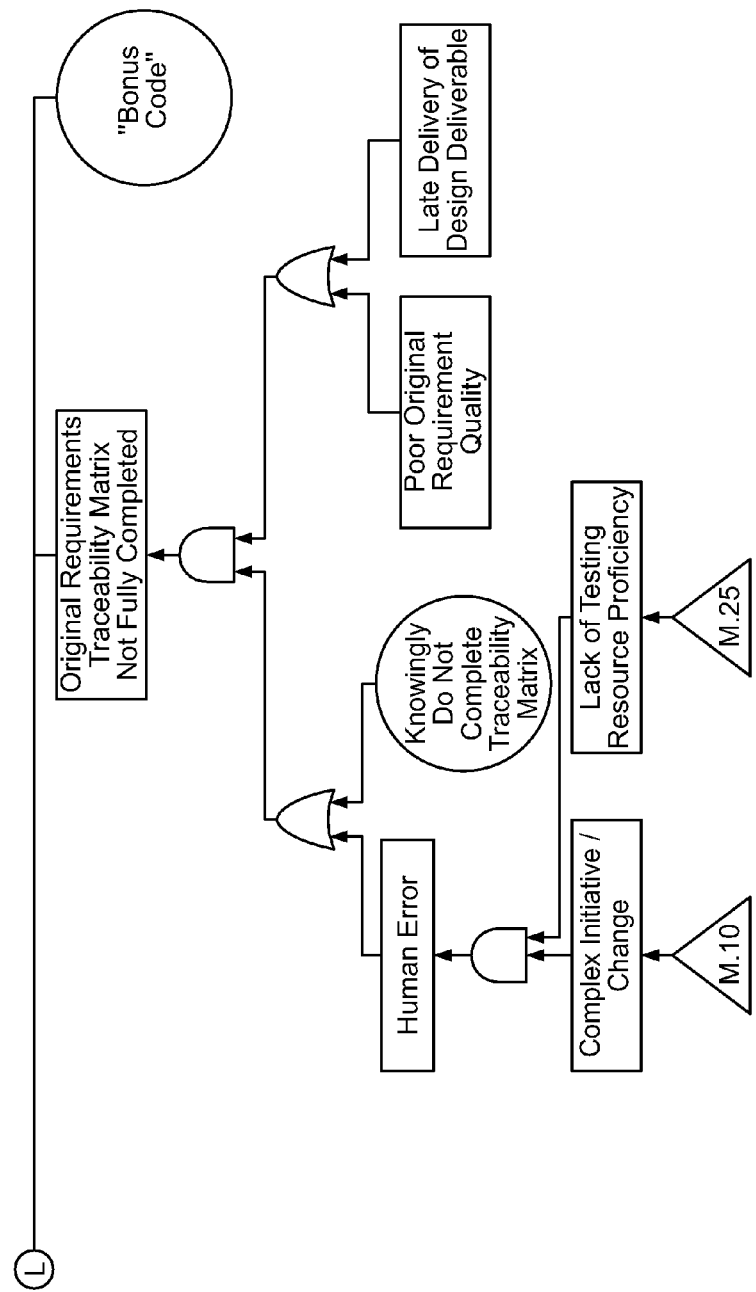
Appendix A

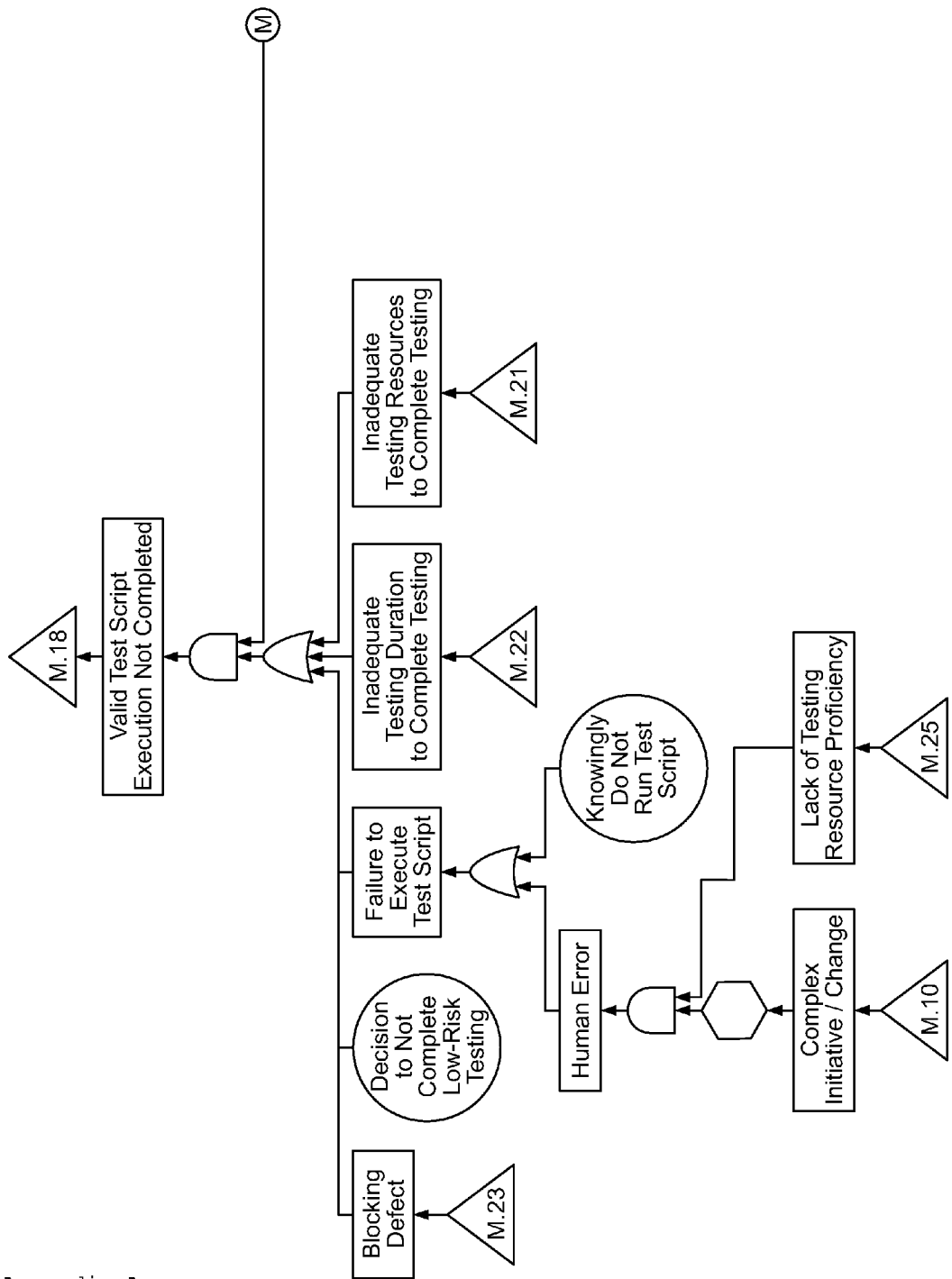
Appendix A

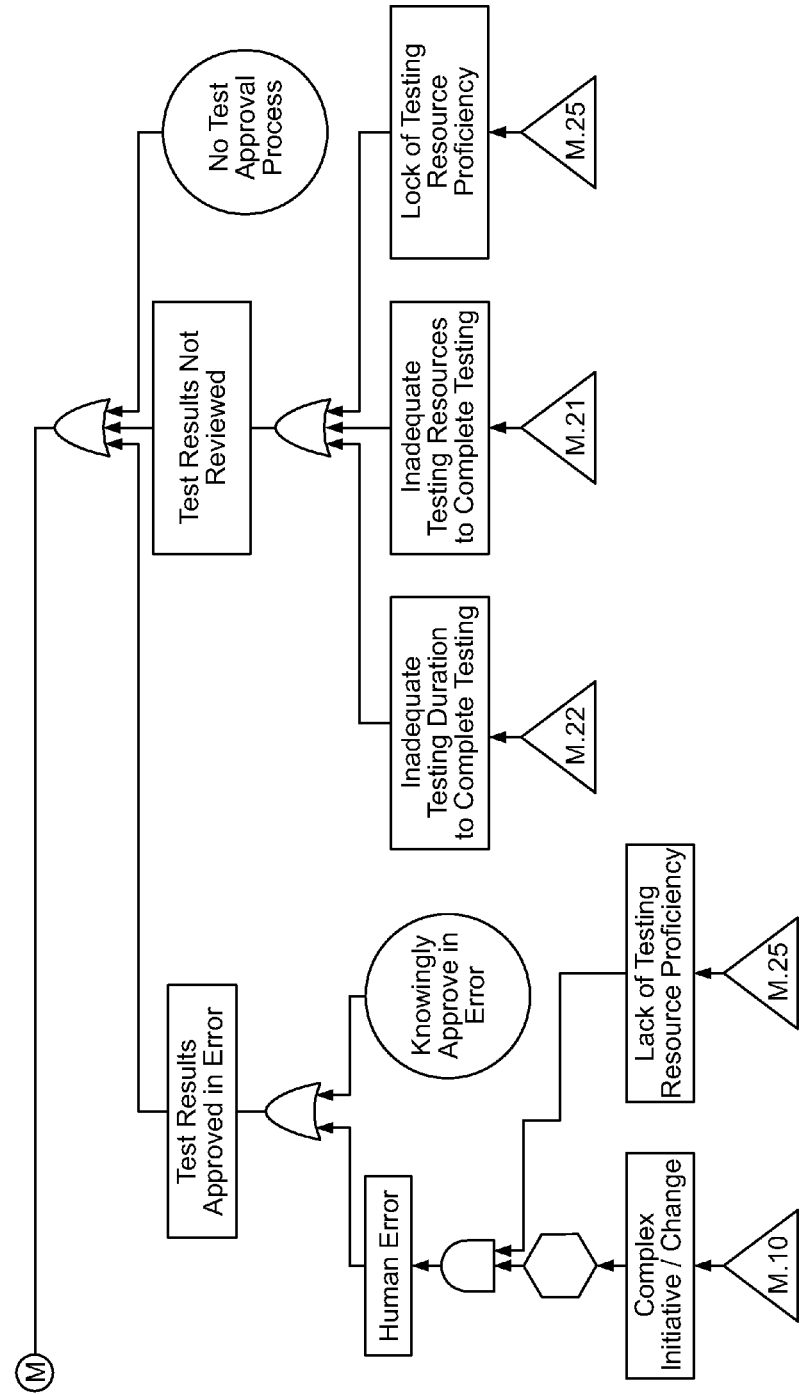
Appendix A

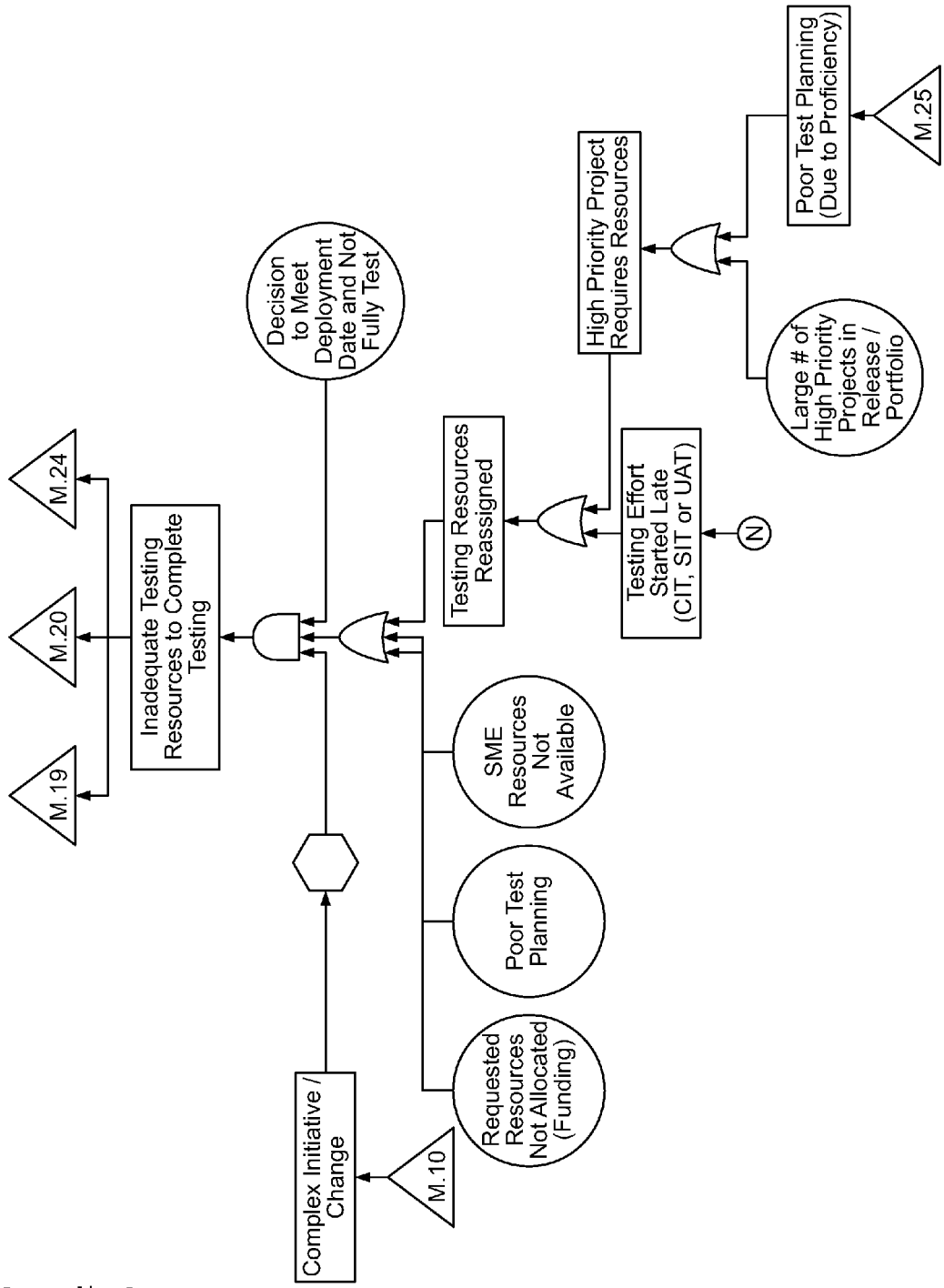
Appendix A

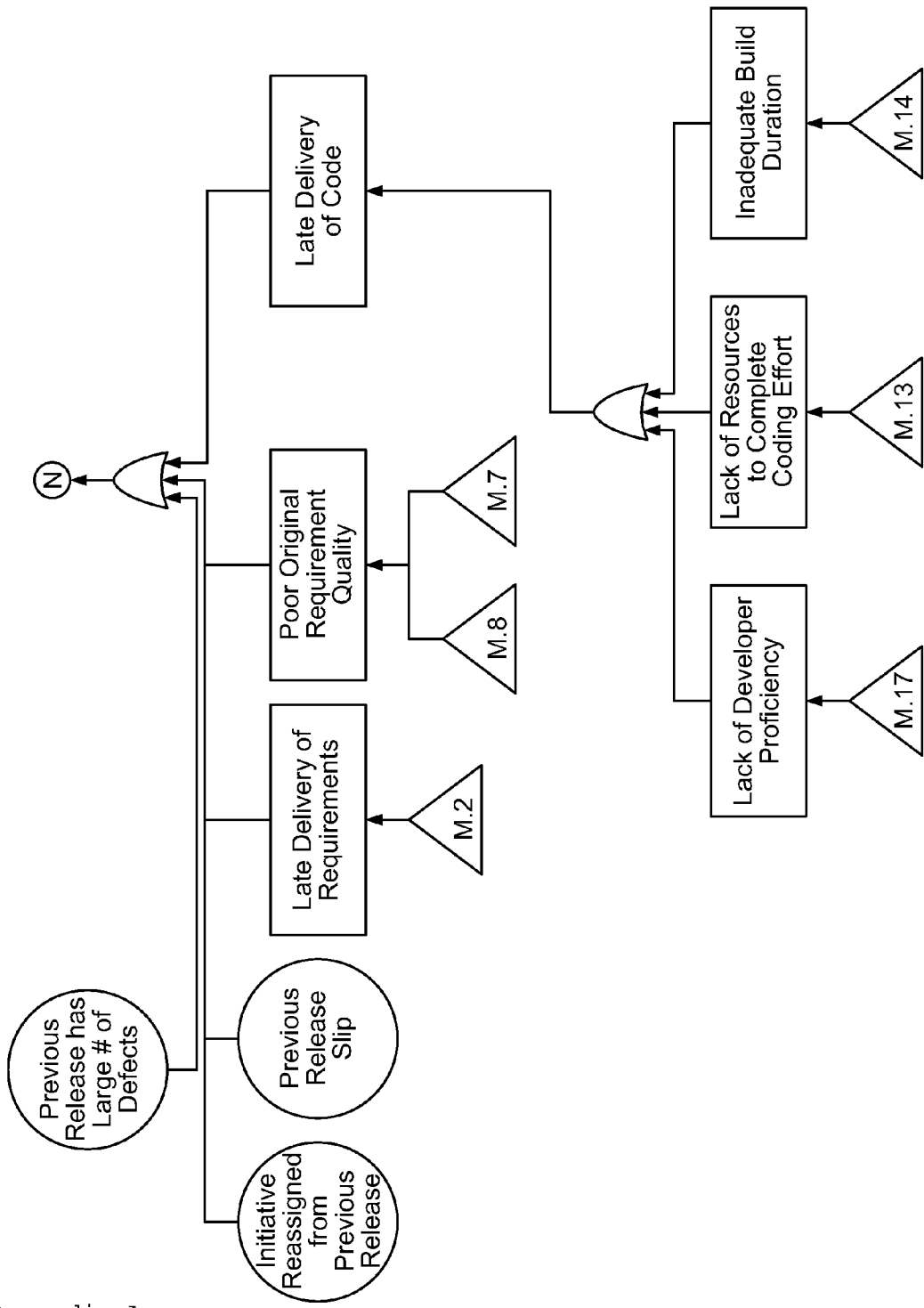
Appendix A

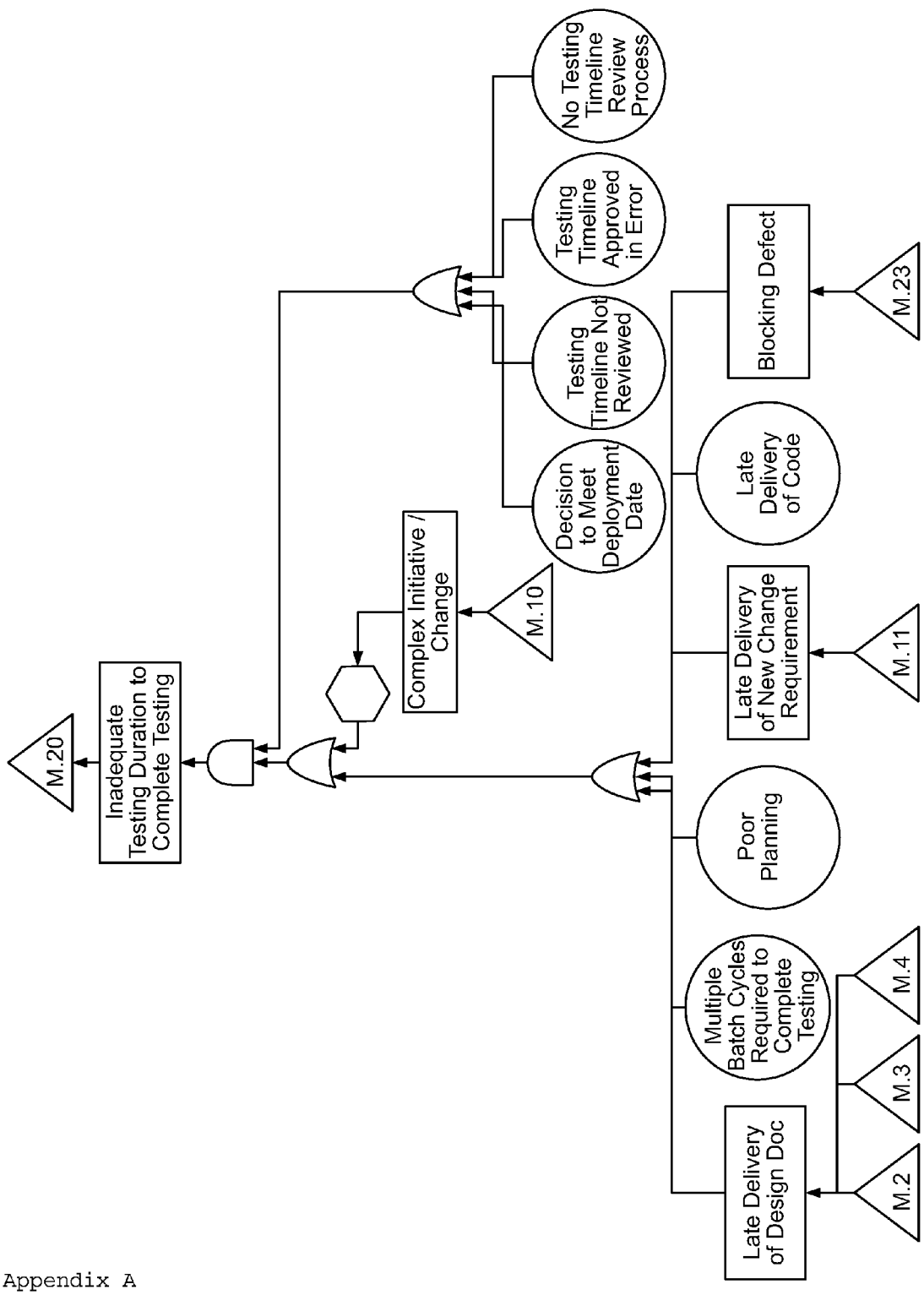
Appendix A

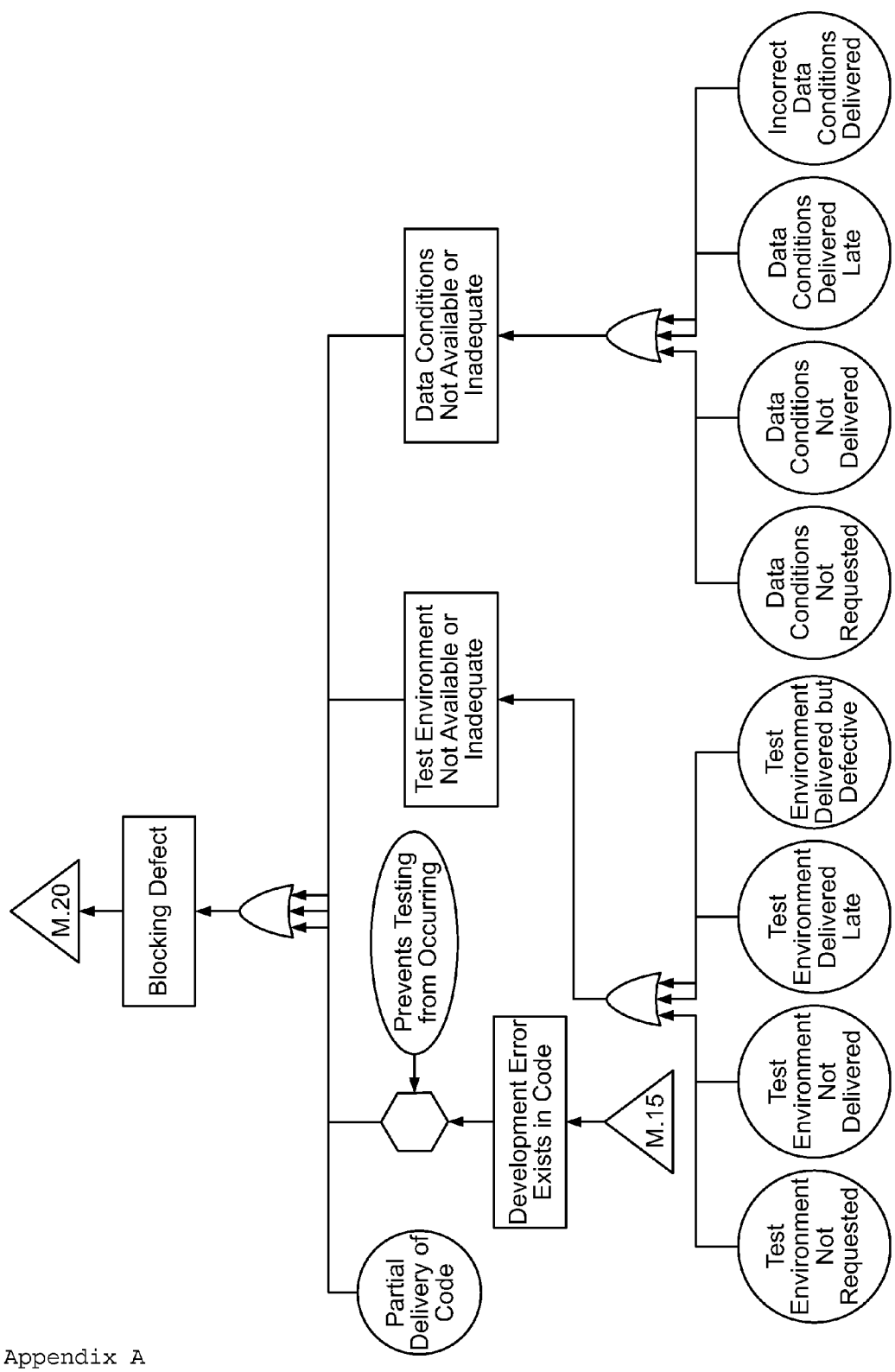
Appendix A

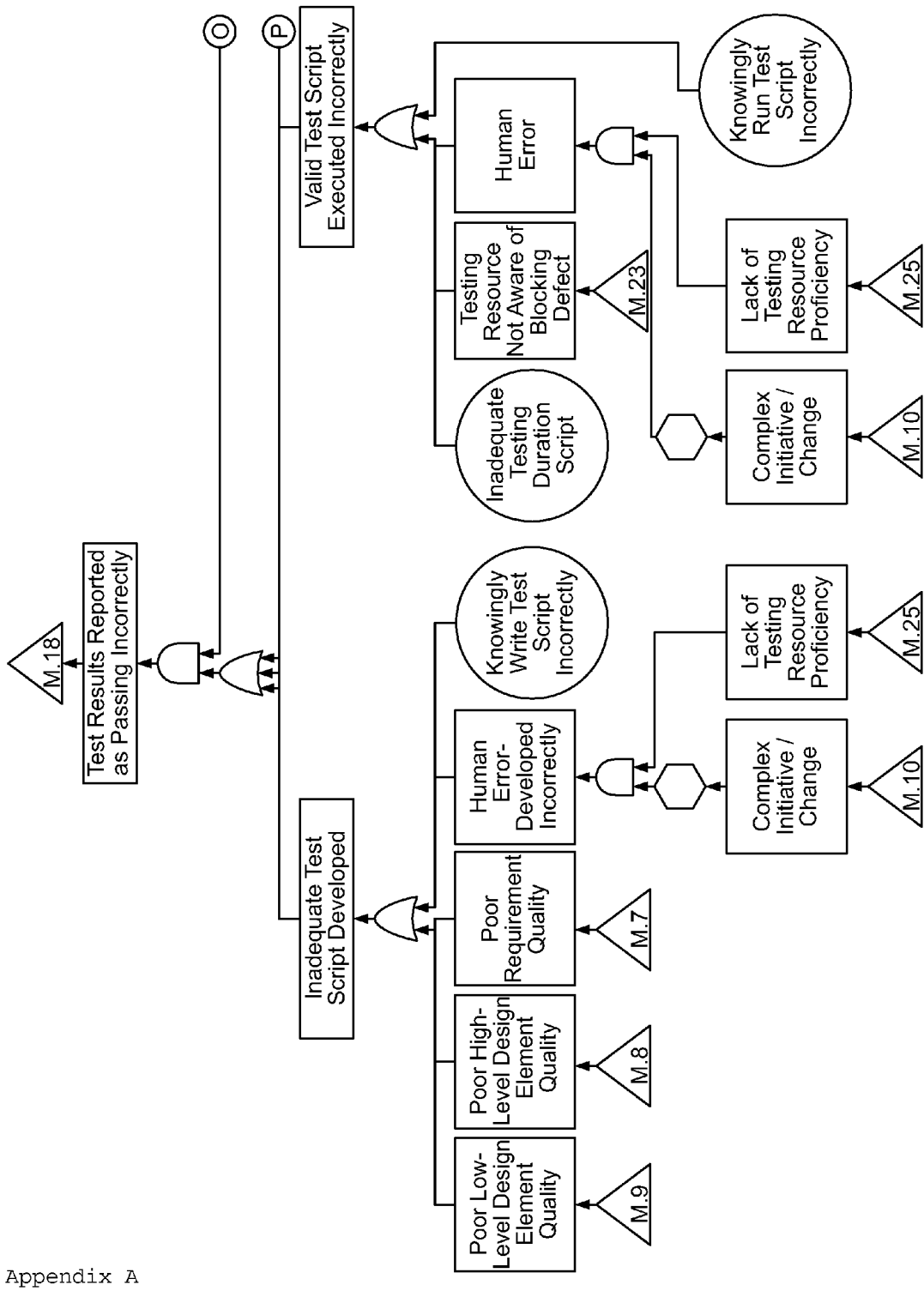
Appendix A

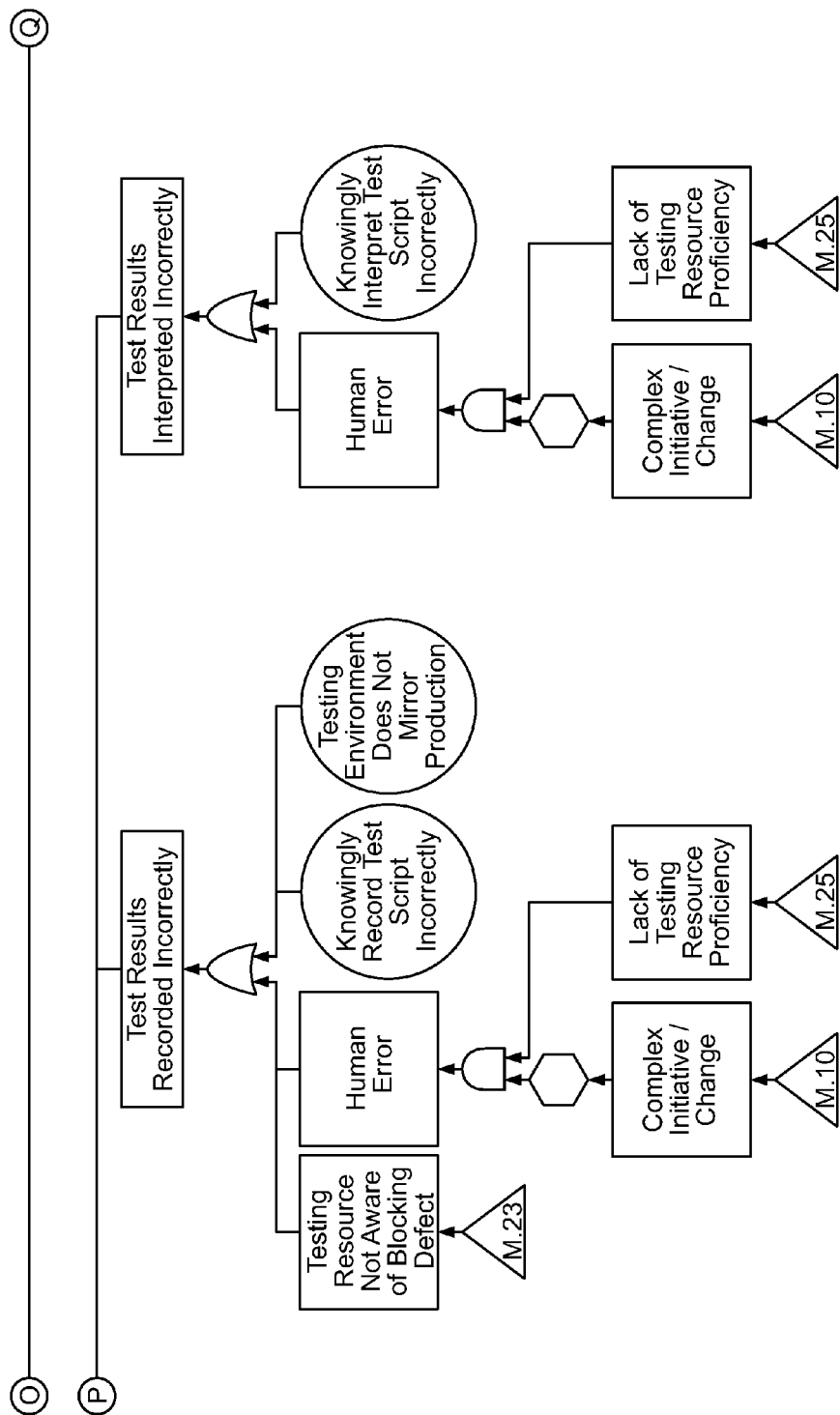
Appendix A

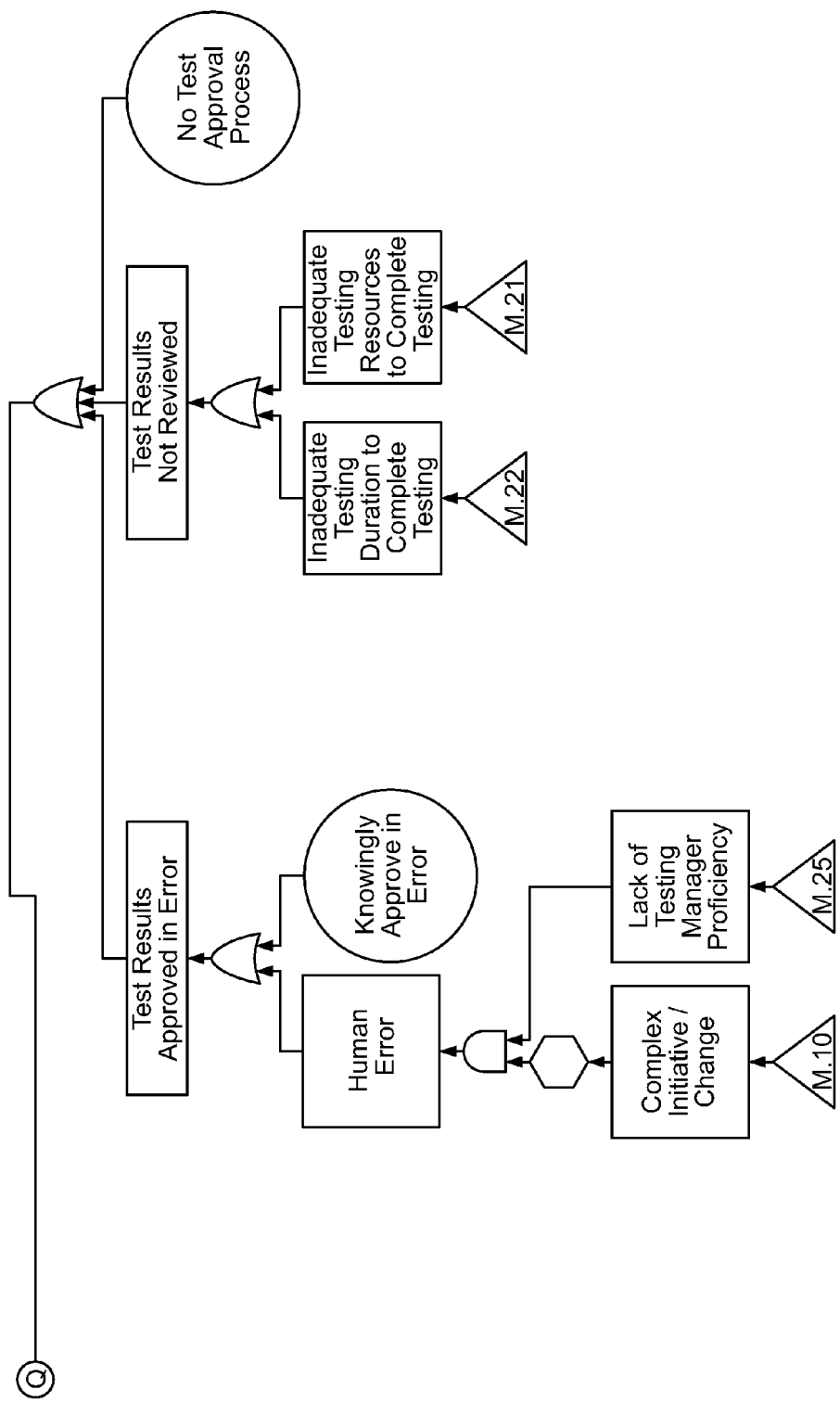
Appendix A

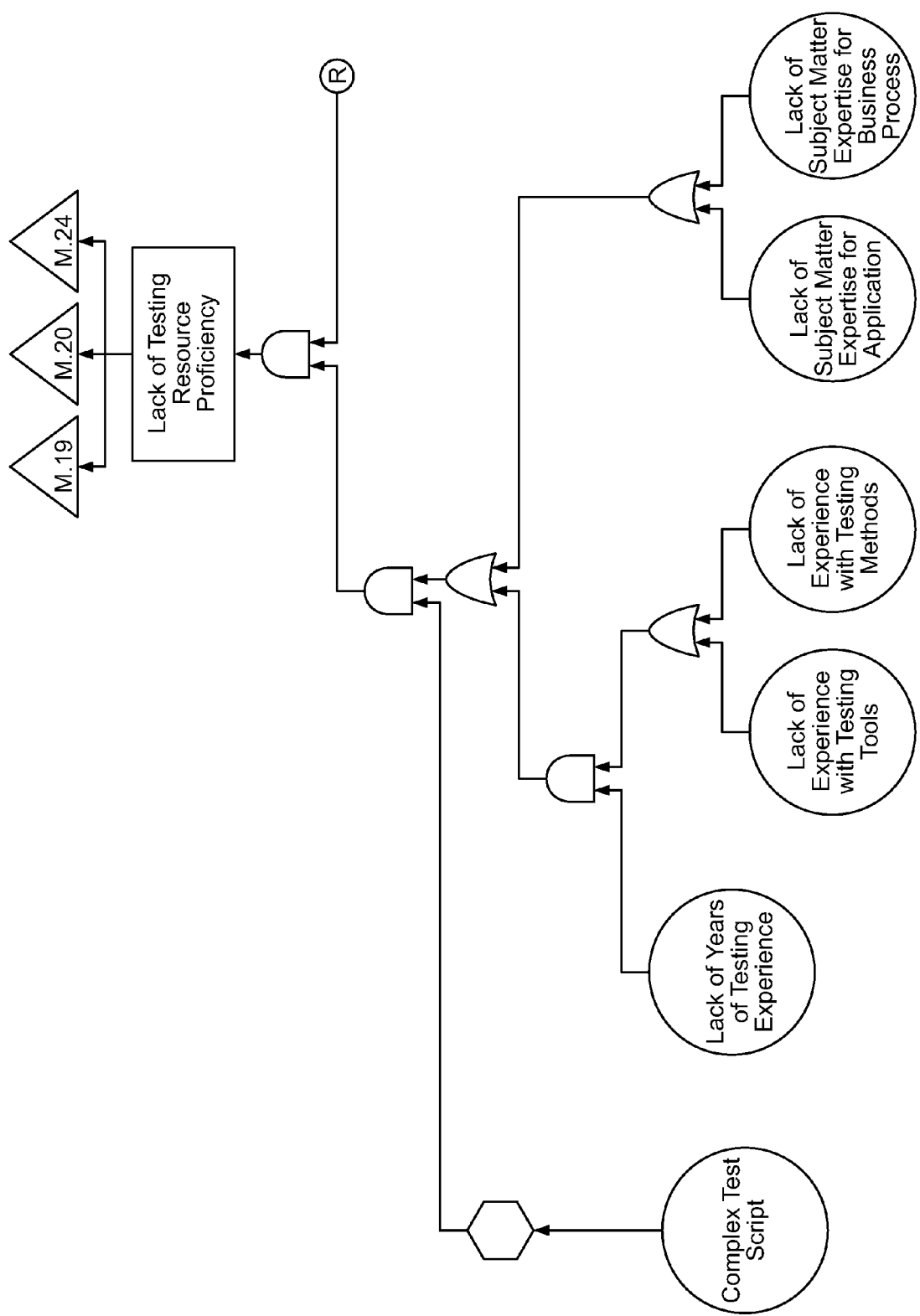
Appendix A

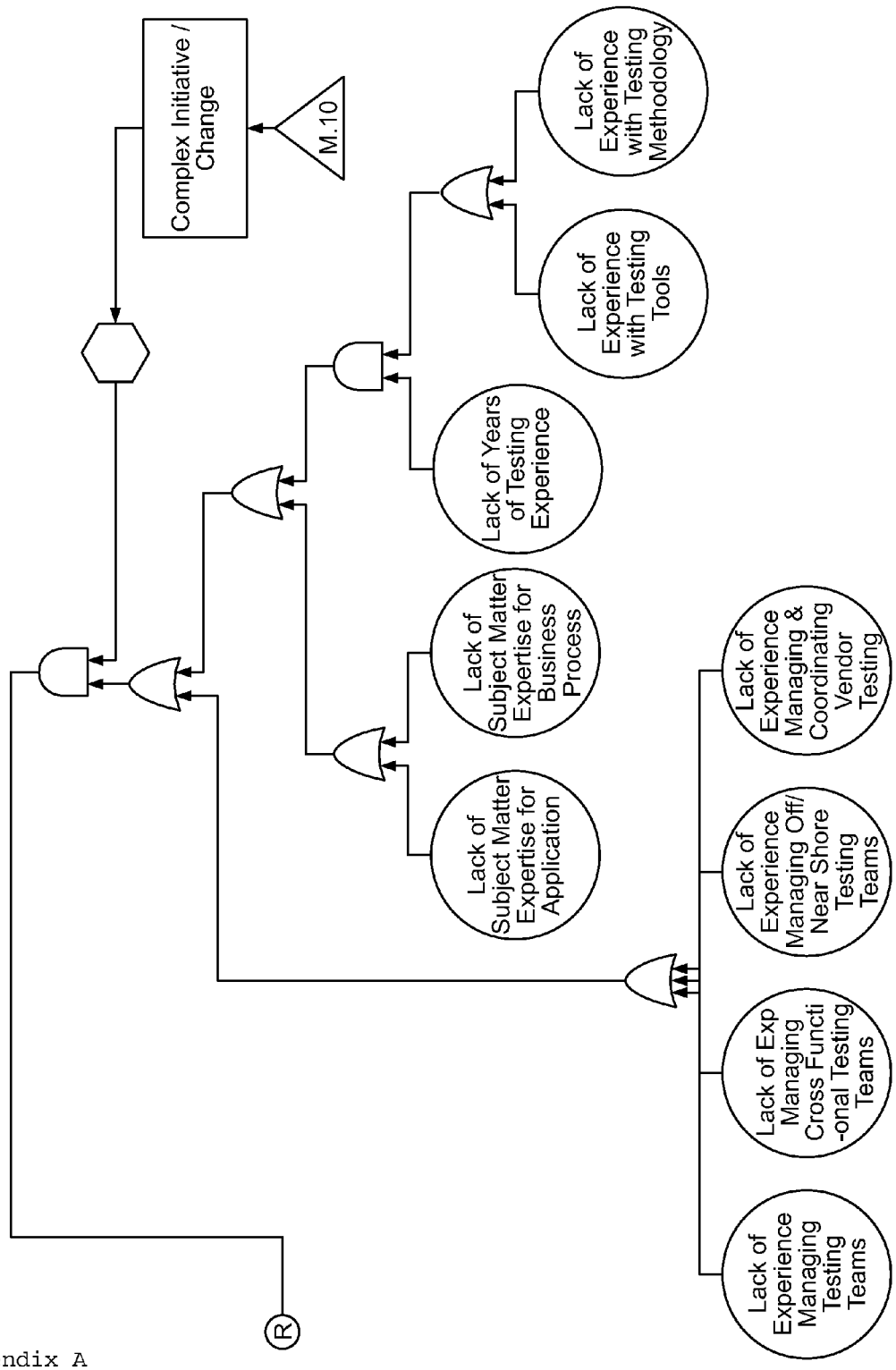
Appendix A

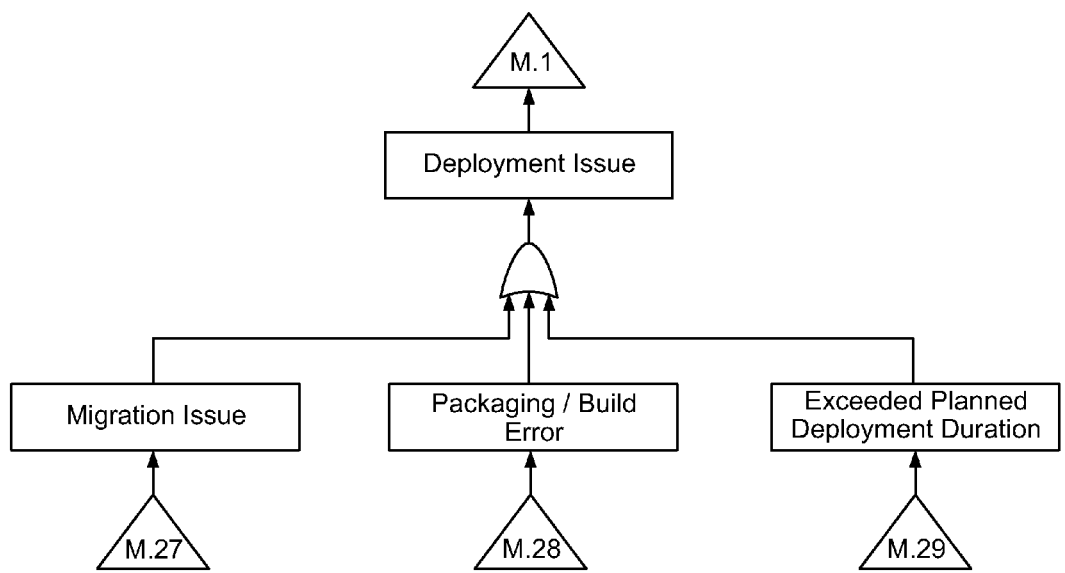
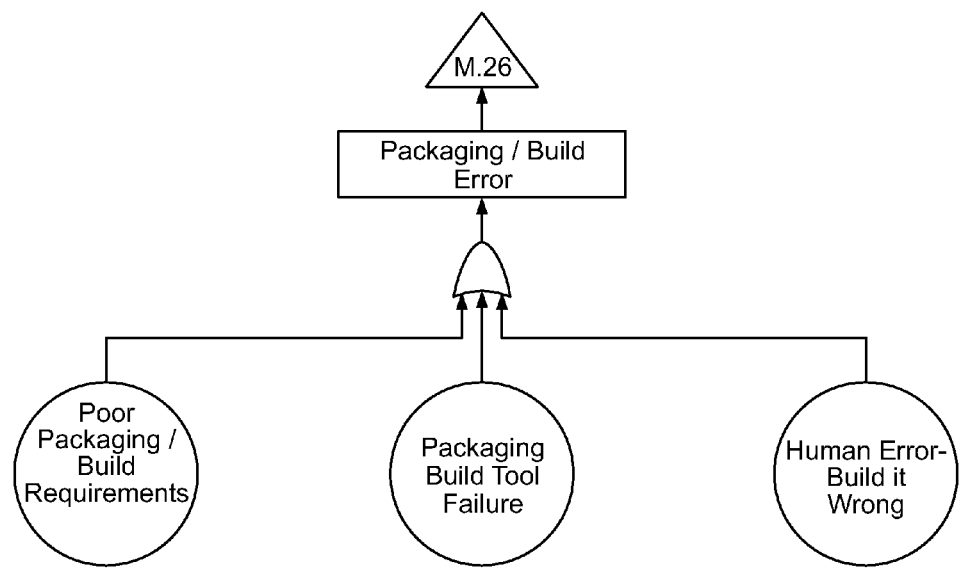
Appendix A

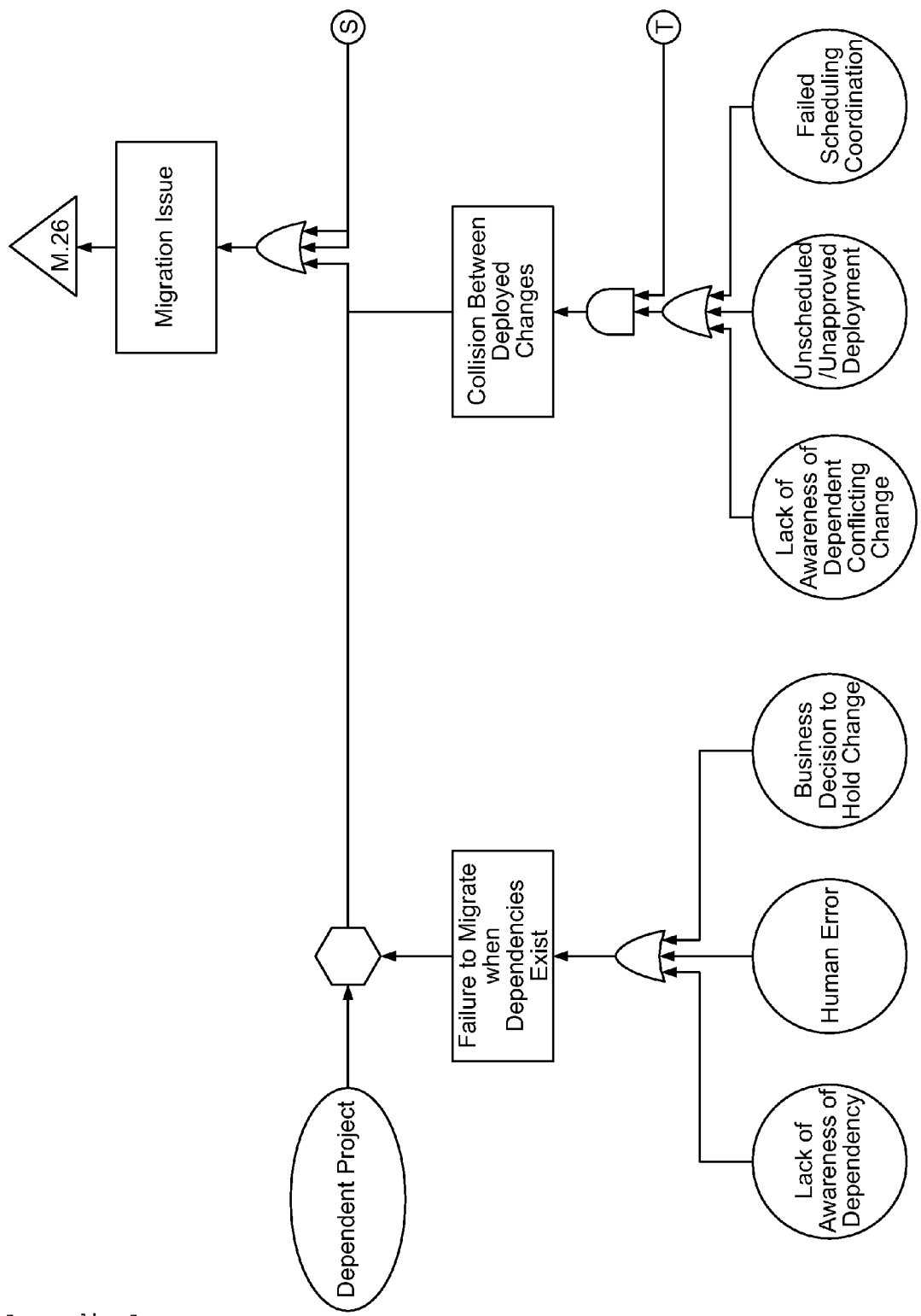
Appendix A

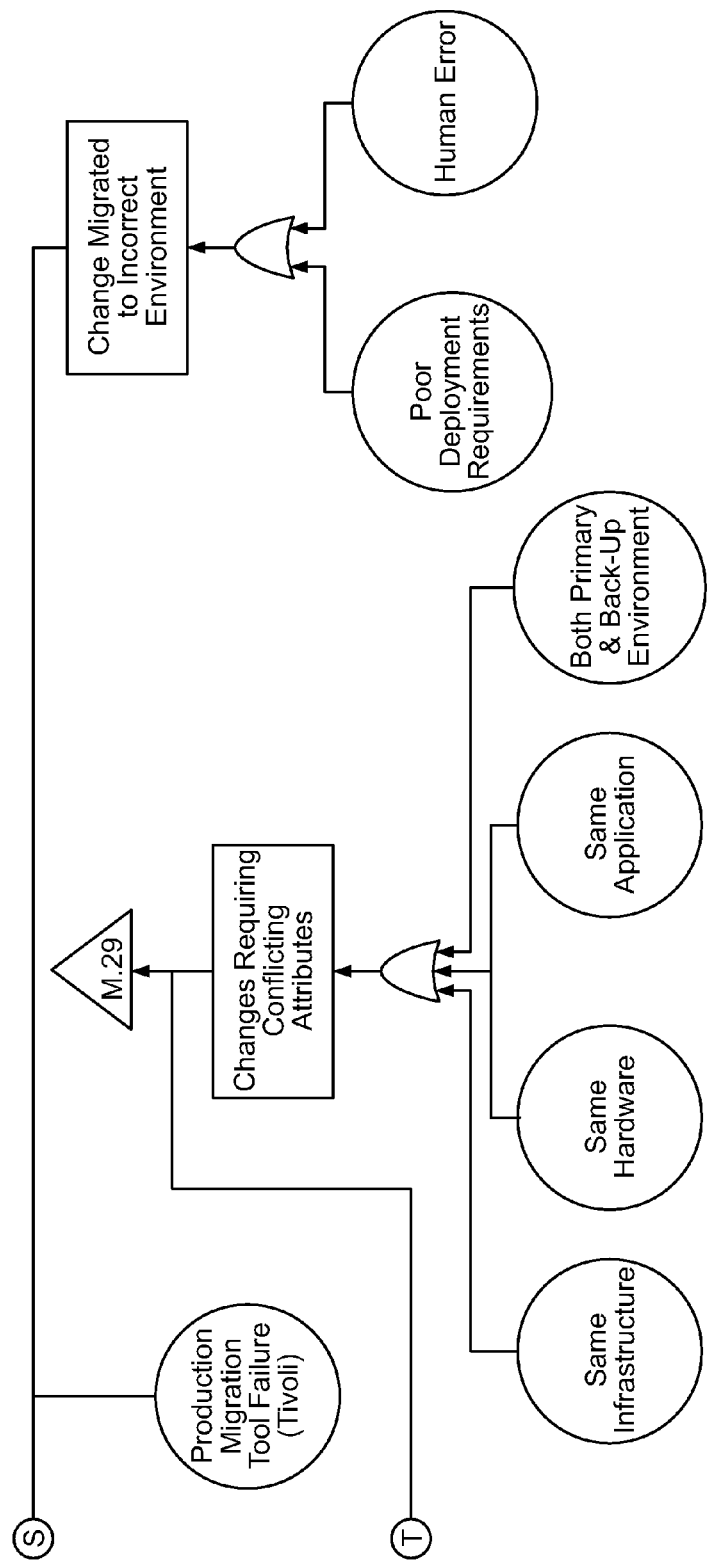
Appendix A

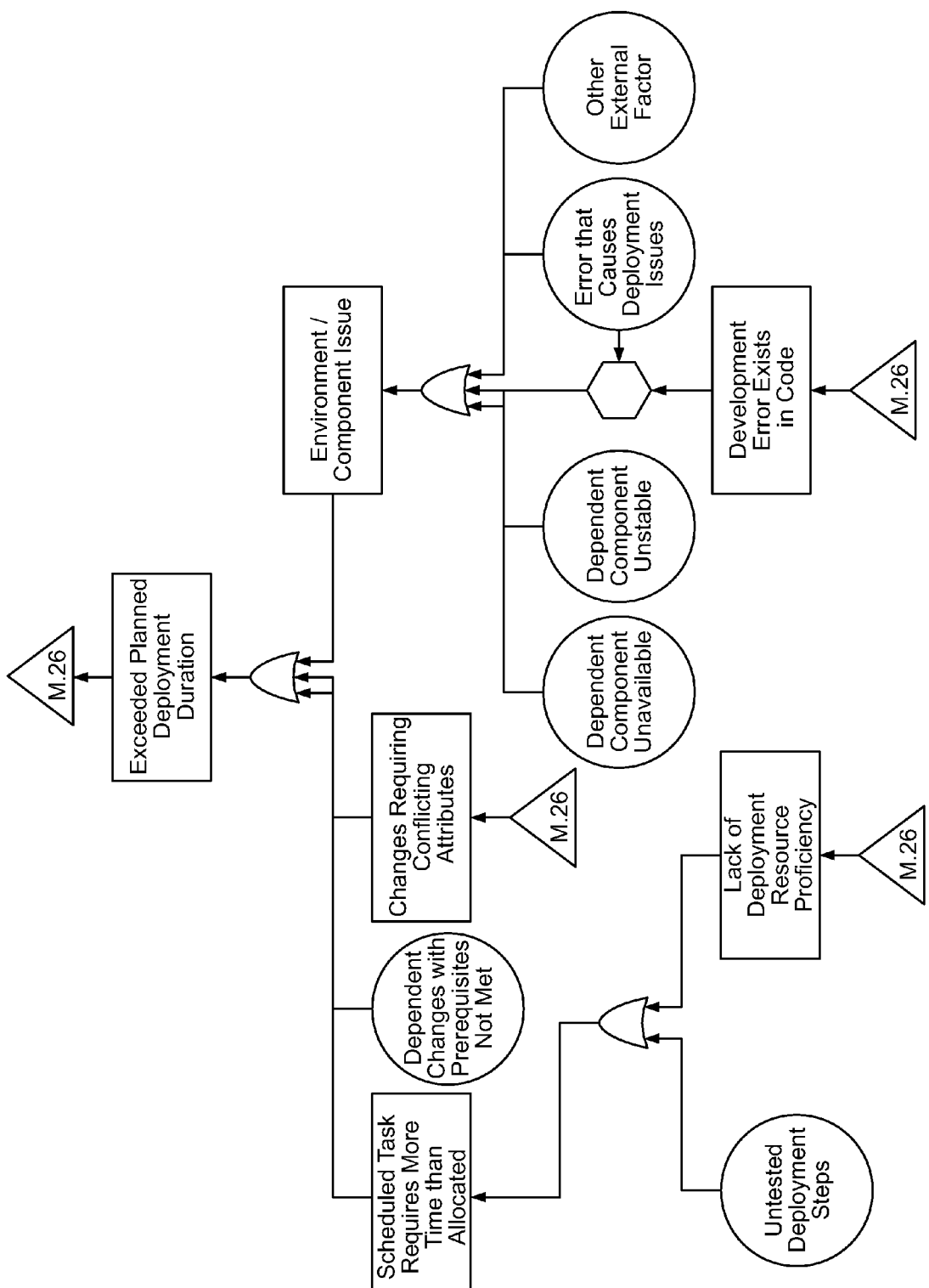
Appendix A

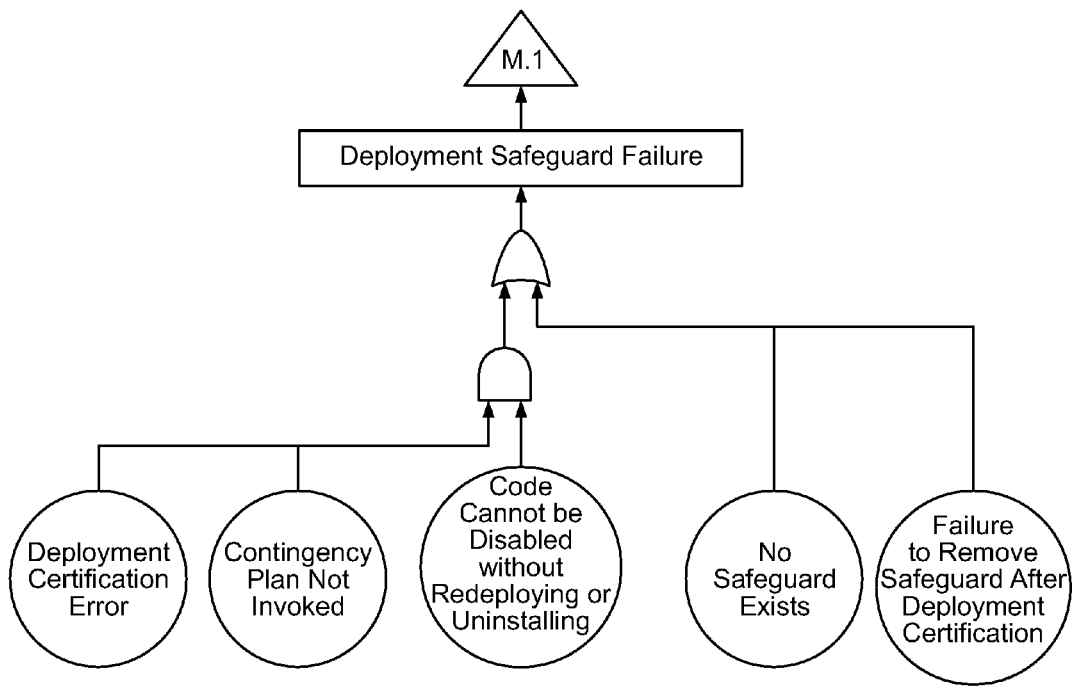
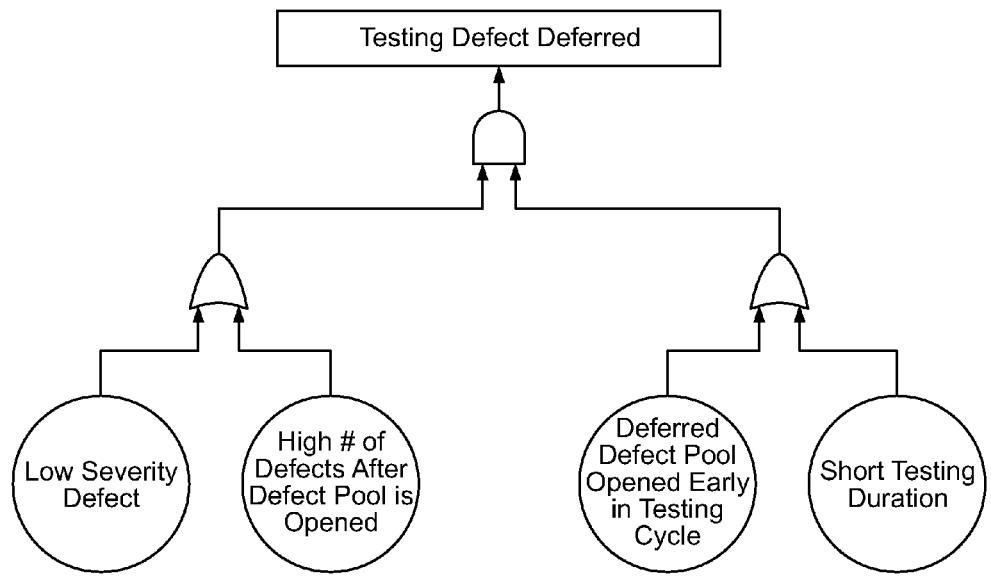
Appendix A

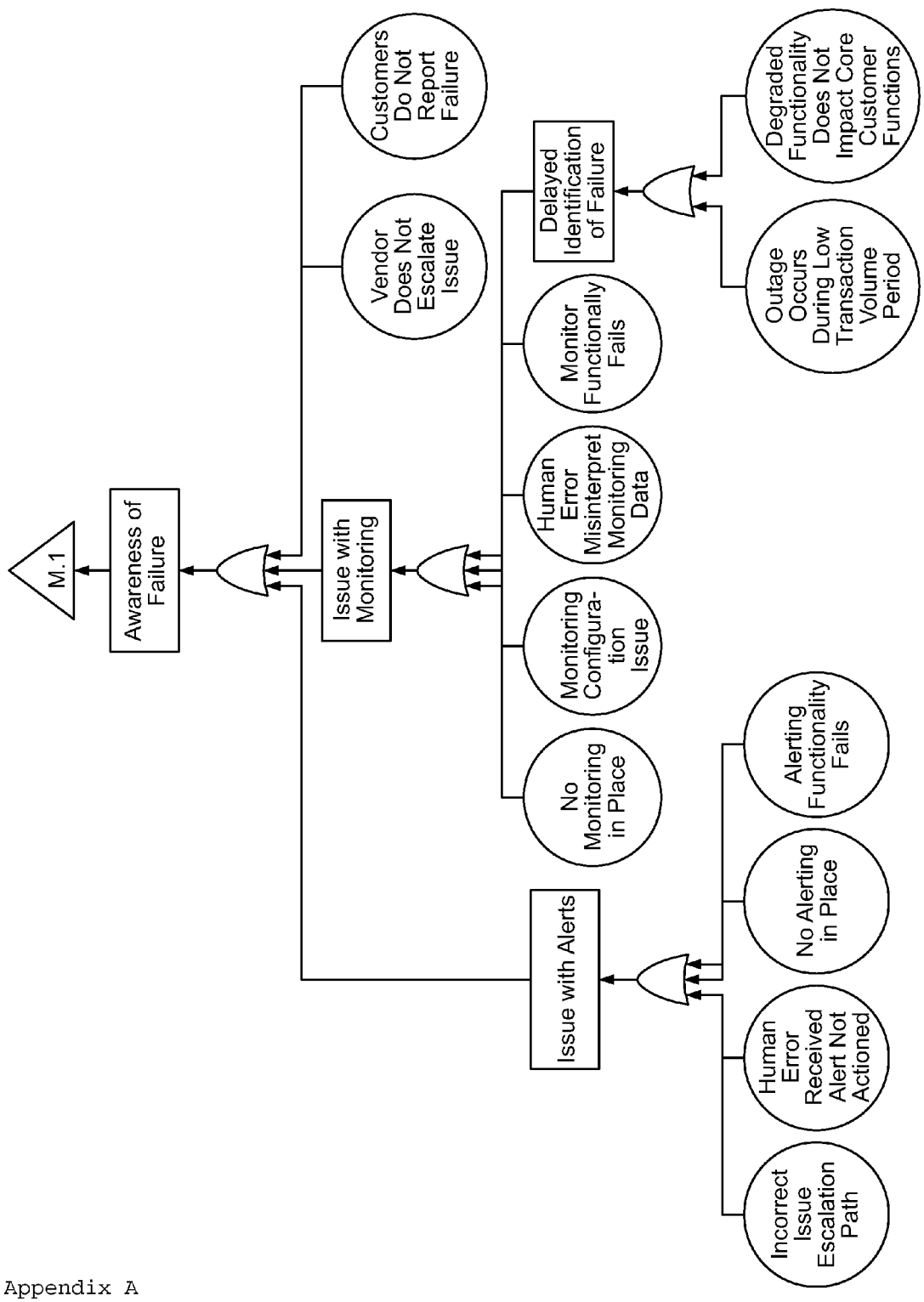
Appendix A

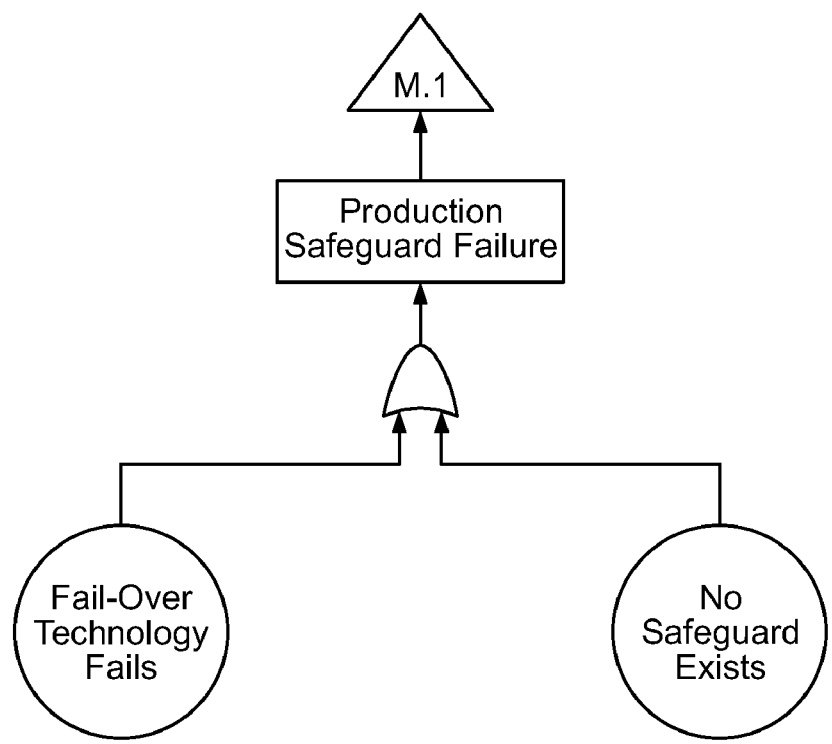
Appendix A

What is claimed is:

1. A computer implemented method for assessing deployment failure risk, the method comprising:

creating a fault tree analytical model for the prediction of deployment failures by electronically linking at least one first data object, at least one second data object and a third data object, the first data object corresponding to at least one root cause, said at least one root cause comprising a high level of design complexity, the second data object corresponding to a minor effect based at least in part on the root cause, and the third data object corresponding to a failed customer interaction based at least in part on the one minor effect;

storing in computer readable memory one or both of a value and a weight corresponding to the minor effect, wherein the correspondence between the minor effect and the value and the weight is obtained through the application of at least one pre-defined result table specifying at least the first data object and at least one necessary outcome, and wherein the outcome comprises a gate modification of the table; and using a processor to compare an output value of the minor effect to a historical value of the minor effect and utilizing the game modification in the result table to change one or both of the value and the weight based on the comparison.

2. The method of claim 1 wherein:
the first data object corresponds to a lack of a production safeguard; and
the second data object corresponds to the likelihood of a production safeguard failure.

3. The method of claim 1 wherein:
the first data object corresponds to the failure of fail-over technology; and
the second data object corresponds to a likelihood of a production safeguard failure.

4. The method of claim 1 wherein:
the first data object corresponds to at least one of inadequate technical design and inadequate business requirements; and
the second data object corresponds to a likelihood of a technology problem.

5. The method of claim 1 wherein:
the first data object corresponds to at least one of a hardware error missed in testing and a deferred testing incident; and
the second data object corresponds to a likelihood of a technology problem.

6. The method of claim 1 wherein:
the first data object corresponds to at least one of a failure to create a traceability matrix and a failure to review a traceability matrix; and
the second data object corresponds to a likelihood of a technology problem.

7. The method of claim 1 wherein:
the first data object corresponds to a likelihood of a failure to establish a correct issue escalation path; and
the second data object corresponds to a likelihood of a breakdown in product failure analysis.

8. The method of claim 1 wherein the value stored is a $\Psi$-value.

9. A computer program product, comprising a non-transitory computer usable medium having a computer readable program code embodied therein, said computer readable program code adapted to be executed to implement a method for generating a deployment failure risk assessment report, said method comprising:

creating a fault tree analytical model for the prediction of deployment failures, the fault tree model including at least one root cause, said at least one root cause comprising a high level of design complexity, at least one minor effect based on the at least one root cause and at least one primary effect corresponding to a failed customer interaction and based on the minor effect;

using the analytical model to generate a first quantitative value corresponding to the minor effect; and replacing the first quantitative value with a second quantitative value based on a historical value corresponding to the minor effect, wherein the correspondence between the first quantitative value and the weight is obtained through the application of at least one pre-defined result table specifying the second quantitative value wherein the second quantitative value comprises a change in a result table, said change in the result table effected via a gate modification.

10. The computer program product of claim 9 wherein, in the method:
the root cause is at least one of the failure to establish properly configured product failure monitoring and a failure of product failure alerting functionality; and
the minor effect is the likelihood of a breakdown in product failure awareness.

11. The computer program product of claim 9 wherein, in the method:
the root cause is at least one of a product failure occurring during a low transaction volume period and a product failure not impacting core customer functions; and
the minor effect is a likelihood of a breakdown in product failure awareness.

12. The computer program product of claim 9 wherein, in the method:
the root cause is the likelihood of at least one of a non-change related software failure, a non-change related hardware failure, and a peak capacity overload; and
the minor effect is a likelihood of a technology problem.

13. The computer program product of claim 9 wherein, in the method;
the root cause is at least one of a low severity defect and a short testing duration; and
the minor effect is a likelihood of a technology problem.

14. The computer program product of claim 9 wherein, in the method:
the root cause is at least one of a code change being placed into production without a traceable requirement and the code being developed in the wrong code base; and
the minor effect is a likelihood of a technology problem.

15. The computer program product of claim 9 wherein, in the method:
the root cause is at least one of an introduction of emerging technology, an introduction of a new vendor, a high number of impacted applications and a high number of new interfaces; and
the minor effect is a likelihood of a technology problem.

16. The computer program product of claim 9 wherein, in the method:
the root cause is at least one of a high number of impacted associates, a high number of geographic impacts and a change crossing lines of business; and
the minor effect is a likelihood of a technology problem.

17. The computer program product of claim 9 wherein at least one of the first and second quantitative values is a $\Psi$-value.

* * * * *